United States Patent [19]

Simcoe et al.

[11] 4,228,511
[45] Oct. 14, 1980

[54] SYSTEM AND METHOD OF POWER DEMAND LIMITING AND TEMPERATURE CONTROL

[75] Inventors: Robert J. Simcoe, Liverpool, N.Y.; David C. Finch, Roanoke, Va.

[73] Assignee: General Electric Company, New York, N.Y.

[21] Appl. No.: 949,306

[22] Filed: Oct. 6, 1978

[51] Int. Cl.² .................. G05B 11/00; H02J 13/00
[52] U.S. Cl. .................... 364/506; 364/493; 165/27; 307/39
[58] Field of Search ............ 364/506, 557, 493, 494; 165/11–14, 24–29; 307/31, 35, 39, 117

[56] References Cited

U.S. PATENT DOCUMENTS

| | | | |
|---|---|---|---|
| 3,400,374 | 9/1968 | Schumann | 364/418 X |
| 3,677,335 | 7/1972 | Weatherston | 165/12 |
| 3,761,018 | 9/1973 | Rekai | 307/39 X |
| 3,872,286 | 3/1975 | Putman | 364/493 |
| 4,013,118 | 3/1977 | Zimmer et al. | 165/27 |
| 4,027,171 | 5/1977 | Browder et al. | 307/39 |
| 4,071,745 | 1/1978 | Hall | 364/557 X |
| 4,100,426 | 7/1978 | Baranowski et al. | 307/35 X |
| 4,110,632 | 8/1978 | Wyland | 307/39 X |
| 4,110,827 | 8/1978 | Shavit | 364/557X |
| 4,114,807 | 9/1978 | Naseck et al. | 307/39 X |
| 4,125,782 | 11/1978 | Pollnow, Jr. | 307/35 |
| 4,141,407 | 2/1979 | Briscoe et al. | 165/12 |

Primary Examiner—Edward J. Wise
Attorney, Agent, or Firm—W. C. Bernkopf; P. L. Schlamp

[57] ABSTRACT

A room thermostatic control providing for automatic power defer, i.e. modification of load consumption of electrically energized heating and cooling systems during intervals when there is a peak load demand on the electrical supply system. During power defer ambient indoor temperature is controlled by set point adjustment to minimize discomfort, e.g. by pre-boosting, by ramped temperature deferral at controlled rates, and thereafter by ramped recovery at controlled rates to the reference, i.e. desired, temperature. The preferred embodiment has normal and night set back reference temperature potentiometers and ambient indoor temperature sensing circuits providing, respectively, analog reference and analog indoor signals. Digital set point signals are derived and compared with the analog indoor signal to actuate relays controlling operation of the heating and cooling means, e.g. compressor and auxiliary resistance heating. A circuit sensing external conditions, e.g. outdoor temperature, indicative of power defer, is utilized to generate a power defer signal for enabling modification of the set point. In the preferred embodiment digital signals are stored for each of a plurality of consecutive real time intervals for heating and cooling modes. A real time clock is utilized to access the digital signals for the current time interval. During presence of a power defer signal set point variation is controlled in accordance to the relevant digital signals for each current time interval.

33 Claims, 45 Drawing Figures

| DIGIT TO DISPLAY | 9 | 10 | 11 | 12 | 13 | 14 | 15 |
|---|---|---|---|---|---|---|---|
| 10-15 | | X | X | X OR E* | X OR E* | X | COMPARE RESULTS X OR A |
| SCRATCH | | | | BLANK REGISTER (PSEUDO CLOCK) | | | |
| SCRATCH | | TENS HRS | HRS | REAL TIME CLOCK TENS MIN | MIN | AM/PM | DAY |
|  | | ⌀* OR 1 | 0-9 | 0-5 | 0-9 | A/P* | 1-7 |
| SCRATCH | | | N POT Reading | TEMPERATURE SETTINGS | | E POT Reading | |
|  | | 5-9 | 0-9 | ⌀* | 5-9 | 0-9 | E* |
| SCRATCH | | | | ADJUSTED PROM TIME | | | COMPARE RESULTS E BEGIN E END IN SOME HR |
|  | | TENS HRS | HRS | TENS MIN | MIN | AM/PM | |
|  | | ⌀*OR 1 | 0-9 | 0-5 | =C POT LSD | A/P* | |
| SCRATCH | | | | ECONOMY END TIME | | | |
|  | | ⌀* OR 1 | 0-9 | 0-5 | 0-9 | A/P* | ⌀* |
| SCRATCH | | | ROOM TEMP Reading | TEMPERATURE DISPLAY REGISTER | CONTROL TEMP Reading | | CONTROLLING FUNCTION |
|  | | 5-9 | 0-9 | ⌀ | ⌀ OR 5-9 | ⌀ OR 0-9 | ⌀/E/P |
| SCRATCH | | | | ECONOMY BEGIN TIME | | | |
|  | | ⌀*OR 1 | 0-9 | 0-5 | 0-9 | A/P* | ⌀* |

TIME COMPARE:
- REAL TIME
- ECONOMY BEGIN
- ECONOMY END
- ADJUSTED PROM

SYSTEM AND METHOD OF POWER DEMAND LIMITING AND TEMPERATURE CONTROL

BACKGROUND OF THE INVENTION

The invention relates to systems and methods for regulating peak electrical demand of temperature conditioning means for heating or cooling residential and other structures and for controlling indoor ambient temperature.

Increasingly residential and other structures are being heated and air conditioned by electrically energized temperature conditioning means, including air conditioners, heat pumps and resistance heating devices. Known types of thermostatic controls are commonly utilized to control such conditioning means so as to maintain desired indoor ambient temperatures.

The increasing utilization of such electrically energized temperature conditioning means imposes high electrical power loads on electrical utility systems during periods of extreme temperatures, i.e. air conditioning loads during summer months and heating system loads during winter months. Specific electrical load characteristics vary from one utility to another, due to differences in industrial loads and climatic conditions. However, it is established that utilities with large electrical heating loads will winter peak on the coldest days and those with air conditioning loads will summer peak on the warmest days. Extra generation and transmission capacity is needed for adequate supply of electrical power on these difficult days. Studies have confirmed a pattern of typical electric load peaks during winter and summer. It has been found that on extreme temperature days, electrical loads have a definite pattern of peaks and valleys throughout the day. Further these load patterns vary between the winter and summer peak months. For example, there may be a distinct morning peak and a separate distinct afternoon peak in the winter, whereas there may be a single afternoon peak in the summer.

It has been proposed to shift electric load demand from those peaks to provide some smoothing of the load demand imposed on the utility system. Adequate load shifting, i.e. power deferral, reduces peak demands and its undesirable effects.

Load shifting can be initiated with signals transmitted during peak periods by the utility company, e.g. by radio, carrier current or telephone. Alternate systems for interrupting the supply of electrical energy to loads during peak demand periods do not require the transmission of such signals. The supply of electric power to the loads during peak periods may be interrupted during predetermined time periods, based on the described historical load patterns, whenever outdoor temperature attains predetermined values. Thus power is deferred during these time intervals whenever the outdoor temperature attains predetermined values. Thus it has been suggested to interrupt power during specified time intervals in the winter when temperature is below a predetermined value, and in the summer when temperature is above a predetermined value.

Load deferral arrangements have been successfully utilized with limited types of loads. Electric hot water systems have been controlled in this manner. The success of this arrangement is largely attributable to the heat energy storage capability of the water, and to the acceptable range of temperature variation of the water. Power may therefore be interrupted for reasonable time periods without adverse user reaction.

Attempts have also been made to control the peak load demand of individual large buildings by large and complex control systems. These interrupt power solely in accordance to predefined rigid time schedules. Thus, for example, heating or cooling systems in different parts of a building are disabled for different interim time periods, e.g. up to 15 minutes every hour, based on the anticipated tolerance of the office occupants.

However, residential heating and air conditioning systems comprise a large portion of the utilities' peak loads during peak demand periods. Load deferral of such residential heating and cooling systems imposes substantial problems. Load deferral systems imposing discomfort on the owner or resident are unacceptable. The heat transfer coefficient of residences and their rooms differ drastically. Thus the heat energy required to maintain a predetermined indoor ambient temperature varies not only with variations between indoor and outdoor temperature, but also from residence to residence, and in some cases from room to room. Conversely interruption of the temperature conditioning means results in differing rates of temperature change. Interruption throughout the peak periods results in intolerable deviation of indoor temperature from the desired reference temperature. Even interruptions cycled on and off at a preestablished rate result in undesirable variations between different installations. Occupants of residences having high K factors and small capacity heating systems are exposed to greater, and thus objectionable, variations of indoor ambient temperature. Aside from these considerations, power deferral of residences can not be successfully provided by large and expensive control systems nor by systems that are difficult to install and to set up and control.

OBJECTS OF THE INVENTION

It is an object of the present invention to provide a novel control system and method for automatically deferring electrical power consumption of electrically energized indoor ambient temperature conditioning means.

It is another object to provide such a system and method for maintaining indoor ambient temperature within an acceptable range during power deferral.

It is a further object that temperature variations from normal set point values occurring during deferral are not unduly affected by parameters of the thermal conditioning means controlled by the control system nor by the parameters of the building whose ambient indoor temperature is being conditioned.

It is a further object of the invention to provide an integral power deferral and thermostatic control system for the ambient temperature conditioning means.

It is a further object of the invention to utilize the thermal storage capacity of homes, buildings, and their furnishings to provide distributed peak storage capacity for utilities.

It is another object of the invention to provide a dispersion of the load seen by the utility, (i.e. some randomness to the power defer) so as not to produce unwanted short duration peak load conditions.

It is a yet further object to provide such an integral deferral and control system which is sufficiently compact and is otherwise suitable for use as a conventional room thermostat control.

It is another object of the present invention to provide such a thermostat control providing sufficient control features of user interest.

It is a yet further object to provide such a control whose peak deferal characteristics may be customized for local utility system requirements.

A further object of the invention is to provide a novel thermostatic control system whose power deferral arrangement is not readily defeatable by users of the control.

SUMMARY OF THE INVENTION

In accordance with the invention, a set point temperature value derived from a user adjustable reference value is modified in a controlled manner during power deferral. A power defer signal derived from a source external of the control and building in which it is housed, e.g. an outdoor temperature sensor or controlled contacts enables power deferral. In the preferred embodiment power deferral is actuated solely during predetermined real time intervals. During the actual deferral time, the set point value is successively stepped at a controlled rate such that indoor ambient temperature is modified at a controlled rate. Upon completion of power defer, the set point value may be automatically ramped in an opposite direction until it returns to the reference value. Upon initiation of power defer, the set point value can be initially boosted, at a controlled rate, in a direction opposite of the direction of set point temperature variation during the defer portion, such that deferral is initiated from a temperature level displaced from the reference temperature in a direction opposite to that attained during deferral.

One arrangement for such operation comprises user adjustable reference temperature means providing an analog reference signal, and means for converting such reference signal to a digital reference value signal. A digital set point signal is normally derived from this reference value signal. A block of digital signals for each of a plurality of contiguous real time increments is stored in memory. Each block defines any set point ramping, e.g. the direction and rate of ramping, desired during power deferral. A real time clock is utilized to select the block for the current time interval, such that the set point is appropriately ramped during the presence of the power defer signal, and that the set point value is returned to the reference value at a predetermined rate. Means are disclosed for automatically terminating recovery upon coincidence of the set point and reference values.

An arrangement is also disclosed for comparison of an analog indoor temperature signal with the set point signal and with the algebraic sum of set point and set off signals to control actuation of the temperature conditioning means. The preferred arrangement further discloses means for controlling such actuation for specified minimum on and minimum off times.

BRIEF DESCRIPTION OF THE DRAWINGS

FIGS. 6A and 6B are a map of the contents of the contents of the random access memory (RAM) addressed by the system;

FIG. 16A is a display routine, FIGS. 16B and 16C, respectively, are adding and subtracting routines;

FIG. 23(a) is a routine for updating the clock from seconds through days of the week. FIGS. 23(b)-23(d) are sub-routines used therein;

FIG. 24(c) is the timer update routine, and FIGS. 24(a) and 24(b) are sub-routines used therein;

FIGS. 20A and 30B comprise a flow chart of a temperature control routine for producing control system outputs responsive to temperature value comparisons;

DETAILED DESCRIPTION OF THE INVENTION

For convenience of the reader, the following description has the following sub-headings:
SYSTEM CONTROLS, INPUTS AND OUTPUTS
SYSTEM BLOCK DIAGRAM DESCRIPTION
ANALOG CIRCUITS
COMPONENT INTERCONNECTIONS AND TIMING SIGNAL GENERATIONS
TEMPERATURE SET POINT CONTROL AND POWER DEFER OPERATION
TEMPERATURE DEAD BAND CONTROL
RAM MEMORY MAP
PROGRAM FLOW ROUTINE
DETAILED FLOW DIAGRAMS

SYSTEM CONTROLS, INPUTS AND OUTPUTS

Figure 1:
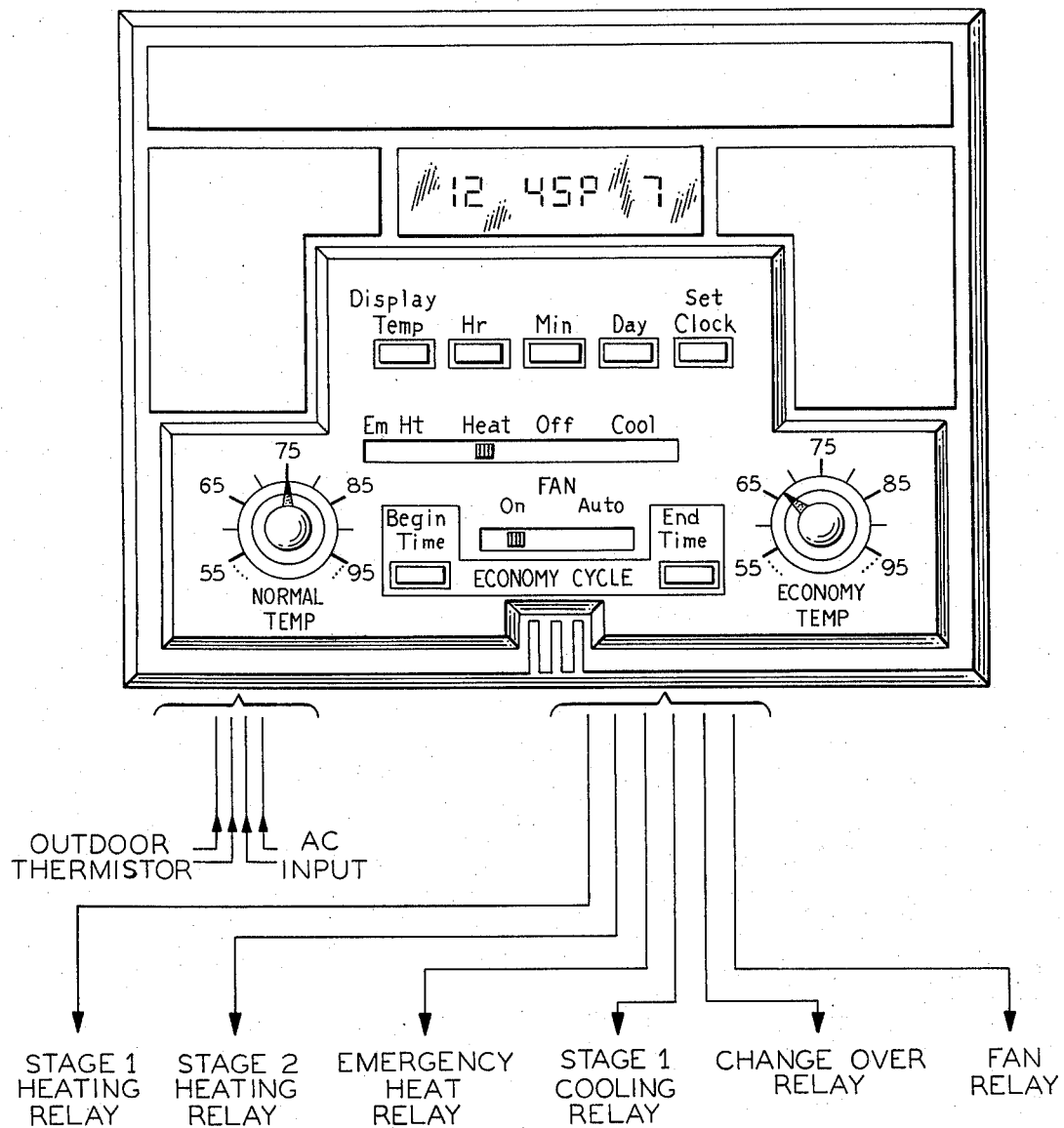
FIG. 1 is a front view of the control and illustrates electrical inputs and outputs.

The indoor thermostatic control and demand limiting system is preferably housed in a small container for mounting within the building or room whose ambient temperature is controlled. The apparatus thus is preferably of the compact size of a conventional room thermostat control. FIG. 1 illustrates the front panel of the preferred embodiment, including the controls and displays, and diagrammatically illustrates inputs and outputs of the system. The preferred embodiment is similar in form and appearance to a conventional wall thermostat.

The system provides outputs adapted to control the operation of ambient temperature conditioning means, i.e. room or building heating and/or air conditioning systems, such as by actuation of relays of the conditioning means. It is particularly adapted to control electrically energized temperature conditioning means, such as heat pumps and resistance heating devices. The system provides for automatically limiting the electrical energy consumed by the conditioning means during intervals of peak demand on the supply system providing electrical energization. The preferred embodiment is particularly suited for controlling a heat pump system selectively providing heating or cooling and having supplemental electric resistance heating means. However, it can also be used to control other types of conditioning means. The outputs of the preferred embodiment comprise:

Stage 1 - Heating Relay - for automatically controlling actuation of the heat pump compressor in the heating mode, Stage 2 - Heating Relay - for automatically controlling actuation of electrical resistance, e.g. base board, heaters to supplement, as necessary, the heat energy supplied by the compressor, Stage 3 - Emergency Heat - for bypassing certain thermostat devices actuating resistance heaters according to the outdoor temperature, Stage 1 - Cooling Relay - for automatically controlling actuation of the heat pump in the cooling mode, Change Over Relay - to provide for transfer of heat pump operation between heating and cooling modes, Fan Relay - to provide for operation of the fan of the temperature conditioning system.

The system is adapted to receive electrical signals, indicative of condition from a source external of the building in which the control and ambient temperature conditioning means are located, to initiate energy demand limiting. In the preferred embodiment this signal is indicative of outdoor temperature. Accordingly, the system has an input connection for an outdoor thermistor. Alternately the thermistor may be replaced by a fixed resistor corresponding to a temperature where power defer will not occur. The power defer cycle can then be initiated by either opening or shorting that resistor with relay contacts which can be controlled by radio, or carrier current, or telephone signals. The control also has a connection for an AC input providing energization and time reference control.

It should be noted that the above described connections and the controls and displays described below are exemplary of the preferred embodiment. The system can alternatively energize other types of ambient temperature conditioning means, although its electrical energy demand limiting features are, of course, particularly adapted for electrically energized conditioning systems, such as air conditioners, heat pumps, and resistance heating.

The system has conventional thermostat control functions. A slide switch designates basic operating modes: Heat, Cool, Off, or Em. Ht. (Emergency Heat). In the "Off" position the heat and cool functions are disabled, but display, fan and clock functions continue. In the "Em. Ht." position the resistance heaters and fan operate, but not the heat pump compressor. A fan switch permits operation in "Auto" or "On" mode. In the "Fan-Auto" mode the fan runs when the heating or cooling plant operate, whereas in the "Fan-On" the fan runs continually even if the function slide switch is in "Off" position. A "Normal Temp" control is adjustable to a desired normal operating set point temperature. Economy cycle operation, sometimes termed night set back, permits operation over a selected time period, at an alternative, i.e. second, temperature defined by the setting of the "Economy Temp" Pot. For example, in winter an economy temperature lower than the selected normal temperature may be selected to be operable during the night, e.g. 11 P.M. to 5 A.M.

Figure 2:
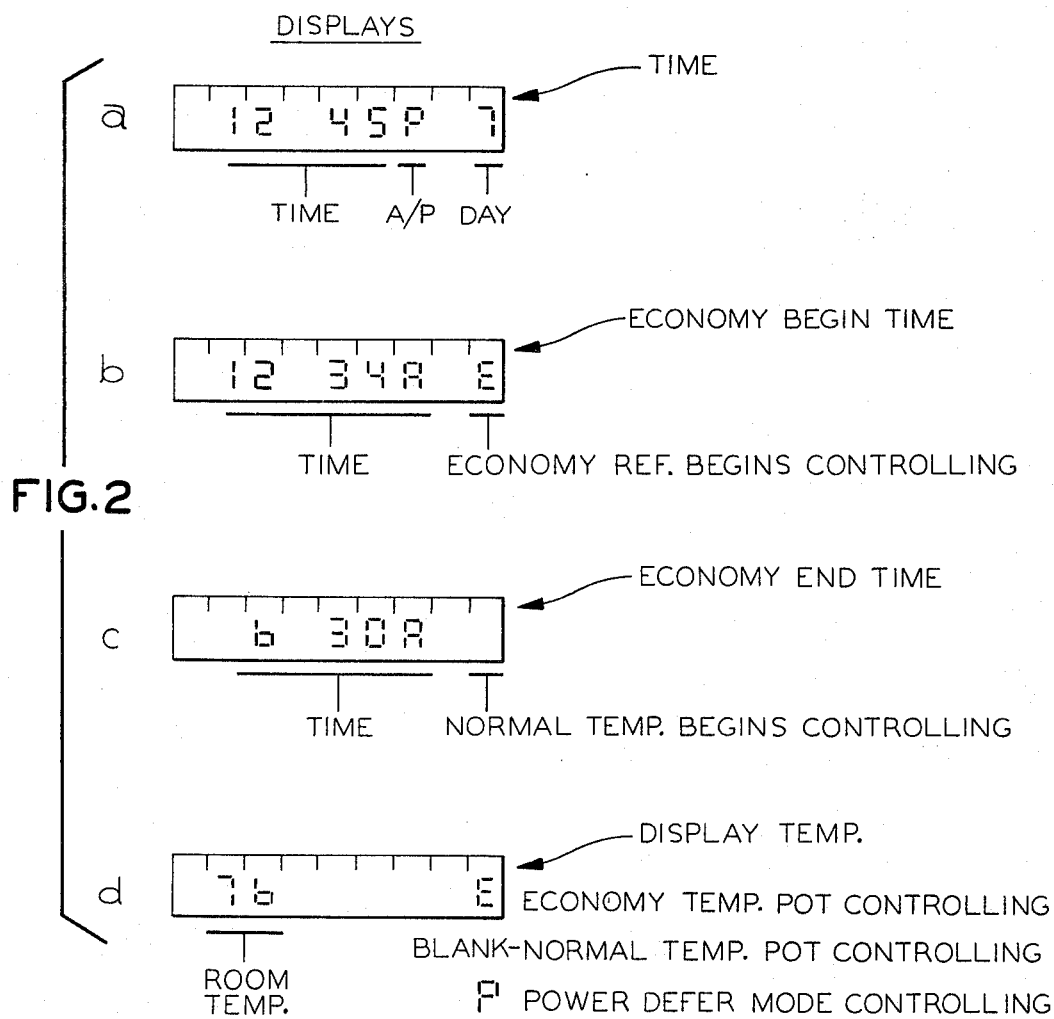
FIG. 2a-2d illustrates typical displays provided by the control.

The preferred embodiment has a six digit display, which normally displays the time of day, including an indication of AM or PM, and day of the week. The latter being represented by one of the numbers 1–7, indicative of Sunday through Saturday, respectively. Representative displays are illustrated in FIG. 2. FIG. 2a is a normal time display. The time for Economy Begin Time, FIG. 2b, is displayed when the "Begin Time" button is pressed, and the Economy End Time, FIG. 2c, is displayed when the "End Time" button is pressed. The clock may be reset by simultaneously pressing the "Set Clock" button, and the appropriate one of the "Hr." (Hour); "Min." (Minute); and "Day" buttons. The Economy "Begin Time" may be modified by simultaneously pressing the "Begin Time" and appropriate one of the "Hour" and "Minute" buttons. The Economy "End Time" is similarly adjusted by pressing the "End Time", as opposed to the "Begin Time" button.

Additional display indications include: the display of indoor temperature, while the "Display Temp" button is pushed. As illustrated in FIG. 2d the displayed temperature is followed by the letter "E" while the Economy Temp. Pot. controls, and by "P" for "power defer cycle", while energy demand limiting functions control system operation. Whenever the heat pump uses supplementary resistance heating, i.e. Auxiliary electric heat, the letter "A" appears in the last digit. This informs the user of excessive resistance heater use. Similar display indications are provided of emergency heat, i.e. operation of the slide switch in the emergency heat position, and an indication is provided of power failure. The inventive features may, of course, be used with alternative controls and displays.

In addition to providing normal and economy thermostatic control, the control system is adapted to limit the electrical load imposed on the power supply system during intervals of peak energy demand. Energy demand limiting, termed power defer operation, is performed automatically, i.e. without the above described controls, utilizing an electric signal representative of a condition external of the control. In the preferred embodiment this is supplied by an outdoor thermistor or by alternative signals as previously described. However, the control can display the occurrence of energy demand limiting. In the preferred embodiment the display of indoor temperature contains a "P" suffix during intervals of power defer operation.

SYSTEM BLOCK DIAGRAM DESCRIPTION

The system is now described with reference to the block diagram of FIG. 3. Illustrated system inputs include the controls and sensors previously described in connection with FIG. 1: the "Normal Temp", i.e. T-norm, potentiometer circuit 4, the "Economy Temp", i.e. T-econ, potentiometer circuit 6, the indoor temperature sensor circuit 2, and the outdoor temperature sensor circuit 8. Each of these circuits produce analog signals that are processed, as described latter, by analog input/output control 10, D/A converter 20, comparator 18, exclusive OR gate 26, and registers 1-4 to produce signals on line 28 that are coupled via multiplexer "MUX" 30 and one input line K4, to processor 36. The pushbuttons and slide switches, described in connection with FIG. 1, are connected in a matrix keyboard 34 providing inputs, on lines K1, 2 and 4 to processor 36. "Time Prom" 52, a read only memory supplies digital information, primarily related to the power defer cycle (i.e., energy demand limiting) on lines K1-8. The processor 36 utilized in the preferred embodiment is a 4 bit TMS 1100 microcomputer. The TMS 1100 microcomputer is a standard commercial product manufactured by, and described in prior art literature provided by, several vendors. It should be noted that alternative types of processors may be utilized, and that the novel arrangements described and claimed herein may be carried out utilizing alternative analog and digital circuitry, in lieu of microcomputers. Processor 36 receives inputs on lines K1, 2, 4 and 8, and supplies outputs on 0 lines φ-7 and on R lines 0-10. The system outputs for actuating the ambient temperature conditioning means, e.g. fan, change over, Stage 1 - cooling, Stage 1 - heating, Stage 2 - auxiliary heat, and emergency heat, are coupled, respectively, from R outputs 0-5, via ralay drivers 38, to output relays.

Display 40 which displays the time, temperature and operating mode information has its digits consecutively enabled by the output of digit decoder 44. Output lines 0-φ to 6 of processor 36 are applied to the seven segment input of the display in order to illuminate the appropriate segments of the enabled digit.

The control, logic, and other functions are performed on a time synchronized schedule. The preferred embodiment has a clock frequency of 300 Kc, providing a processor instruction cycle time of 20 microseconds. Additional synchronizing time signals of 1 second, 0.1 second, and 2.4 milliseconds are generated by timing signal generator 46, as subsequently described in connection with FIG. 10, and are coupled via multiplexer "MUX" 30, respectively, to processor lines K1, 2 and 8. In addition "MUX" 30 supplies the previously mentioned analog comparison signal, on line 28, to line 4 of the processor. In summary, K-line inputs to the processor include the outputs of the "MUX" 30 keyboard 34, and Time Prom 52 digital data outputs. These inputs are supplied to the processor alternatively and in predetermined time sequence based on the states of processor output lines 0-7, R-9 and R-10. The chip enable line R-10, coupled to mode control decoder 48 is high when the timing and comparison signals supplied to MUX 30 are to be supplied to the processor input lines. The status latch line 0-7, also coupled to the mode control decoder 48, is high whenever data is supplied by processor 36 on output lines 0-3 to 6 to registers 1-5 and to the address lines of Time Prom 52. Line 54 supplies enabling signals from mode control decoder 48 to MUX 30.

The digit decoder 44 successively enables successive digits of display 40 and successively enables successive lines of the keyboard matrix 34, which are schematically illustrated as vertical keyboard lines. Each of the keyboard buttons and switches is connected between one of the vertical lines and one of horizontal input lines K1, 2 and 4. Thus when the vertical lines are successively enabled by the digit decoder, the actuated buttons or switches connected to the enabled vertical line supply input signals to the appropriate processor input lines. Matrix and display actuation of this type is described in "The Small Electronic Calculator", *Scientific American*, March, 1976, pages 88-97. The digit decoder 44 is sequentially enabled by enabling line 56 from mode control decoder 48. The plurality of digit decoder output lines 58, coupled to the keyboard and to the display digits, are successively activated when there is an enabling signal on line 56. Register 5 provides digital signals on line 60 to the digit decoder which specify which one of the respective ones of digit lines 58 is to be enabled at any specific time. The register 5 output thus causes successive ones of the digit and keyboard lines to be actuated.

The Time Prom read only memory 52 provides a digital output to lines K1, 2, 4 and 8 whenever Rom Enable line R-9, connected from the processor to Prom 52 is high. This digital output corresponds to the data stored at the address location addressed by the address signal simultaneously supplied to the prom 52 by processor output lines 0-3 to 6 and R-6 to 8. The preferred embodiment utilizes a programmable read only memory (PROM). This allows the control to be customized for differing ability load peaks. Of course alternative types of storage memories such as non-programmable read only memories, i.e. ROMs, may be utilized. In summary: (1) prom 52 outputs are supplied to the processor on lines K1, 2, 4, 8 when the ROM enable line R-9 is high. At this time chip enable lines R-10 is low, indicating that no MUX output signals are to be supplied and all MUX outputs remain high providing a load for the open collector Prom. During this interval status latch line 0-7 is high indicating that the processor is supplying output on lines 0-3 to 6. At all other times, i.e. when no Time Prom digital output is supplied, the previously referenced 2.4 millisecond timing squarewave is supplied from MUX 30 on line K8 to the processor; (2) the comparison signal and the additional, i.e. 0.1 second and 1 second, timing signals are supplied by MUX 30 to the processor input K1, 2 and 4 lines whenever the chip enable line R-10 is high. K lines 1 and 2, respectively, supply to the processor the 1 second and 0.1 second timing signals, and K line 4 supplies the comparison output from line 28; and (3) the keyboard lines are enabled, and keyboard inputs are supplied to the processor input lines K1, 2 and 4 whenever the chip enable line R-10 and the status latch line 0-7 are low. At such time the MUX outputs connected to the k1, 2 and 4 lines are low, so as to permit the keyboard signals to be supplied to the processor.

Processor output lines 0-3 to 6 sequentially supply digital data to the time prom 52 address lines and to each of registers 1 through 5. This digital data is supplied to registers 1 through 5 at certain time intervals when the status latch line 0-7 is high and line 62 supplies an enable signal to register select decoder 50. Register select signals R-6, 7 and 8 supply binary coded digital data to register select decoder 50 identifying which of the registers 1-5 is to be enabled at any one time to receive the digital data which is supplied by processor output lines 0-3 to 6 to each of the registers. The register select decoder output comprises five separate enable lines which are connected, respectively, to registers 1 through 5. In FIG. 3, these 5 lines are for simplicity identified as line 64.

The successive digits of the display are actuated at intervals of 2.4 milliseconds in order to minimize flickering. This occurs responsive to a transition of the 2.4 millisecond timing squarewave supplied by MUX 30 to processor line K8. Upon occurrence of this transition, the displayed digit is updated. This includes supplying data to register 5 of the next digit to be displayed, activating the appropriate ones of processor output lines 0-2 to 6 to energize appropriate ones of the seven segments of the digit to be displayed, and supplying signals on lines 56 and 60 to digit decoder 44 to enable the appropriate one of digit display line 58. In addition the keyboard inputs are supplied to the processor, i.e. signals are supplied to lines K1, 2 and 4 corresponding to activated buttons and switches that are connected to the activated one of the digit display lines. These keyboard signals are stored in the RAM, i.e. random access memory, of the processor 36 and are utilized as explained subsequently.

The one second timing squarewave signal provided to the processor on line K1 is utilized to time synchronize the basic temperature sensing and processing functions of the system. Thus this timing signal is utilized to periodically, (a) determine the temperature settings of the front panel temperature potentiometers, and to determine the sensed indoor temperature; (b) to modify the appropriate front panel temperature potentiometer value to an appropriate set point, i.e. control temperature as may, for example, be required to perform energy defer, i.e. power defer cycle, operations; and (c) to generate additional set off signals having a temperature value offset from the set point, i.e. control temperature value, by preselected temperature increments. The set point, i.e. control, temperature and set off signals are compared with the sensed indoor temperature value. This comparison controls the state of the system output relays and thus controls the operation of the ambient temperature conditioning means. The above referenced set off signals provide for appropriate dead band, i.e. hysteresis, and cycling of the system outputs.

Figure 3:
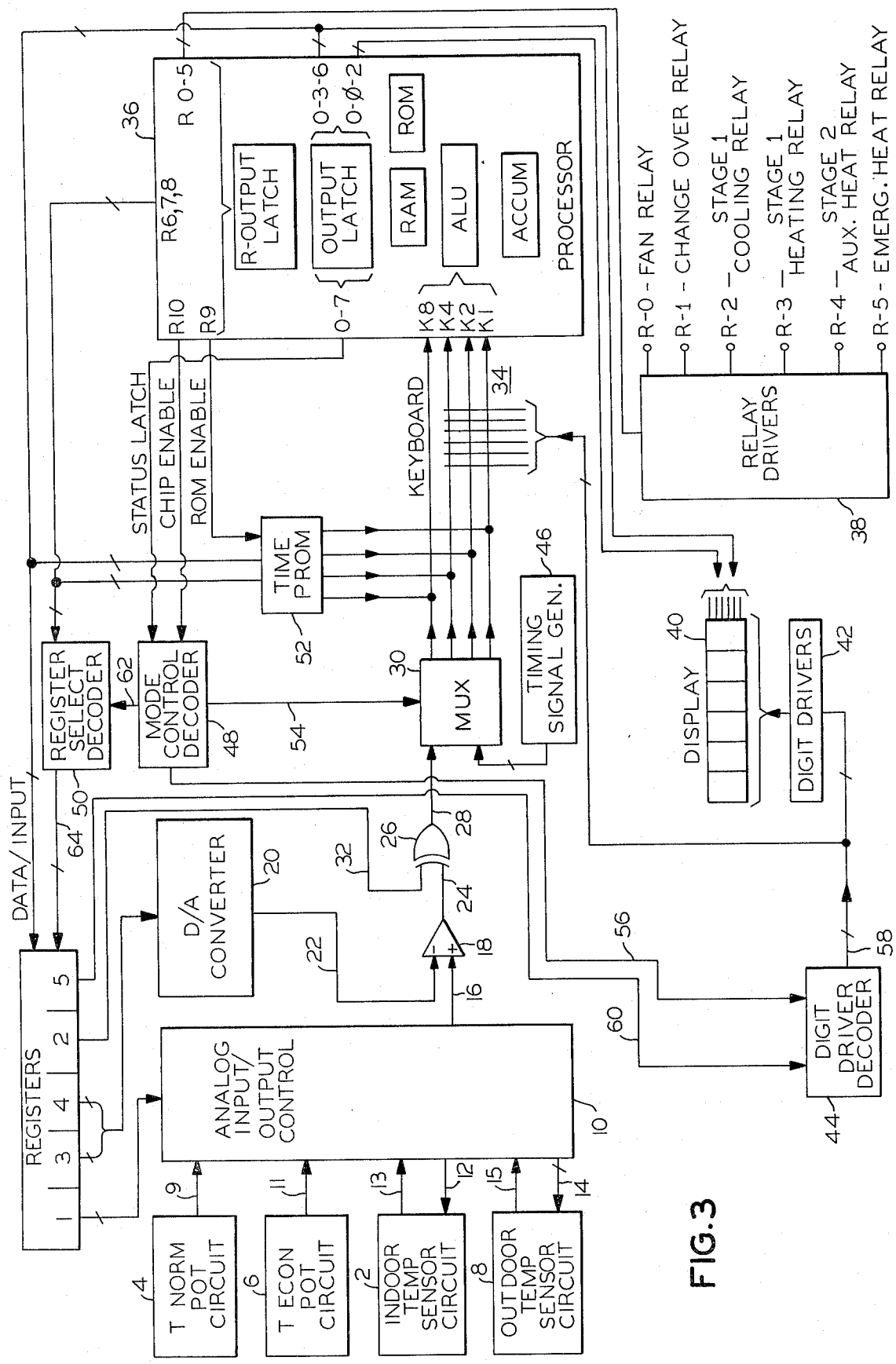
FIG. 3 is a block diagram of the control.

The analog temperature circuits illustrated in FIG. 3 include the following: indoor temperature sensor circuit 2 incorporates a thermistor preferably mounted within the assembly illustrated in FIG. 1 and is adapted to provide an analog electric signal on line 13 representative of ambient indoor temperature. The T-norm potentiometer circuit 4 incorporates the "Normal Temp" control illustrated in FIG. 1 and provides an analog electrical signal on line 9 representative of the desired ambient temperature value setting of the "Normal Temp" control. The T-econ pot circuit 6 incorporates the "Economy Temp" control illustrated in FIG. 1 and provides an analog electrical signal on line 1 representative of desired ambient temperature value setting of the "Economy Temp" control. This is utilized during the economy cycle time, in lieu of the normal temperature potentiometer signal. The outdoor temperature sensor circuit 8 is utilized in connection with energy demand limit, i.e. the power defer cycle. It functions with a thermistor adapted to be mounted, externally of the apparatus, at an outdoor location such as the exterior wall of a building so as to provide on line 15 an indication of specified outdoor temperature. Alternately the outdoor sensor can be replaced by a fixed resistor which can be opened or shorted by relay contacts to cause entry into the power defer cycle. Each of the above specified devices has an output circuit connected to analog input-output control 10. Control 10 selectively connects different ones of the analog circuit outputs to output line 16. Line 16 is connected to one, e.g. the positive, input of comparator 18. Sensor circuits 2 and 8 are selectively energized for only short time periods by control 10 in order to minimize thermal drift of the sensors. FIG. 3 illustrates input line 12 connecting energy supplied by control 10 to indoor sensor circuit 2. As described subsequently, it is desirable to have outdoor sensor circuit 8 sequentially provide signals indicative of outdoor temperature at a plurality of discrete outdoor temperature values. Energization is successively applied on separate lines to outdoor sensor circuit 8 from control 10, as schematically illustrated by line 14, to detect outdoor temperature in respect to different reference values.

The analog input-output control 10 thus controls which one of the outputs of analog circuits 2, 4, 6 and 8 are connected to comparator 18, and what energization is applied to the indoor and outdoor sensors at any time. The selection of which one of the output lines, and which one of the input lines, is to be connected between the analog circuits and control 10 at any time is established by the input to control 10 from register 1. The connections made by control 10 are in accordance to the digital signal output of register 1 and occur at times when this digital signal is applied to control 10.

Digital to analog converter 20 converts a binary coded decimal digital input signal, supplied by registers 3 and 4, to an analog signal of corresponding value. This analog output signal is supplied by line 22 to the other, e.g. negative, input of comparator 18. The comparator thus produces at its output line 24 an output signal whose state, i.e. one or zero, is indicative of whether the analog value of the selected one of the outputs of the analog circuits is greater or smaller than the analog value of the D/A converter output signal. The comparator output is coupled by line 24 to one input of exclusive OR circuit 26, whose output is coupled by line 28 to one input of multiplex, i.e. MUX, circuit 30. Circuit 26 serves to selectively invert the comparator output signal under control of the signal applied by line 32 from register 2 to circuit 26. For example, when the register 2 output signal is low the signal on line 28 corresponds to that one line 24. When it is high the signal on line 28 is inverted in respect to that one line 24. This arrangement simplifies system operation as between the heating and cooling modes. As explained subsequently comparison in the cooling mode is inverted in respect to the heating mode. The comparison signal supplied by line 28 to MUX 30, and periodically supplied by MUX 30 to processor input line K4, thus has a high or low state depending upon the comparison of the specific one of the analog circuit outputs connected to comparator 18 and the analog signal coupled from the D/A converter 20 on line 22.

Once every odd numbered second the processor 36 sequentially detects the values of the potentiometer and indoor temperature sensor values and stores these values in digital form in the random access memory (RAM) of the processor. For example, the indoor temperature sensor value is initially detected as follows. The processor transmits a digital signal of a predetermined BCD number value via data lines 0-3 to 6 to register 1. This actuates control 10 to energize the indoor temperature circuit 2 via line 12 and to couple the indoor temperature signal on line 13 to line 16 of comparator 18. The previously detected value of indoor temperature stored in the RAM is transmitted, as a binary coded decimal signal, via the data lines to registers 3 and 4. D/A converter 20 provides an equivalent analog signal to the other input line, 22, of the comparator. The state of the comparison signal indicates whether the sensed temperature value is greater or less than the temperature value stored in registers 3 and 4. For example, a comparison output signal of high state, e.g. "1", on line 28 may be indicative of the sensed temperature being below the stored temperature, and a signal of low state, "0" indicative of sensed temperature being at or above the stored temperature. The comparison output signal on line 28 is coupled via multiplexer 30 and the K4 line to the accumulator "Accum" of the processor. If the sensed temperature is below the stored temperature, the accumulator signal is "1". This causes the processor to decrement, i.e. subtract, one from the indoor temperature value stored in RAM and to transmit this reduced value to registers 3 and 4 for comparison with the sensed indoor temperature. The stored temperature value is thus sequentially decremented and continuous comparisons are made until the state of the comparison output signal, and thus of the accumulator, reverses, i.e. to "0", indicative that the decremented value stored in RAM corresponds to the sensed indoor temperature.

Conversely if the sensed value is greater than the stored temperature value, comparison output line 28, and thus the K4 line and the accumulator have a zero value. Accordingly, the stored temperature value is incremented by one, and consecutive incrementing and comparison occurs until the state of the comparison output signal reverses, i.e. to "1". Thus the analog circuit, e.g. indoor temperature sensor circuit 2, is connected in an analog to digital tracking converter loop generating, and storing in RAM, a BCD value of the analog signal. Indoor thermostatic controls generally have a predetermined temperature range, e.g. 50° F. to 100° F. The preferred embodiment accordingly limits tracking of temperature values within such a range, e.g. 49° F. to 99° F.

Figure 26:
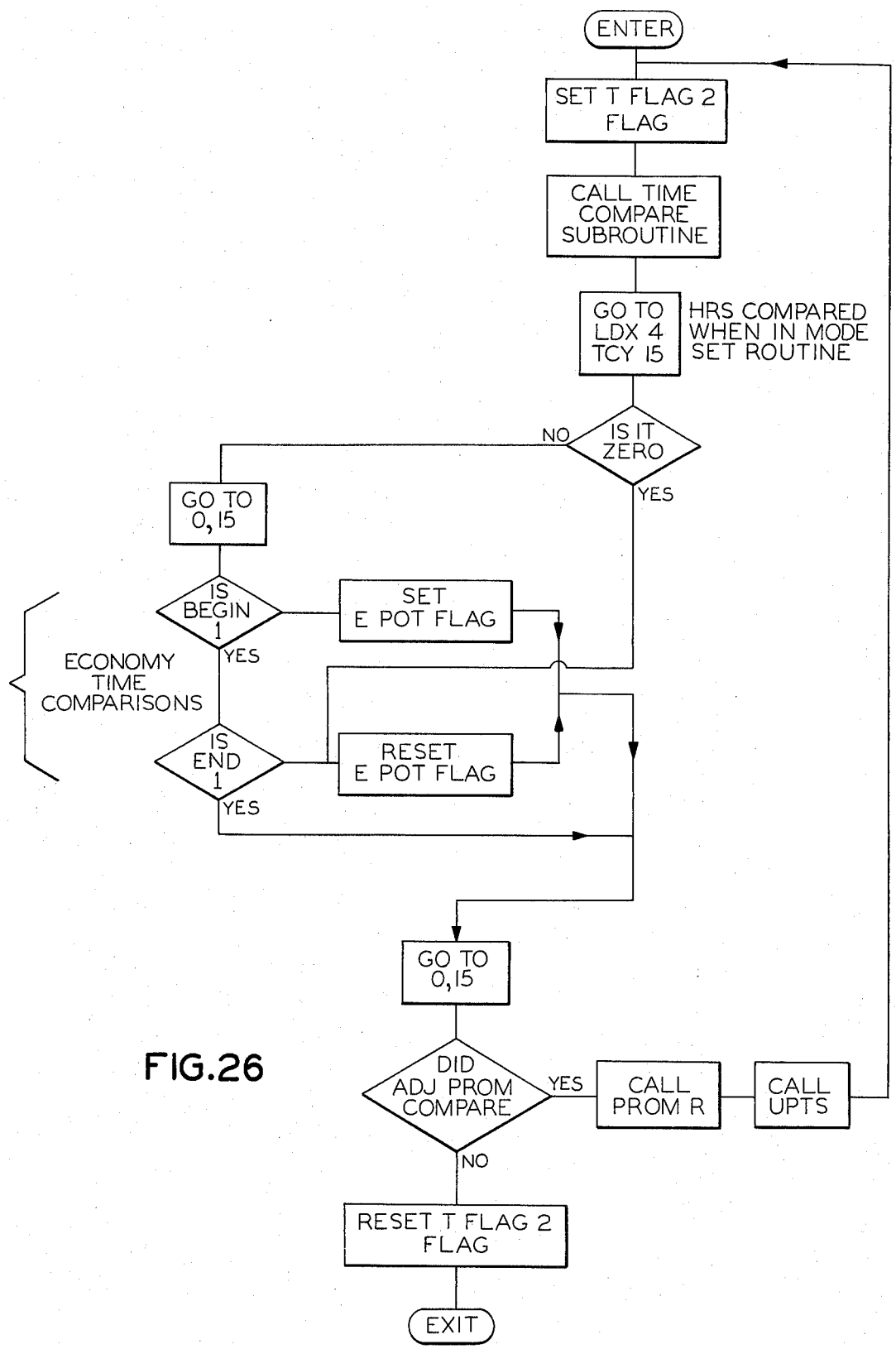
FIG. 26 is a flow chart of a real time comparison routine used for modifying system operation responsive to comparisons of real time and stored times.
Figure 28:
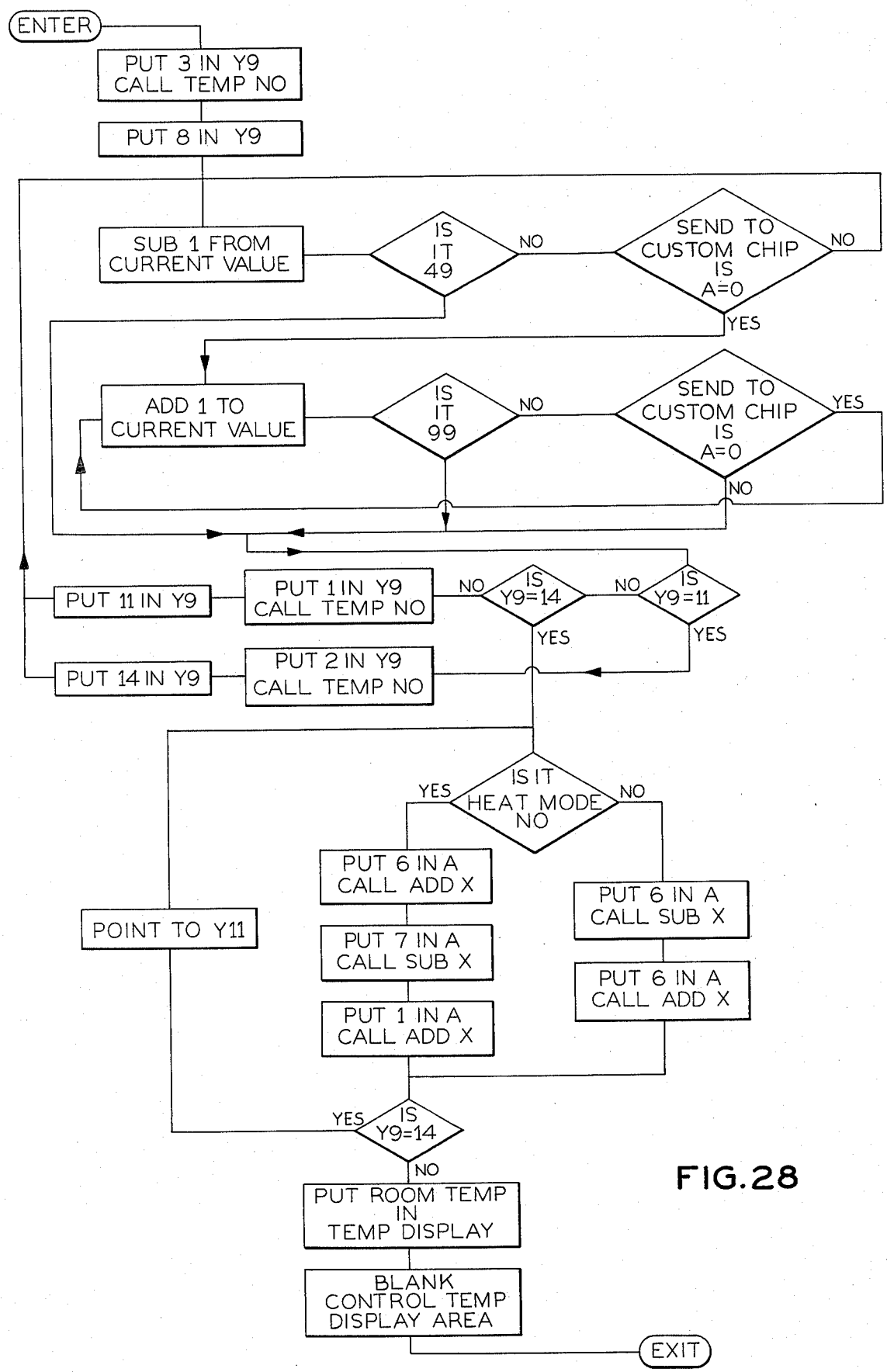
FIG. 28 is a flow chart of a routine for deriving reference potentiometer and indoor temperature values.
Figure 32:
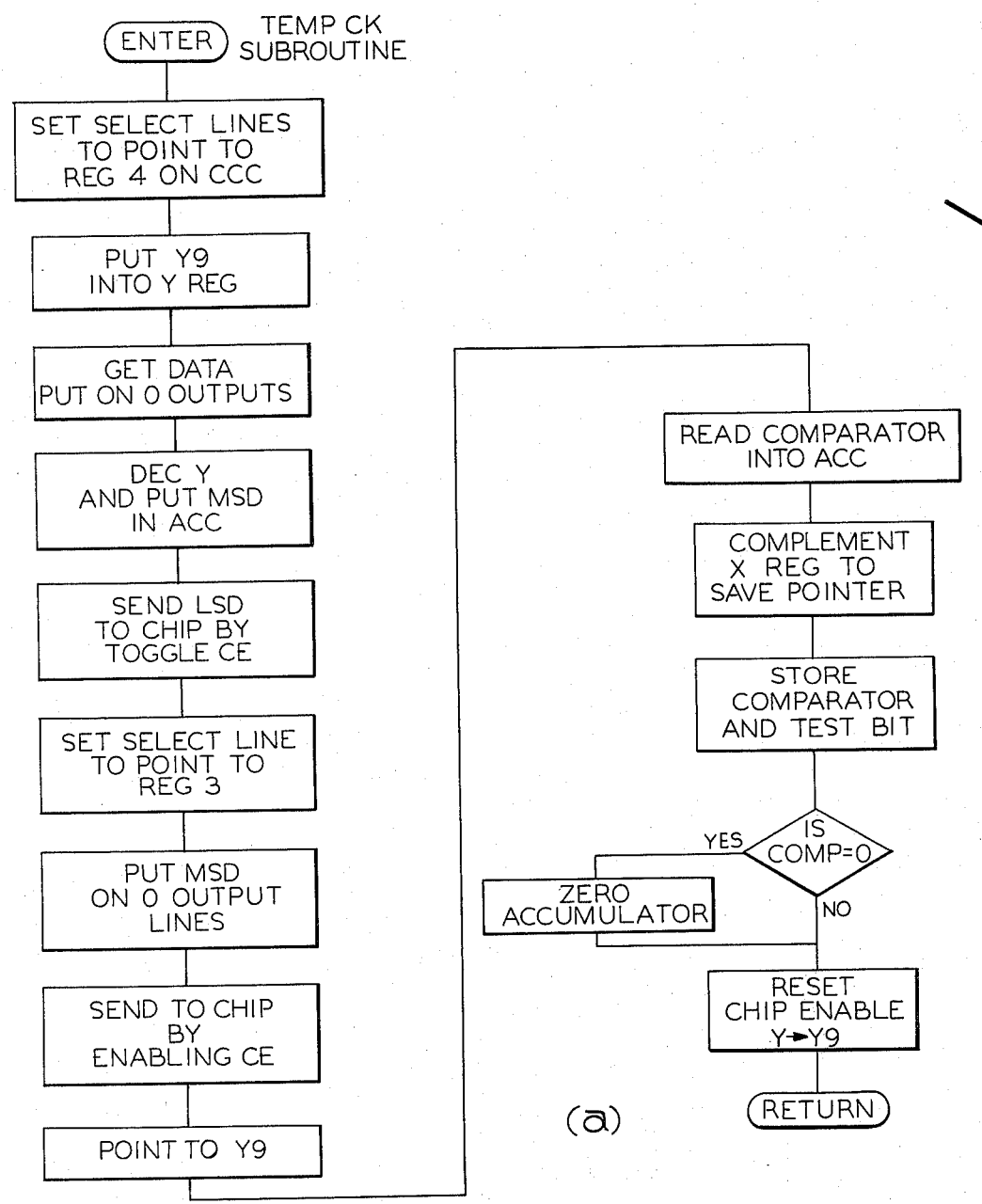
FIGS. 32(a) and 32(b) are flow charts of sub-routines utilized in the temperature control routine illustrated in FIGS. 30A and 30B.
Figure 32:
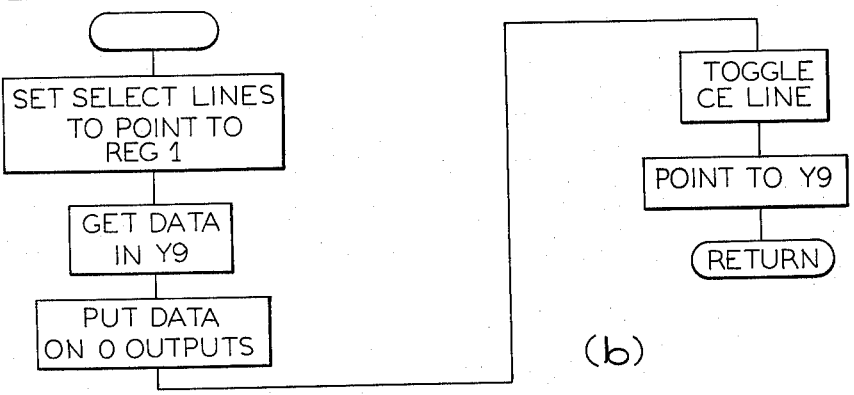

Subsequent to determination of sensed indoor temperature, a similar determination is sequentially made of the reference temperature, i.e. the normal and economy potentiometer circuits 4 and 6. Different predetermined values are transmitted to register 1 to respectively connect T-norm pot line 9 and T-econ pot line 11 to comparator input line 16. Additional details of the previously referenced circuitry are described below, and the digital tracking arrangement is illustrated by FIGS. 28 and 32. As previously described the controlling temperature is normally derived from the normal temperature potentiometer circuit. The economy temperature potentiometer is utilized only during selected economy time intervals, i.e. from the economy "Begin Time" to the economy "End Time" as entered on the keyboard. In the preferred embodiment, real time stored in RAM, and produced by a processor operated real time clock is sequentially compared with economy begin and end times stored in RAM. The reference temperature is accordingly switched between the normal and economy potentiometer outputs. This procedure is illustrated in FIG. 26.

ANALOG CIRCUITS

Figure 7:
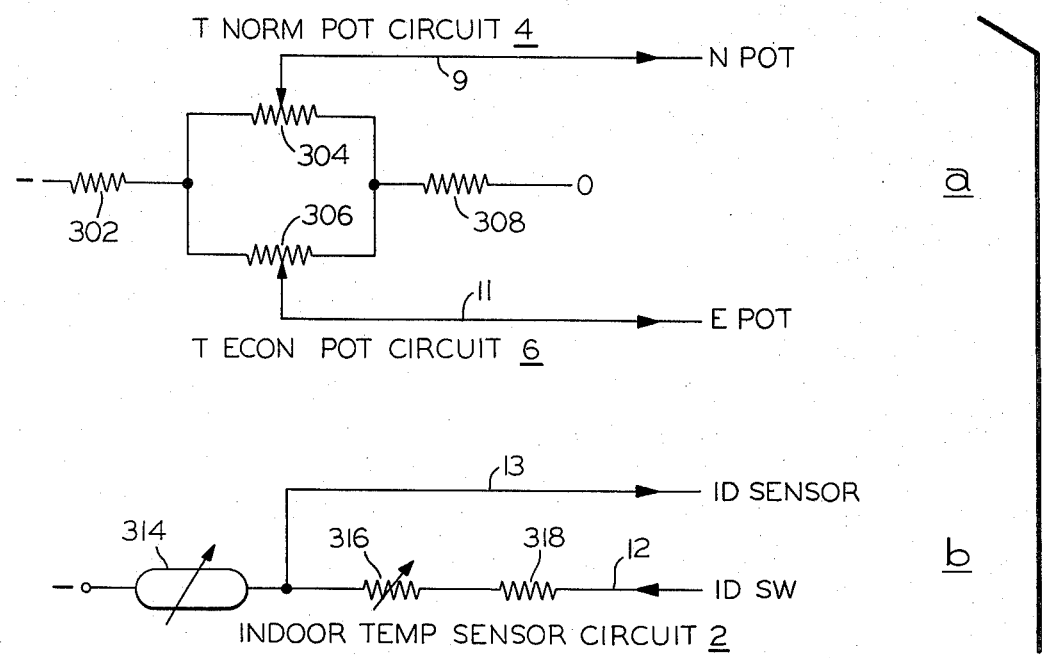
FIG. 7 is a schematic diagram of the analog input circuits.
Figure 7:
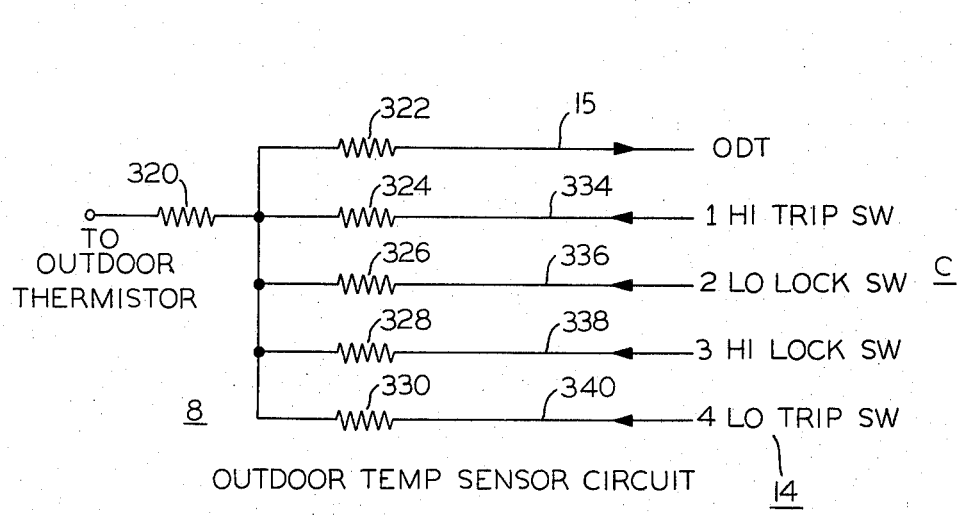

The following is a description of a detailed circuitry of the preferred embodiment for performing the analog signal comparisons previously described in connection with FIG. 3. The analog circuits 2, 4 and 6, provide analog signals corresponding to the values of, respectively, sensed indoor temperature, the temperature setting of the normal temperature potentiometer, and the temperature setting of the economy temperature potentiometer. The additional analog circuit, outdoor temperature circuit 8, sequentially provides analog signals indicative of sensed outdoor temperature being above or below a plurality of specified outdoor temperatures. These analog signal comparisons are performed by sequentially coupling the respective analog circuits, via analog input/output control 10 to comparator 18 whose other input is supplied by D/A converter 20. The analog circuit, i.e. 4, 6, 2 or 8, and the D/A converter 20 comprise a bridge circuit. The respective analog circuits thus comprise one arm of the bridge and the D/A converter comprises the other arm. Both arms are energized by the same operating potential. The analog circuits 2, 4, 6 and 8 are illustrated in FIG. 7. As shown at the top, the normal temperature potentiometer 304 and the economy temperature potentiometer 306 are connected in parallel. One end of these potentiometers is connected through resistor 302 to a negative potential, e.g. 15 volts, and the other end is connected through resistor 308 to a positive potential, e.g. 0 volts. The resistance values are scaled such that the wiper arms of the potentiometers, i.e. lines 9 and 11, respectively, traverse a voltage range corresponding to the desired temperature range of the potentiometers, e.g. 49° to 99° F. The voltage range is determined by the indoor temperature sensor and bridge circuit. The temperature reference potentiometers comprise nonvolatile storage means and prevent loss of this reference data in case of power failure.

The indoor temperature sensor circuit of FIG. comprises thermistor 314, calibration potentiometer 316 and resistor 318 connected serially between the source of negative potential and line 12, which is connected to input/output control 10. The control 10, responsive to the output of register 1 periodically connects line 12 to a positive potential, e.g. 0 volts. This connection is made only during the time that a temperature reading is actually being made, e.g. for a duration of about 100 microseconds during each time, e.g. 2 seconds, when indoor temperature is sensed. Accordingly there is a very low thermistor energization duty cycle. The thermistor being energized for substantially less than 1% of the time does not selfheat and output errors due to self-heating are avoided. The junction of thermistor 314 and calibration potentiometer 316 is connected via indoor sensor line 13 to the control 10 for coupling to input 16 of comparator 18. The values of the calibration potentiometer 316 and of resistor 318 are selected such that the voltage on line 16 for any given temperature can be adjusted to compensate for variations in the resistance of the thermistor 314 from its nominal value. This is done by calibration in a controlled temperature environment.

Figure 8:
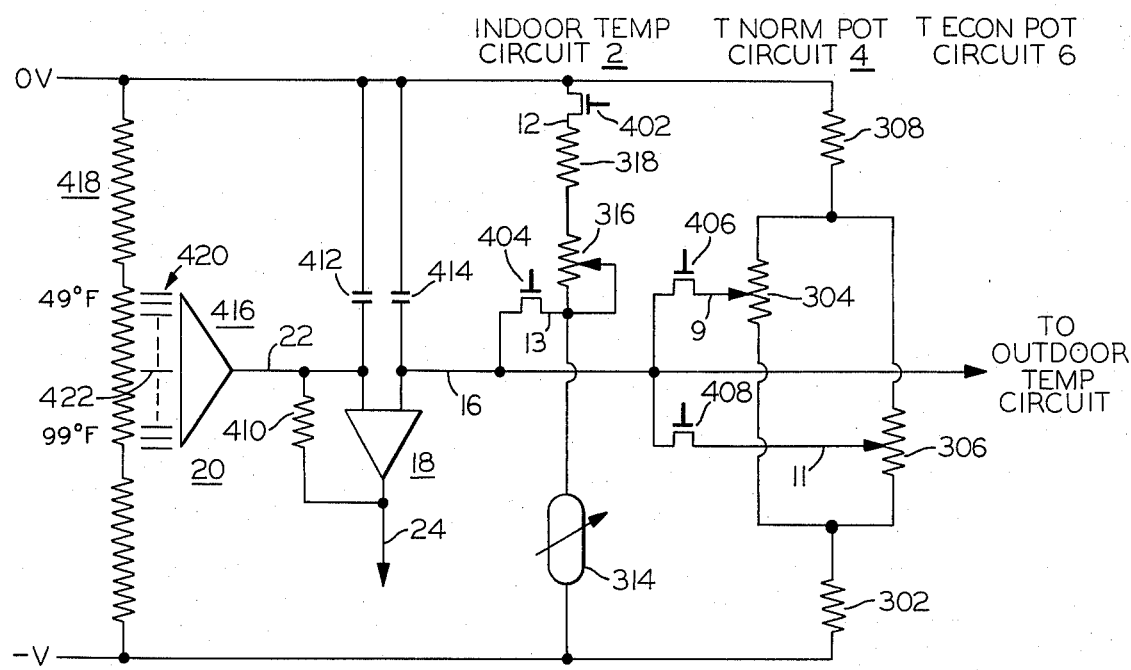
FIG. 8 is a schematic diagram of indoor temperature and reference potentiometer input, D to A converter, and comparison circuits.

FIG. 8 illustrates the analog bridge and comparison arrangement. The D/A converter 20 is illustrated as a tapped resistor D to A converter whose output is selected by the BCD coded temperature value in registers 3 and 4, illustrated in FIG. 3. A semiconductor, i.e. long P diffused, resistor 418 is connected from the positive voltage (e.g. 0v.), to the negative voltage (e.g. −15v.). A plurality of taps 420 are connected at equally displaced increments along an intermediate portion of the P diffused resistor. Each of these taps is connected through an MOS transistor to converter output line 22. The outputs of registers 3 and 4 are supplied to a decoder to actuate the appropriate one of the MOS transistors so as to couple one of the taps to output line 22. For simplicity, the MOS transistors and decoding network are not illustrated but are schematically illustrated by control 416. The preferred arrangement provides analog output signals variable in one degree increments from 49° to 99° F. Thus there are fifty taps on the P diffused resistor connected through fifty MOS transistors to the output line. These fifty tap points are selected such that their respective output voltages correspond to the voltages produced at one degree F. temperature increments between 49° F. to 99° F. produced by output lines 9, 11 and 13. The decoder is designed so that the BCD value of the temperature value stored in registers 3 and 4 selects the appropriate analog value. FIG. 8 also illustrates the previously described indoor temperature circuit 2, normal temperature potentiometer circuit 4 and economy temperature potentiometer circuit 6. Their respective output lines 13, 9 and 11 are coupled through MOS transistors 404, 406 and 408, respectively, to the other input line 16, of comparator 18. These transistors, in input/output control 10, can thus be selectively actuated to place these respective bridge arms in the bridge circuit and provide for comparison of the reference value of the D to A converter with each of the indoor temperature, normal and economy temperature potentiometer values. During intervals when indoor temperature will be sensed, MOS transistor 402 is gated on to connect indoor switch line 12 to the source of positive potential.

The outdoor temperature sensor circuit is utilized in respect to the power defer cycle. Outdoor temperature is compared at widely varying temperatures. These could conceivably range, from −40° F. to 110° F. Because the output of a thermistor is highly non-linear, the preferred embodiment detects outdoor temperatures at only a plurality of specified temperature levels. This avoids complex linearizing arrangements. The preferred embodiment utilizes four outdoor temperature points. Two of these indicate whether the power defer cycle is to be initiated. One temperature trip point (lo trip) relates to whether the power defer cycle is to be initiated in the heating mode. The power defer cycle may be initiated in heating mode if the outdoor temperature is below a predetermined value, e.g. below 25° F. Another temperature trip point (hi trip) relates to whether the power defer cycle may be initiated in the cooling mode. The power defer cycle may be initiated in cooling if the outdoor temperature is above a predetermined value, e.g. above 85° F.

The other two temperature points relate to an arrangement for avoiding defeat of power defer cycle by the user resetting of the time clock. Those temperature trip points are utilized to prevent front panel modification of clock time during predetermined temperature ranges. One of these trip points (lo lock) is used to prevent user resetting of the time clock when temperature is below a predetermined value, e.g. 35° F., in the heating mode and the other, hi lock, is used to prevent time clock readjustment when the outdoor temperature is above a predetermined value, e.g. 75° F., in the cooling mode.

Accordingly the outdoor thermistor is sequentially connected in series with four different bridge arm resistances and the bridge arm output is in each case compared to a fixed reference voltage, e.g. corresponding to 74° F., supplied by the D/A converter. Thus, the comparator 18 output sequentially provides an indication of whether the outdoor temperature is above or below the predetermined trip point and lockout temperatures.

FIG. 7c illustrates outdoor temperature sensing circuit 8. The outdoor thermistor, not shown in FIG. 7, is connected from a source of negative potential to resistor 320. The other terminal of resistor 320 is connected to four circuits comprising respectively resistor 324 and hi trip switch line 334; resistor 326 and lo lock switch line 336; resistor 328 and hi lock switch line 338; and resistor 330 and lo trip switch line 340. These lines, connected to input/output control 10, are selectively connected by control 10 to a source of positive potential, e.g. 0 volts. The common output comprises outdoor temperature line 15 connected via resistor 322 to the junction of resistor 320 and the above referenced resistors. Outdoor temperature line 15 is periodically connected via control 10 to line 16 of comparator 18.

Figure 9:
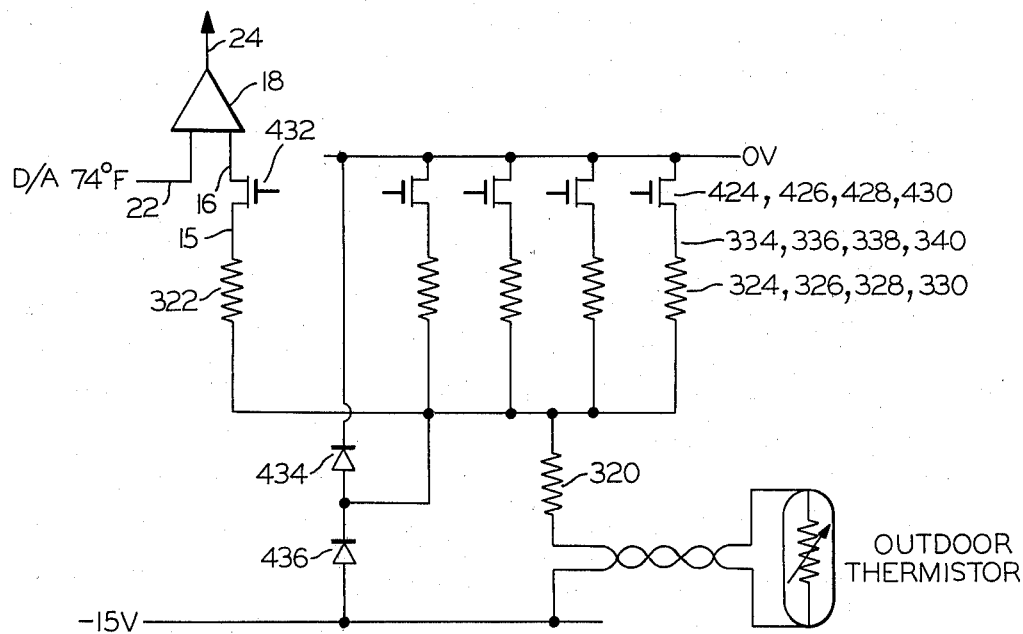
FIG. 9 is a schematic diagram of the outdoor temperature circuit.

FIG. 9 illustrates the outdoor temperature sensing arrangement, including the outdoor thermistor and the above described resistors and connection lines. Lines 334, 336, 338 and 340 are connected to the positive potential, e.g. 0 volts, via, respectively, MOS transistors 424, 426, 428 and 430. Outdoor temperature line 15 is connected via MOS transistor 432 to comparator input line 16. These MOS transistors are contained in the input/output control 10.

The MOS transistors 424, 426, 428 and 430 are sequentially gated on so as to supply the 0 volt potential to lines 334, 336, 338 and 340, respectively, and transistor 432 is gated on within the time interval when any of these transistors are gated on so that the outdoor temperature sensor signal is coupled from line 15 to comparator input line 16. During such time intervals a predetermined reference voltage corresponding to a fixed temperature value, e.g. 74° F., is applied to the other input line 22 of the comparator. This is provided by coupling a predetermined one of the D to A converter taps from resistor 418 to line 22. In FIG. 8 line 422 represents this tap. In the peferred arrangement the trip point and lock out temperature values are thus obtained by appropriate selection of the resistance values of resistors 324, 326, 328 and 330 and by utilizing one common reference value on comparator input line 22. This provides high accuracy and simplifies the outdoor temperature measurement, in respect to the alternate arrangement which would utilize a single resistor network for all trip and lock out points, but would utilize different reference voltage values for each trip and lock out point.

A distribute routine arrangement provides for sequentially energizing each of the outdoor resistance lines 334, 336, 338 and 340 for a first predetermined time period, e.g. 1 second, and for connecting the outdoor sensor line 15 to the comparator for a short predetermined time period, after the resistance line has been energized. This arrangement assures that the voltage value on the outdoor sensor lines has stabilized prior to the comparison being made. This pre-energization avoids drifting problems which would otherwise be encountered because of the time constants associated with charging the capacitance of the long lines extending from the control to the outdoor thermistor. FIG. 9 also illustrates protective diodes 434 and 436 which are connected to remove undesirable noise, i.e. excursions outside of the supply voltage.

Comparator 18, illustrated in FIG. 8, includes a feedback resistor 410, connected from output line 24 to input line 22, which provides an appropriate value of hysteresis, e.g. a fraction of the potential difference between the voltage between successive taps of the D to A converter. Additionally capacitors 412 and 414 are connected from each input line of the comparator to the voltage supply. These capacitors in association with the resistances of the input transistor switches constitute a filter network that prevents the comparator input signal from changing drastically during the actual measurement period. This provides stability to the switched comparator circuit and makes it relatively immune to system noise.

The above outdoor temperature arrangement is utilized to enable the power defer cycle under conditions when outdoor temperature is below the lo trip value, or is above the hi trip value. Under these conditions a power defer signal is generated that is adapted to enable power defer operation. (In actual practice the sensor being open or shorted produces the same effect to prevent defeat power defer by disconnection of the outdoor sensor.) In the preferred embodiment this signal constitutes a flag, ES-1, set to a high stage.

During the presence of this power defer signal, the controlling temperature, i.e. set point value can be modified in respect to the normally applicable reference values so as to effect power defer operation. As described later the set point can be modified, e.g. ramped in desired directions and rates, to reduce the load of the ambient temperature conditioning means with minimal user discomfort, in accordance to digital data stored in time prom 52. The time prom 52 stores a plurality of blocks of digital data each defining operation during one of plural contiguous real time periods. A real time clock and look up arrangement causes the data of the current real time period to be stored in the RAM of processor 36. Thus the set point signal may be modified during presence of the power defer cycle to modify the set point value which is compared with sensed indoor temperature in accordance to the digital data stored in the currently effective block. In the preferred embodiment the set point signal can thus be modified only during predetermined time intervals, specified by time prom 52, extending about the time intervals when a peak load demand may be anticipated.

Since power defer operation occurs only during specified time periods, the power defer cycle might be defeated by front panel readjustment of the time clock. This is avoided by preventing clock setting responsive to outdoor temperatures being below low clock block or above high clock block values.

Figure 25:
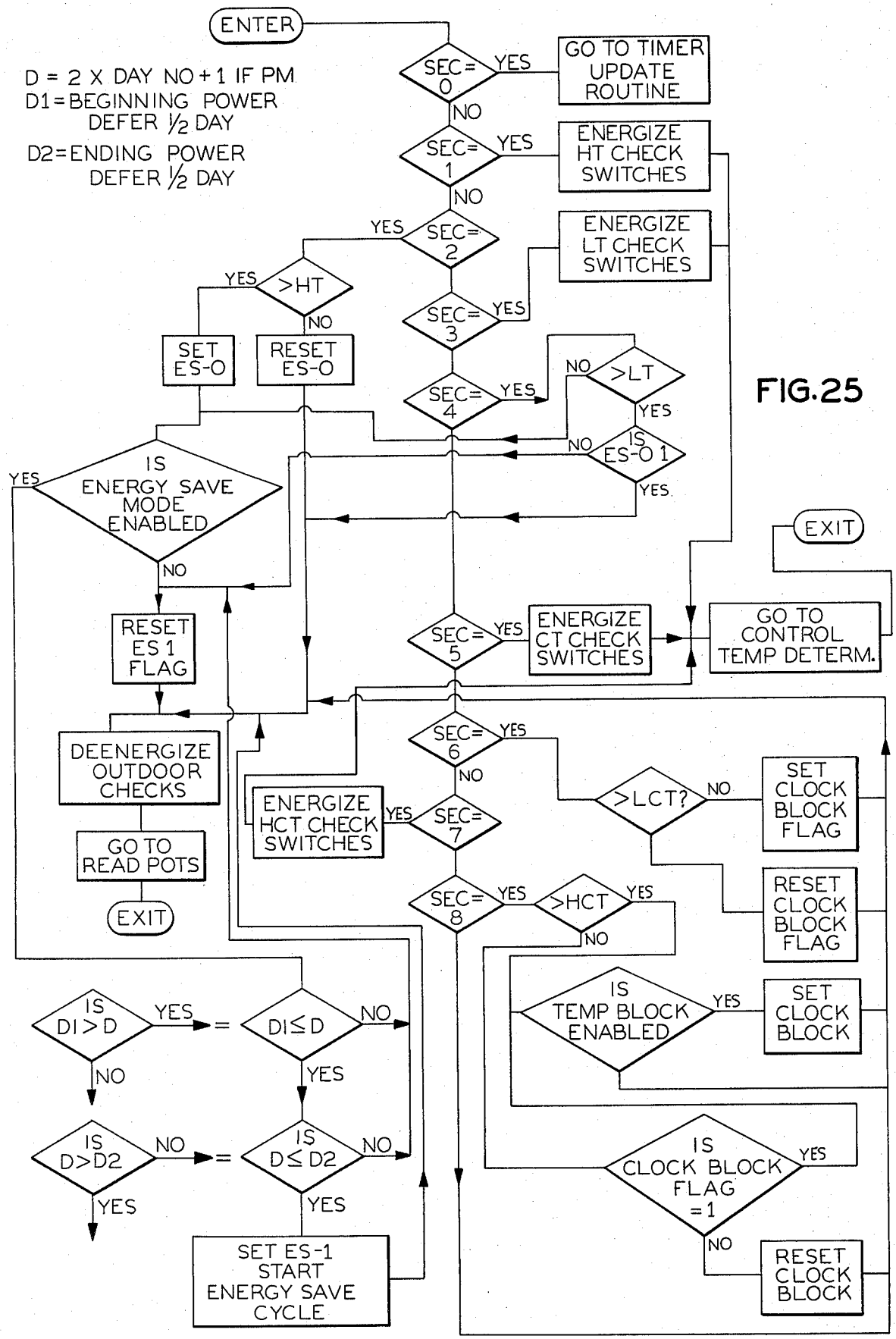
FIG. 25 is a flow chart of a distribute routine useful for making periodic measurements of outdoor temperature.

The four outdoor temperature checks are sequentially made over an extended, i.e. ten second, time period, because of the one second pre-energizing time prior to each temperature check. The outdoor temperature distribute routine is as follows. At commencement of the first second, energization of the high trip circuit commences, i.e. transistor 424 is gated on such that energizing potential is applied to the circuit including line 334, resistors 324 and 320 and the outdoor thermistor. One second later, i.e. commencement of second number 2, transistor 432 is briefly gated on such that the outdoor temperature signal is briefly coupled via resistor 322, and line 15 to input line 16 of comparator 18. If the second outdoor temperature signal exceeds the high trip value as flag, ES-1, is set. This initiates the power defer cycle operation under conditions described later. Thereafter transistors 424 and 432 are cut off so as to remove energization and coupling of the outdoor thermistor to the comparator. At commencement of the third second and low trip circuit is similarly preenergized, and at the fourth second the outdoor temperature signal is briefly coupled to the comparator. This detects whether outdoor temperature is below the low trip value, and in such event similarly sets the ES-1 flag for power defer operation during the heating mode operation. The low limit clock block circuit is pre-energized during the fifth second, and a determination of whether outdoor temperature is below the low lock value is made at commencement of the sixth second. Similarly the high limit clock block is energized during the seventh second and a determination of whether outdoor temperature is above the high lock value is made at commencement of the eight second. The actual temperature comparisons are thus made at the commencement of every even second. The above described routine is illustrated in FIG. 25. The previously described indoor and temperature potentiometer determinations are made during every even second, after the outdoor temperature measurement has been completed. Certain control temperature determinations relating to set point and offset temperature, described subsequently, are made during the odd second intervals during which the outdoor thermistor is pre-energized.

COMPONENT INTERCONNECTIONS AND TIMING SIGNAL GENERATIONS

Figure 11:
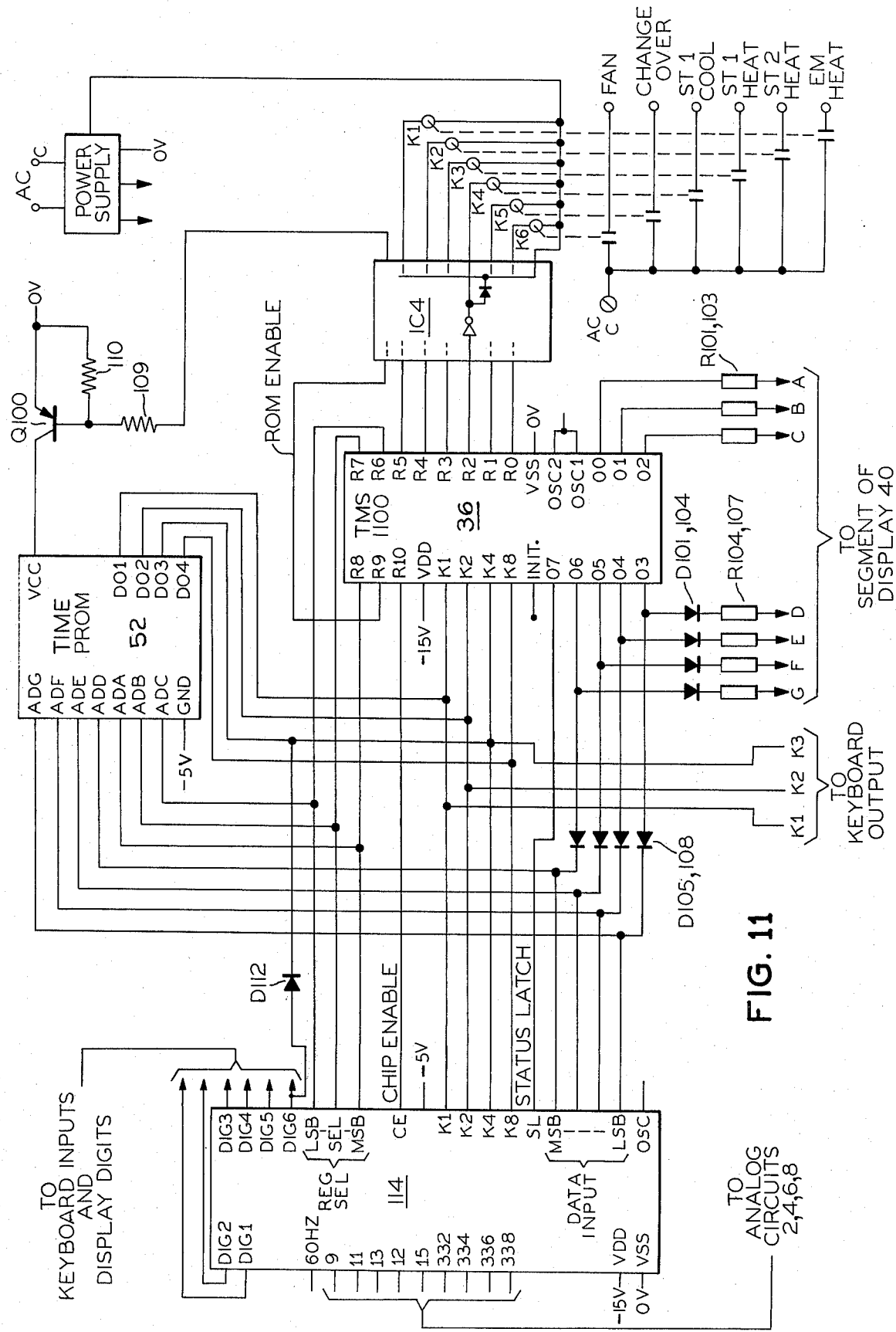

FIG. 11 further illustrates the interconnections of the components shown in FIG. 3. The components performing certain analog conversion functions, generating timing signals and controlling multiplexing of the displays comprising registers 1 through 5, analog input-/output control 10, D to A converter 20, comparator 18, exclusive OR circuit 26, multiplex circuit MUX 30, register select decoder 50, digit decoder 44, mode control decoder 48 and timing signal generator 46 are, in the preferred embodiment, incorporated in a custom integrated circuit. The latter circuit is identified as 114 in FIG. 11.

The processor 36 of the preferred arrangement, is a TMS 1100 four-bit microcomputer. In this application its oscillator is running at about 300 kHz providing an instruction cycle time of about 20 microseconds. This oscillator frequency is determined by a 50K register and 47 pf capacitor, not illustrated. This oscillator signal is also utilized on the custom citcuir 114 where the 300 Kc signal from the capacitor resistor junction is squared up and divided down to provide a basic clock that is equal to one instruction cycle time. The power up reset for the microcomputer is on a line labeled INIT. The power up reset delay is accomplished by a resistor internal to the TMS-1100 and by a capacitor connected to 0 volts. The INIT line is also serially connected by a resistor and diode (not illustrated) to a negative voltage. These devices are there to enable the capacitor to be discharged when the power supply collapses. The resistor inhibits this discharge for very sharp spikes on the power supply that are less than the hold time for the memory in the microcomputer.

The communication lines to and from the TMS-1100 have previously been described. As explained the four input lines K1, 2, 4, 8 to the processor are shared for the communication from the multiplex circuit 30 of the custom circuit 114, the time prom 52, and the inputs of keyboard 34.

The 0 outputs from the TMS-1100 microcomputer are utilized to drive the segments of the seven segment display 40, to provide the communication channel to the registers 1-5 of the custom integrated circuit, and also to provide part of the address to time prom 52. Because the reverse breakdown of the diodes in the LED display is so low, the 0 lines which are used for communication purposes require isolating diodes D101 through D108. Diodes 105 through 108 couple BCD coded data from the microcomputer 0 lines 0-3 through 0-6 to the registers of the custom circuit. The registers R101 through R107 which are in series with the 0 lines to the LED display, are current limiting resistors that limit the display current in each segment, e.g. below 2 ma.

The R output lines R-0 through R-5 from the TMS-1100 are applied to IC-4 which is a ULN 2002 relay driver. The output of IC-4 drives relays K1 through K6 to provide six independent outputs intothe ambient heating/cooling system. The contactors of these relays are illustrated as being connected from a common AC terminal, AC-c, to the appropriate relay outputs: fan, change over, Stage 1 - cooling, Stage 1 - heating, Stage 2 - heating and emergency heat. If desired, however, there may be a separate common for the heating system and a separate common for the cooling system. Each relay output is bridged by an MOV device (not illustrated) to limit the inductive spikes which appear across the relay contacts responsive to opening and closing the contactor loads. The relay driver incorporates a fly back diode circuit in its output which provides protection from the inductive relay loads.

Output 0-7 provides the status latch output from the TMS-1100. This line is connected to mode control decoder 48 of the custom circuit and specifies when BCD data is present on the other 0 output lines. Output R-10, the chip enable line, also connected to mode control decoder 48 of the custom integrated circuit, specifies when the TMS-1100 desires information. Output line R-9, the ROM enable line, goes to IC-4 for inversion. From IC-4 it is connected to resistor R109 which is serially connected through resistor R110 to 0 volts. Transistor Q100 has its emitter connected to 0 volts, its collector to pin VCC of time prom 52, and its base to the junction of resistors R109 and R110. When R-9 is energized, transistor Q100 is gated on and in turn energizes prom 52. If desired, e.g. for high volume applications, a non-programmable read only memory, ROM, may be utilized instead of the programmable memory. Also such memory can be an integral part of the custom integrated circuit. The R-9 ROM enable line, would in such case connect to a ROM enable input on the custom integrated circuit. The R lines R-6, R-7 and R-8, called the register select lines, are coupled to register select decoder 50 of the custom circuit and are used to communicate the number of the register to which information is to be sent. In addition, these lines are coupled to prom 52 to supply the three most significant bits in the prom address.

In summary, custom integrated circuit 114 includes the five 4-bit registers, illustrated in FIG. 3, that are used to hold set-up information from the microcomputer. Register 1 controls the analog input signal that is being measured. Register 2 controls the sense of the comparator output signal applied from line 28, via multiplexer 30 to the K4 line input of the processor. Registers 3 and 4 contain a BCD number that corresponds to the temperature being compared with the analog input temperature. Register 5 contains the digit number of the digit currently being displayed on the LED display. These registers are addressed via the three select lines R-6 through R-8 from the microcomputer. The data being transferred to the registers come in on the data input lines 0-3 through 0-6 from the microcomputer. The strobe to read the data into these registers occurs when the mode line, that is the status latch, chip enable and ROM enable lines, are in the proper state to indicate that data is being transmitted to the custom chip.

The communication from the custom chip back to the microcomputer occurs over the data output lines. These lines go into the K inputs. Since the time prom and the keyboard share these K inputs, the output multiplexer from the custom integrated circuit must provide the correct electrical interface at the proper time to enable these devices to communicate to the microcomputer as well. This information is on the mode control lines 0-7, R-9, R-10 and it enables the custom chip to have the correct electrical output on lines K1, 2 and 8 at the appropriate times.

In order to provide for a regulator multiplexing of the LED displays, it is necessary to have an external counter which provides a time base for this regular switching from digit to digit on the display. In order not to have a noticeable flicker in the display it is desirable to have this regular switching between the digits occur on a 2 to 3 millisecond time frame. Since the microcomputer is running at an instruction rate of about 20 microseconds, this corresponds to about 120 instructions which can be executed between the updating of the displays. In order to multiplex the a tight loop of less than 120 instructions is used to update the display, read the keyboard, and synchronize the system back on a transition of the timing generator clock signals. The processor 36 is in this one basic loop for the greater majority of time. The remainder of the program that accomplishes all of the decisions, updating and so on, is entered either once a second or once every 10th of a second.

Figure 10:
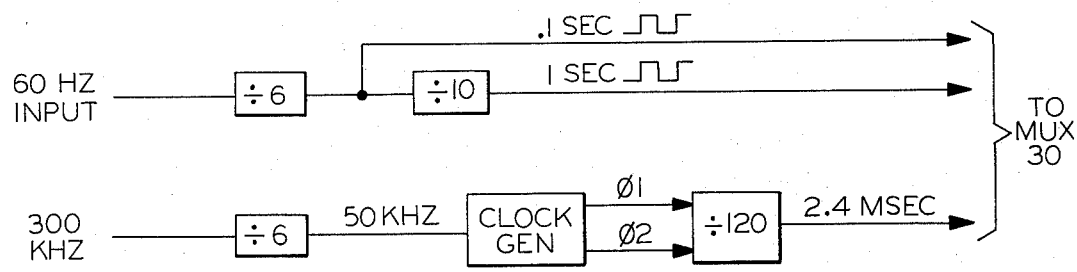
FIG. 10 is a block diagram of the timing signal generator.

The above referenced timing signals are produced by timing generator 46 incorporated in the custom integrated circuit. This is illustrated in FIG. 10. The 2.4 ms squarewave is generated as follows. The 300 Kc basic oscillator frequency, of the TMS-1100 processor is divided by six. The resulting 50 kHz signal is supplied to a clock generator that generates a two-phase clock at about 50 kHz rate. This two-phase clock is fed into a shift register divider that divides by 120 to provide the 120 instruction cycle time reference frequency. This reference frequency of about 2.4 milliseconds is supplied to MUX 30 for transmission to the K8 input line to the processor. This basic reference frequency must be available to the microcomputer at all times so the K8 line receives this reference frequency, except when the microcomputer is receiving information from time prom 52. For this reason keyboard lines are connected only to K lines 1, 2 and 4, but not the K8 line.

The other time base into the custom chip is the 60 Hz line frequency. As illustrated in FIG. 10, this line frequency is divided by six to provide a tenth second time base. The 0.1 second pulses are coupled via MUX 30 to line K2 solely to debounce the pushbutton switches on the keyboard. As also shown in FIG. 10 this tenth second time signal is also divided by 10 to provide a 1 second time base which is coupled via MUX 30 to the K1 line and is generally used as a basic time input.

Figure 12:
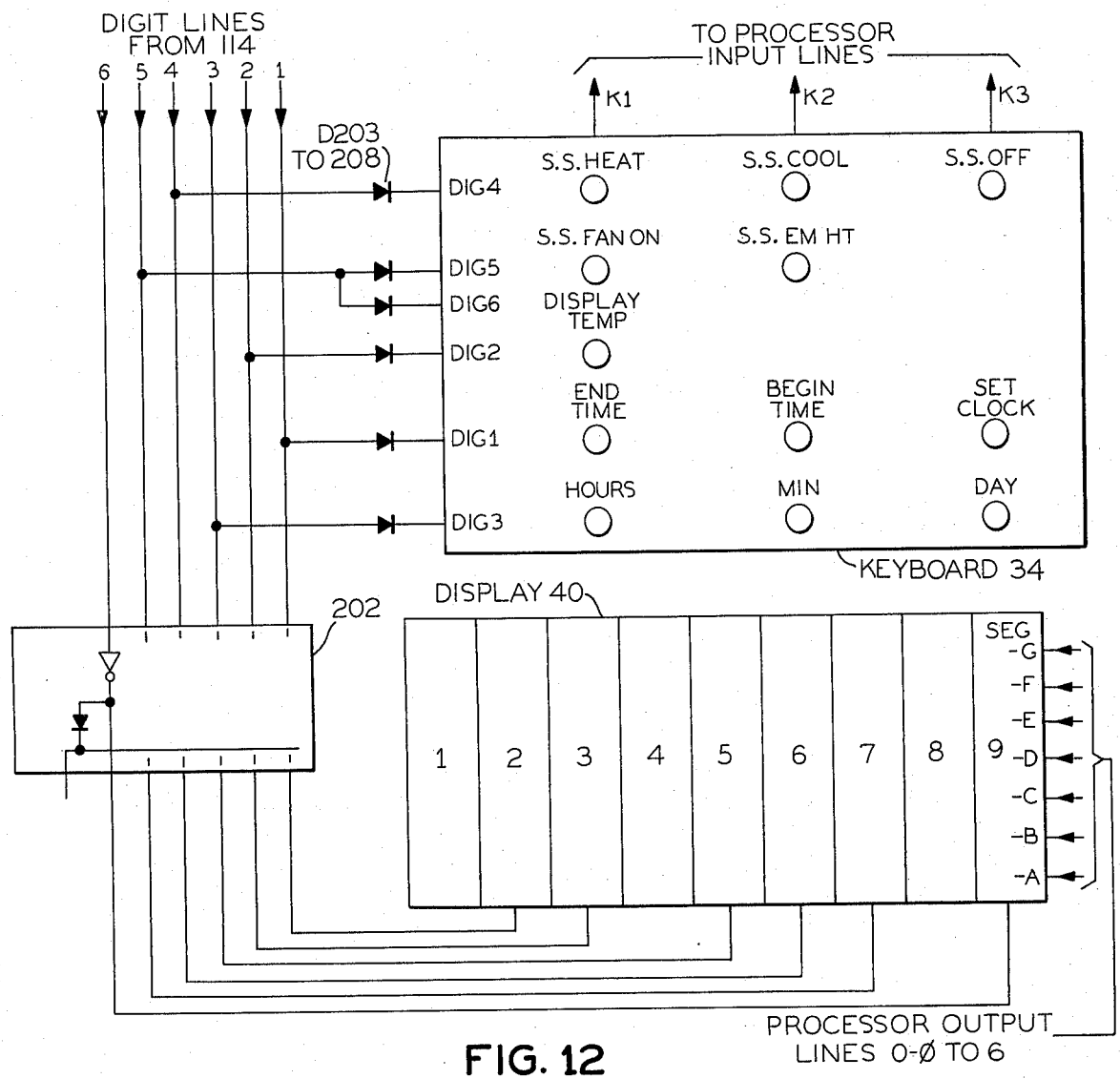
FIGS. 11 and 12 are system interconnection diagrams.

FIG. 12 illustrates display 40, keyboard 34 and their interconnection with the other components of the system. The processor 0 lines φ through 6 are connected, respectively, to segment lines A through G of the display through current limiting resistors R101 through R107 (shown in FIG. 11). The digit lines 58 from digit driver decoder 44 of the custom integrated circuit 114, designated as DIG 1 through 6 in FIGS. 10 and 11, are connected through digit driver 202 to the individual digit lines of the display 40. The digit driver is a ULN 2002 relay driver bipolar integrated circuit containing inverter drivers. The input circuits of this device contain a current limiting arrangement, including a Zener diode and input resistor. The current limiting provides appropriate interfacing with the open drain outputs of the TMS-1100 and the custom integrated circuit.

The above described digit lines are also connected via diodes 203 to 208 to appropriate matrix lines of keyboard 34. FIG. 12 identifies the keyboard buttons and their locations in respect to the orthogonal matrix lines of the keyboard. Some of the buttons are associated with the slide switches, illustrated in FIG. 1. Accordingly one or more of the slide switch buttons will be energized continuously. Accordingly isolation is required between buttons that may be simultaneously actuated, i.e. continuously activated slide switch buttons and buttons that are simultaneously pushed during operation of the system, e.g. time function buttons. Diodes 203 to 208 provide this digit-to-digit isolation. The output of the keyboard is supplied via K1, 2 and 4 lines to the processor. Diode D112 interconnects the digit line 6 output of custom circuit K4 and the K4 line of the processor as shown in FIG. 11. When this diode is thus connected, the clock output is displayed continuously. If it is removed the clock is displayed only on demand, i.e. when the set clock button is pushed.

TEMPERATURE SET POINT CONTROL AND POWER DEFER OPERATION

The following describes temperature set point selection, i.e. control temperature determination. This is illustrated in FIG. 29. As previously described the system generates digital signals representative of sensed indoor temperature, T-normal potentiometer and T-economy potentiometer values. The digital signals are processed to generate a controlling temperature, i.e. set point, signal, which is stored in the RAM of processor 36. Control of the ambient temperature conditioning means is based on comparison of the indoor temperature and the controlling temperature.

Figure 6A:
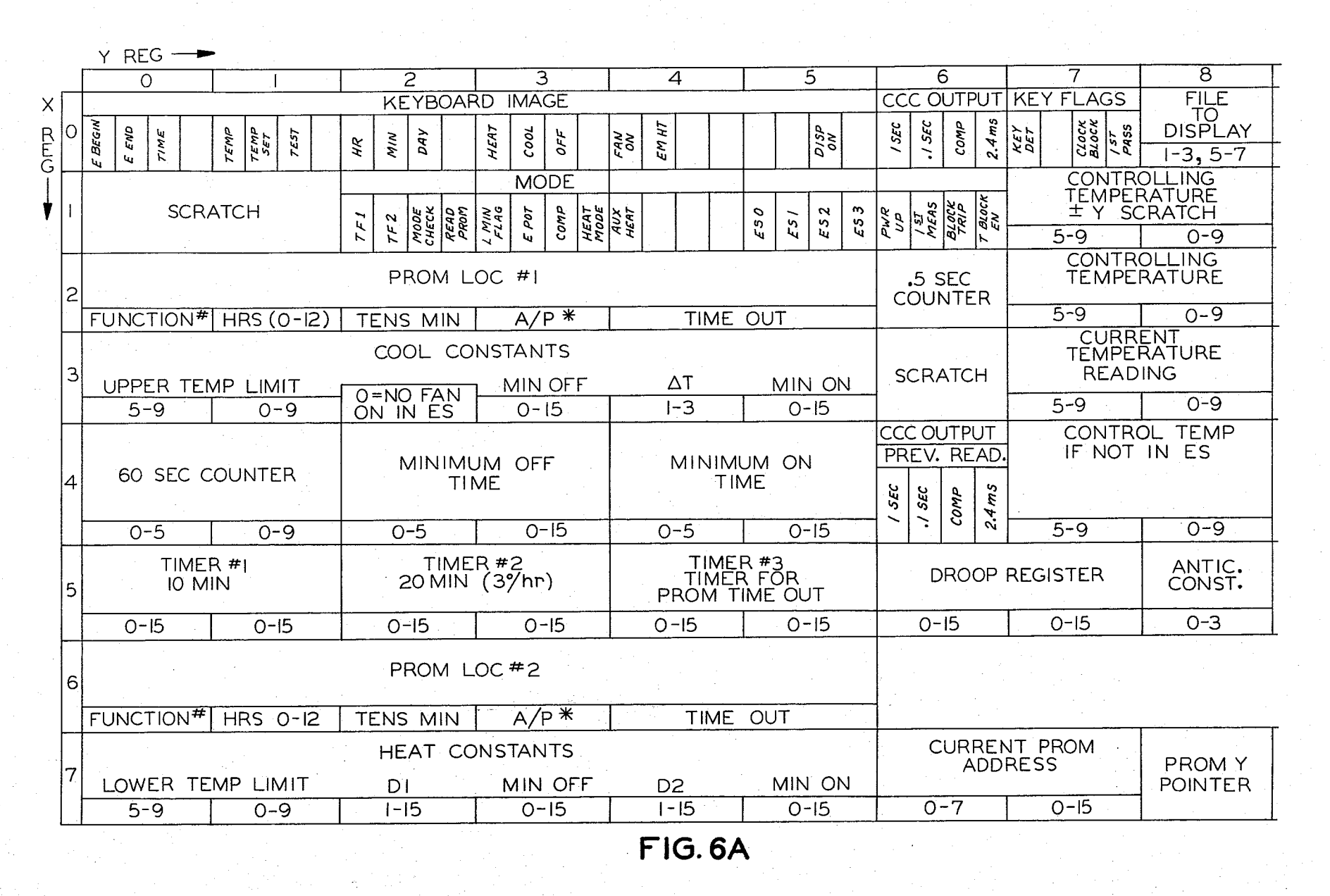

The RAM memory map is illustrated in FIGS. 6A and 6B. Briefly the RAM memory of the TMS-1100 processor stores relevant digital data in predetermined address locations. The stored data consists of 4-bit words, and in the preferred embodiment, temperature values are stores in the BCD form. There are 16 rows of words addressed by the Y register of the processor, illustrated as horizontally extending words 0–15. These are 8 columns of "files" addressed by the X register of the processor, illustrated as vertically extending files 0–7. The location of the digital data, i.e. words, stored in the memory can thus be defined by the vertically extending X file number and the horizontally extending Y word number. For example, the BCD sensed indoor temperature identified as "current temperature reading" is stored in location X3; Y7-8 of the memory map illustrated in FIG. 6A.

During intervals when there is no power defer cycle operation the controlling temperature, i.e. set point, value is directly derived from the reference potentiometer, i.e. the value of the T-economy potentiometer during the economy cycle period, and otherwise the value of the T-normal potentiometer. The reference value is stored in a first, i.e. intermediate, control temperature register of the RAM. This register, identified as "Control temperature if not in energy save" and abbreviated as "TCNES" is located at X4; Y7-8. The appropriate reference potentiometer value, i.e. T-economy pot during the economy cycle time, and the T-normal pot signal during other times, is stored in two digit BCD form in the TCNES register. There is a second register, the controlling temperature register, abbreviated as "T-control", located at X2; Y7-8. This stores the set point signal, also in two digit BCD form, which is eventually compared with the sensed indoor temperature signal to control the ambient temperature conditioning means. During intervals when there is no power defer operation the content of the TCNES register is generally directly transferred to the controlling temperature register, and the set point signal corresponds to the value in the TCNES register.

During the power defer cycle, the reference value in the TCNES register is not transferred to T-control but the value in T-control is modified by the control and the modified T-control is used as the set point value.

Figure 29A:
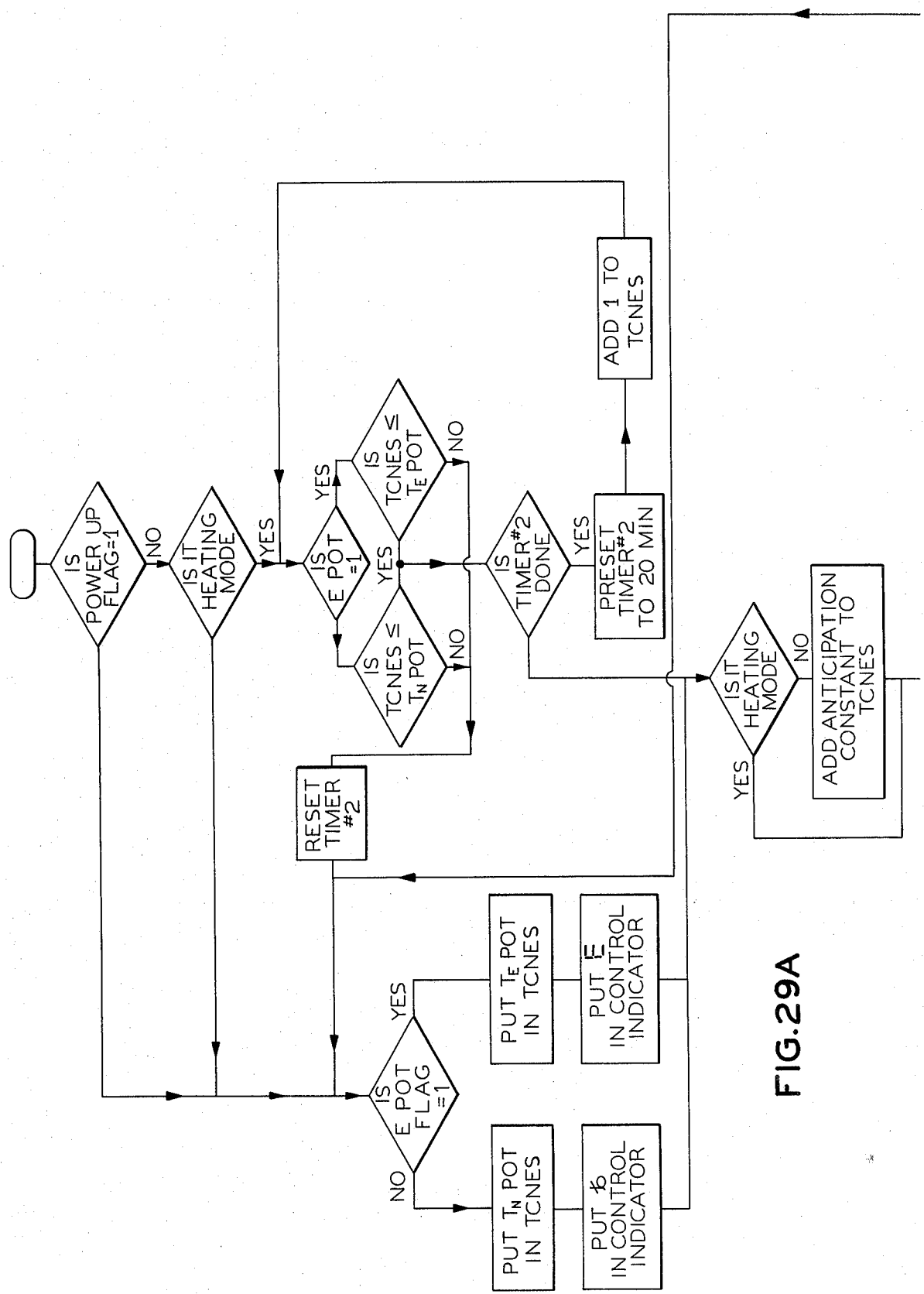
FIGS. 29A and 29B comprise a flow chart of a routine for deriving a control temperature value.

FIG. 29A illustrates how the appropriate reference signal, i.e. T-normal pot or T-econ pot is sequentially stored in the TCNES register, i.e. the manner in which the TCNES register is repetitively updated. For example, the reference signal will change when the user changes the setting of the relevant temperature reference potentiometer, or when the reference value switches between the T-normal and T-economy potentiometer values at the beginning and end of the economy cycle.

Provision is made to limit the rate at which the value stored in TCNES is increased, when the system is in the heating mode. This is used in controlling heat pump systems with supplemental resistance, i.e. second stage, heating. Resistance heating is less energy efficient than using the heat pump. Therefore it is desirable to minimize resistance heating by limiting the rate at which the controlling, i.e. set point, temperature is increased during the heating mode, due to increases in reference temperature to a rate that can be accommodated by the heat pump, e.g. 3° F./hour. This is achieved by limiting the rate at which the TCNES value is increased in the heating mode, as illustrated in FIG. 29A.

When the value in the TCNES register is to be updated, the previously stored value in TCNES is compared with the new reference temperature potentiometer value. If the new reference temperature value exceeds the stored TCNES value, the TCNES value instead of being immediately updated to the new value is ramped up at the desired rate, e.g. 3° F./hour which is equivalent to one degree for every twenty minute interval. Accordingly a timer #2, in RAM register X5, Y2-3, is counted down from the desired time interval, e.g. 20 minutes, between one degree temperature increments, to zero. When the timer count has decremented to zero, the TCNES value is incremented by one degree and the timer is reset. This action continues until the TCNES value exceeds the current temperature value.

Figure 29B:
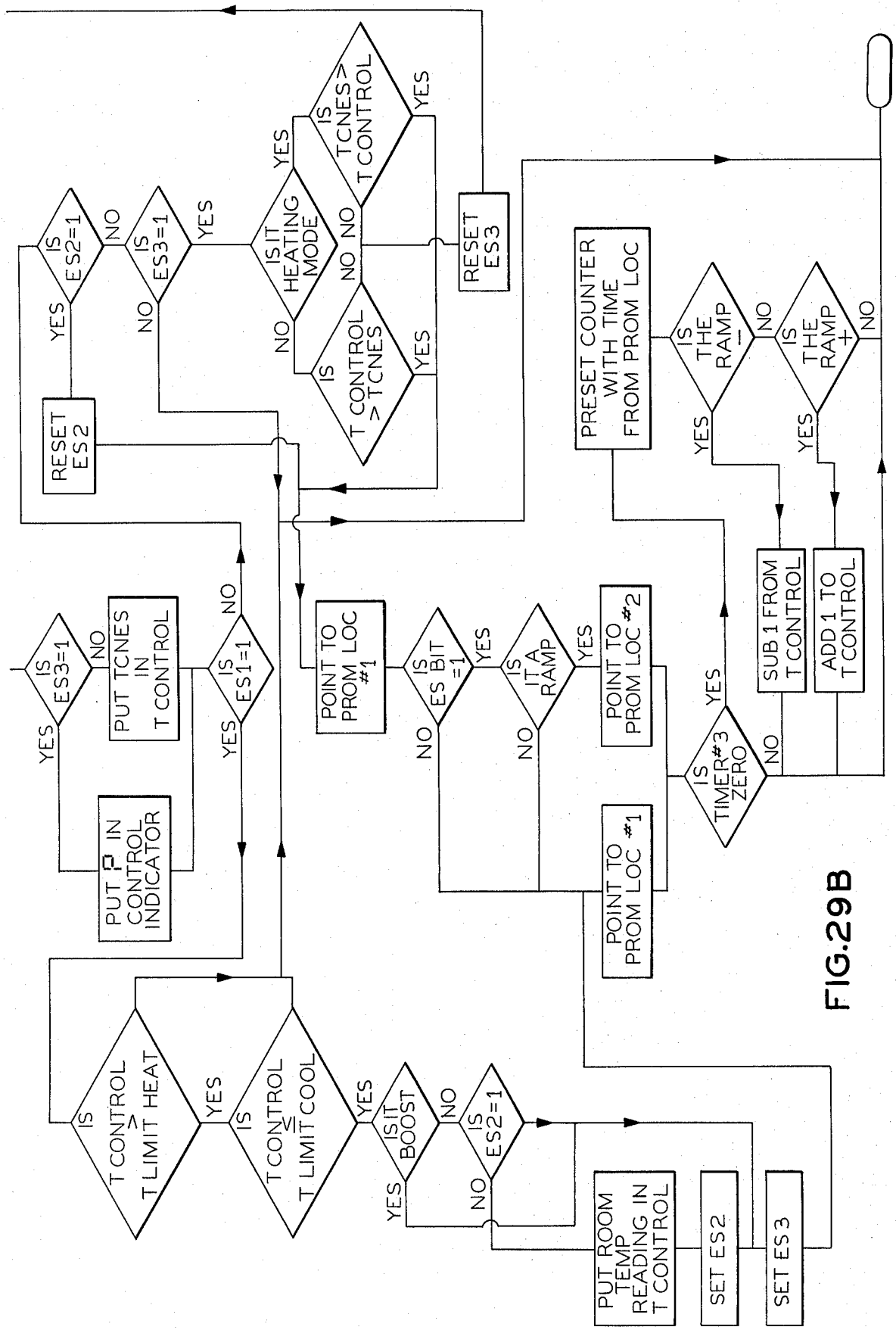

As illustrated at the top of FIG. 29B, the value in TCNES is placed into the controlling temperature register as long as the system is not in the power defer mode of operation. The state of a flag ES-3, stored in RAM X1, Y5, indicates whether the system is in power defer operation. During normal, i.e. non-power defer operation the ES-3 flag is zero, i.e. not one.

The system sequentially, i.e. every odd second, determines whether power defer operation is in effect or should be entered. During power defer operation the system modifies the controlling, i.e. set point temperature to reduce the electrical energy consumed by the ambient temperature conditioning means during intervals when there is peak load demand on the electrical supply system. This is accomplished with minimal discomfort to occupants of the room or building being conditioned by the latter means. The system provides for a controlled reduction of electrical load energy during the peak demand interval when power is to be reduced. This interval is termed the defer portion of the power defer cycle. During this time the set point value is modified in a direction to decrease energy consumption from that normally consumed inorder to maintain ambient temperature at the desired reference level. However, the rate at which the set point is modified, i.e. ramped, can be controlled. Thus the reduction of ambient temperature is controlled, instead of being governed by the heat transfer coefficient of the structure and by the differential between indoor and outdoor temperature. In addition the set point can subsequently be modified in the opposite direction at a controlled rate until the ambient temperature returns to the reference temperature value. This occurs subsequent to the defer portion, and is termed the recovery portion. Discomfort can additionally be reduced by preboosting prior to commencement of the defer portion. During the interval prior to defer, termed the boost interval, the set point can be modified in the opposite direction such that load energization is increased above that normally consumed to maintain ambient temperature at the reference level. Thus ambient temperature deviates from the reference temperature in a direction opposite to that encountered during the defer portion. The rate of set point variation during boost may also be controlled. The object of this is to store heat in the structure and its contents that can be utilized during the defer portion of the cycle. For example, in the heating mode boost and recovery may be in the order of a temperature increase of 3° F./hour. This provides for user comfort and additionally minimizes the need for auxiliary second stage heating. Such a rate is also applicable during defer, e.g. a temperature reduction of 3° F./hour in heating mode, and will prevent excessive drops of temperature in structures having a high K factor. The arrangement thus described includes three intervals: boost, defer, and return. In the heating mode, the ambient temperature is increased above the reference level during the boost interval. During the defer portion the ambient temperature is reduced to some value below the reference temperature. During the return portion the ambient temperature is gradually increased and returned to the reference temperature value. In the cooling mode, temperature is reduced below the set point during boost; increased during defer, and again decreased to the set point during return.

Figure 33:
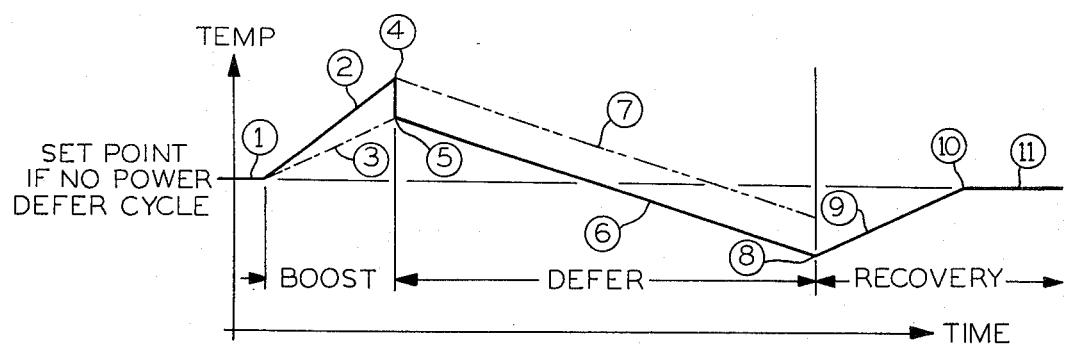
FIG. 33 is a graph illustrating a preferred mode of system operation including the variation of signals generated in the control system during the power defer cycle.

FIG. 33 illustrates a specific heating mode ramping arrangement of the type having boost, defer and recovery portions. The normal set point (T-control) and temperature values occurring before and after the power defer cycle are illustrated by line segments 1 and 11. During normal operation the value of T-control is equal to the value of TCNES. During the power defer cycle, the set point value, T-control, deviates from the value of TCNES. During boost the set point is ramped upward from the normal set point value at a controlled rate as illustrated by line 2. The dashed line 3 indicates the increase of ambient temperature. The arrangement of FIG. 33 contains a special, optional provision for modifying the set point value during the defer portion. Under normal circumstances the value of TCNES, and thus the set point value of T-control, is derived from the relevant reference potentiometer, e.g. the T-normal pot. Improper adjustment of the reference potentiometer could circumvent power deferral. The user could modify the setting of the reference potentiometer, e.g. increase the reference temperature in the heating mode. The deviation of line 2 above dashed line 3 is intended to illustrate such user readjustment of the reference potentiometer to a higher value. If such a readjustment is made the set point value, e.g. 4 of FIG. 33, at the commencement of the defer portion is increased above the intended set point value, e.g. 5. During defer the set point value would thus ramp downward from an improper value as illustrated by dashed line 7, instead of properly ramping as illustrated by solid line 6. Therefore energy consumption would not be sufficiently reduced. FIG. 33 therefore illustrates an arrangement for overcoming this problem. During the defer portion the set point temperature is derived from the sensed indoor temperature. Specifically, prior to the defer portion, the temperature reference potentiometer signal is stored in TCNES. Upon commencement of defer and during defer, the sensed indoor temperature value, instead of the reference temperature value, is stored in T-control. As illustrated in FIG. 33, the indoor temperature will have increased during boost to the value illustrated at 5.

At the commencement of defer this value is stored in T-control and downward ramping, as shown by line 6, occurs from this value. This arrangement provides for appropriate deferral. Upon termination of deferral at point 8, the set point is ramped upward, i.e. in the opposite direction, as illustrated by line 9 until the normal set point value is again reached, at point 10. Thereafter normal operation resumes.

The preferred embodiment can be utilized in various ways. For example set point variation is not limited to the combination of boost, defer or return or to have additional intervening increments during which no ramping occurs. Alternatively it may be desirable to enable the described type of power defer operation with an external signal derived from a source other than the outdoor thermostat, such as, for example, a radio signal. For example, the presence of such a signal could be used to initiate boost and defer operation in accordance to stored time prom 52 parameters, and the absence of the signal could initiate return operation.

The control system permits selection of appropriate set point variation during the power defer cycle. The set point variation is preselected by storing desired parameters in time prom 52. The time prom of the preferred embodiment, for example, stores 16 blocks of digital data each defining operation during a predetermined one of 16 contiguous time intervals. Some of these may define daily operation during heating mode, and the others define daily operation during the cooling mode. Each block has digital data defining the starting time of the block, and the mode, i.e. heating or cooling, and data defining desired set point modification during power defer.

The digital data of the block effective during the current time period is transferred and stored in RAM of the processor and provides the digital data determining operation during power defer. A real time clock assures that the digital data of the proper block is utilized during power defer operation. Specifically this currently effective block is stored in RAM X2, Y0-5 and is termed PROM LOC #1. The block which is to be subsequently used, i.e. having the next starting time, is transferred from prom 52 and stored in RAM X6, Y0-5 and is termed PROM LOC #2. The starting time of the latter is also stored as "ADJUSTED PROM TIME"; in the same format as the real time clock; in RAM X4, Y10-15 (as shown in FIG. 6B). A real time signal from a real time clock stored at X2, Y10-15 is compared with ADJUSTED PROM TIME, and starting time of the next block. When real time equals begin time of the next block the digital data of PROM LOC #2 is transferred to PROM LOC #1, and the next block stored in time prom 52 is transferred to PROM LOC #2. In the preferred embodiment the block of digital data defines whether there is to be ramping during the current time interval, and in the event of ramping defines the rate and direction of ramping. Thus the third and fourth bits of the function word specify one of the following: (1) no change, (2)+1° F. change, or (3)−1° F. change. In the case of positive or negative ramping, the set point is ramped one degree for every time interval defined by the last two words, "time out", of the PROM LOC digital data (X2, Y4, 5). Digital set point ramping is achieved by a counter, i.e. timer #3, (X5, Y4, 5) which is preset to the time interval, and is counted down. When this timer has counted down to zero the set point temperature is modified in accordance to the desired ramp change, i.e. for a +1° F. function word the set point is incremented by one degree, and for a −1° F. function word the set point is decremented by one degree. Accordingly the set point can be ramped up or down at a desired rate. For example, the previously referenced 3° F./hour rate corresponds to ramping one degree every 20 minutes, i.e. time out=20 minutes. The described arrangement is illustrated at the bottom of FIG. 29B.

The control temperature routine of FIG. 29 for modifying set point during power defer is now described. A determination is initially made of whether the system already is in the power defer cycle, evidenced by a flag ES-3=1. In such event the value of T-control is not updated with the values in TCNES, and an appropriate indication, e.g. "P" is entered in the display. If the system is not in the power defer, T-control is updated with the current TCNES value.

The relevant flags, ES-1, 2 and 3, are described prior to continuing the discussion of the program. A set ES-1 flag, i.e. the power defer signal from the outdoor temperature circuit indicates the power defer operation should be entered. If ES-1 is reset to zero, i.e. if the power defer signal is terminated, the power defer cycle should be terminated, such as by commencing the return portion.

The EX-2 flag is set, when the indoor temperature is transferred to T-control, at commencement of the defer portion of the power defer operation and remains set for the duration of the defer portion.

The ES-3 flag is set at the commencement of the power defer cycle and remains set until termination of the power defer cycle, e.g. until the set point returns to the value in the TCNES register.

The description of FIG. 29B now continues. A determination is made of whether the ES-1 flag is set. If it is, comparison is made of T-control and specified limit temperatures. To minimize user discomfort, power defer is not used if the controlling temperature is outside of predetermined limits (which may be stored in prom 52) e.g. if control temperature is below the limit temperature during heating mode or above the limit temperature during cooling. If T-control, i.e. the set point temperature is within these limits (and ES-1=1) the program implements power defer operation in accordance to the data in PROM LOC #1. The latter contains a bit specifying whether the set point should continue to be based on the TCNES value previously stored in T-control, as is done in boost, or whether the sensed indoor temperature should be transferred to T-control, for reasons previously described in connection with FIG. 33. If this bit indicates boost, i.e. no transfer, the ES-3 flag is set. If the bit indicates that a transfer should be accomplished, i.e. no boost, the current indoor temperature, in RAM X3, Y7-8, is transferred to T-control, and ES-2 is set indicating that such transfer has been accomplished. No further transfer is made while ES-2=1, i.e. during the defer period.

Subsequently modification of T-control, i.e. ramping, specified by the current block of digital data, i.e. PROM LOC #1 is effected as previously described. A pointer is set to PROM LOC #1. Whenever the counter, i.e. timer #3, has counted down to zero, the value in T-control is repetitively incremented, by one degree responsive to a positive rame command, repetitively decremented responsive to a negative ramp, or remains constant. The above described arrangement thus performs boost, defer and hold operations.

It should be noted that the program modes can specify ramps of desired direction and slope, and if desired zero slope. In the case of a zero slope, i.e. "hold", the controlling temperature remains unchanged.

The above discussion related to operation subsequent to a determination that the ES-1 flag is set, i.e. equals 1. Under these conditions the system is normally in the boost or defer portion. The following relates to operation in the event the ES-1 flag is reset, i.e. equals zero. The latter condition indicates that the system is either in the recovery portion of the power defer cycle, or has fully completed the power defer cycle. If the system is in the recovery mode, the controlling temperature value, in T-control, is ramped back to the normally controlling set point value stored in the TCNES register at a predetermined rate stored in the prom. When the T-control value attains the TCNES value, the power defer cycle is completed and normal operation is resumed. The ES-2 flag is reset upon completion of the defer portion, and commencement of a recovery portion, whereas the ES-3 flag is not reset until completion of any recovery portion. An arrangement for resetting the ES-2 flag whenever ES-1=0 is illustrated at the top right of FIG. 29B. A determination is made of whether the system is in the recovery mode, i.e. flag ES-2 is zero and flag ES-3 is one. This is illustrated at the upper right of FIG. 29B. If the system is in revovery, i.e. ES-2=0 and ES-3=1, a further determination is made as to whether recovery should be terminated and normal operation resumed. This occurs when the controlling temperature value in T-control has returned to the original set point value in TCNES. In the case of recovery in the heating mode the controlling value will have increased to the temperature value in TCNES. In the cooling mode, the controlling value will have decreased to the value in TCNES. This determination is made by initially determining whether the system is in heating, and in such event if TCNES is greater than T-control. A negative answer indicates that recovery is complete. Similarly, if the system is determined to be in the cooling mode, a determination that T-control is not greater than TCNES indicates completion of recovery. If recovery is indicated to be complete, flag ES-3 is reset. In such event the appropriate temperature set point potentiometer value is replaced into the TCNES register. An additional check of the flags is made to assure that recovery is truly completed.

If this comparison affirms that TCNES is greater than T-control in heating mode, or that T-control is less than TCNES recovery must still be completed. In such event provision is made for proper ramping. As illustrated in the center of FIG. 29B a determination is initially made of the state of the energy defer status, the flag ES bit (contained in PROM LOC #1). The purpose of this is explained subsequently. The ES bit flag is set in the time prom words for the boost and defer portions of the power defer cycle irrespective of the value of the outside temperature. Thus during "recovery" the ES bit should be zero, i.e. not 1. In such event ramping continues based on the parameters stored in the currently effective block of digital data, i.e. PROM LOC #1. The temperature value in T-control is thus ramped in the manner described previously. The above described ramping procedure will thus result in ramping the controlling temperature at the proper rate until recovery is completed when T-control=TCNES and recovery is completed.

An additional feature is now described which permits prompt transfer out of the energy defer mode into the recovery mode. This feature is useful under certain conditions when the power defer signal is discontinued, i.e. when the ES-1 flag changes from a 1 to a zero state. For example, a defer mode may be programmed over a long time period, e.g. 9 A.M. to 4 P.M. However, actual defer will take place only as long as the outdoor temperature is above or below a predetermined value, e.g. during heating if outdoor temperature is below a predetermined value, such as 24° F. Thus defer may be initiated at any time during the defer time period, e.g. 9 A.M. to 4 P.M., when outdoor temperature comes within the defer mode range, e.g. 24° F. or below. However, the outdoor temperature may vary sufficiently, e.g. rise above 24° F., to terminate defer at an earlier time, e.g. noon, long before the defer portion is time scheduled to terminate and recovery is scheduled to start. Under those conditions, recovery should commence immediately, e.g. at noon, prior to the time scheduled for transfer from defer to recovery, e.g. at 4 P.M. This is accomplished by the path, illustrated at the center of FIG. 29B, which is entered either upon reset of ES-2 or during recovery ramping prior to the T-control value having attained the value of TCNES.

The above described phenomena occurs when the current prom mode, e.g. in effect until 4 P.M., specifies power defer (ES=1) and ramping in the defer direction, and PROM LOC #2, e.g. to be initiated at 4 P.M., specifies no power defer (ES=0) and ramping in the recovery direction. Accordingly a determination is first made of whether the current block of digital data specifies power defer and ramping. The former is indicated by the state of the ES flag which is a bit in the PROM LOCK #1 function word (X2, Y0 bit zero), and the latter, i.e. ramping, is indicated by the state of the first and second bit in the PROM LOC #1 function word. If either of these conditions are false, i.e. ES is zero or there is no ramp, normal operation continues through the previously described ramp control arrangement under command of the digital data in PROM LOC #1.

If both conditions are true, i.e. the current block specifies power defer and a plus or minus ramp, provision is made immediately upon reset of the ES-1 flag, e.g. at noon instead of 4 P.M., to ramp the value of T-control in accordance to the program mode to be next instituted, e.g. scheduled to be instituted at 4 P.M. Accordingly T-control is ramped based on the slope specified in PROM LOC #2. Thus the counter of "Timer 3" is loaded in accordance to the "time out" duration of PROM LOC #2 (X6, Y4-5), and whenever the timer down counts to zero, the value of T-control is ramped in a direction determined by the slope stored in the function word of PROM LOC #2 (X6, Y0, bits 1 and 2). Thus under the above specified conditions termination of defer prior to the end of the time schedule for transfer from defer to recovery results in an immediate initiation of programmed recovery. For example, in the heating mode upon termination of defer, the control temperature is immediately increased at the rate specified in PROM LOC #2 until the control temperature attains the value of TCNES and normal operation is resumed.

This arrangement can be utilized in systems employing power defer signals from sources other than the outdoor thermistor, such as radio signals. Initiation of such a power defer signal can, for example, initiate defer operation in accordance to the ramp slope specified in PROM #1 and recovery immediately upon termination of the power defer signal in accordance to the ramp slope specified in PROM #2.

TEMPERATURE DEAD BAND CONTROL

The heating and cooling cycles of the system can also be controlled by minimum on and minimum off times. In the preferred embodiment separate minimum on and off times are selectable, ranging between 1 to 15 minutes, for both heating and cooling modes. These four time periods are stored in the prom 52. These values are selected to provide an appropriate maximum cycling range for the system, and in the case of heat pump systems to provide a sufficient time interval between cut off and turn on of the compressor. A typical value is 6 minutes on and 6 minutes off for a maximum duty cycle of five cycles per hour. Ambient temperature control is accomplished by comparing the sensed indoor temperature signal with the controlling, i.e. set point, temperature value in T-control and with values comprising the algebraic sum of the set point value and of suitable set off values.

For heat pump (and central electric heat), heating is commonly controlled in stages. The second stage heating, also referred to as auxiliary heat, is usually performed by electrical resistance heating devices which are less efficient than the heat pump. Accordingly it is desirable to use second stage heating only if the temperature drops sufficiently below the control temperature, i.e. set point value after the first stage, e.g. heat pump, has been on for a predetermined time.

Figure 4:
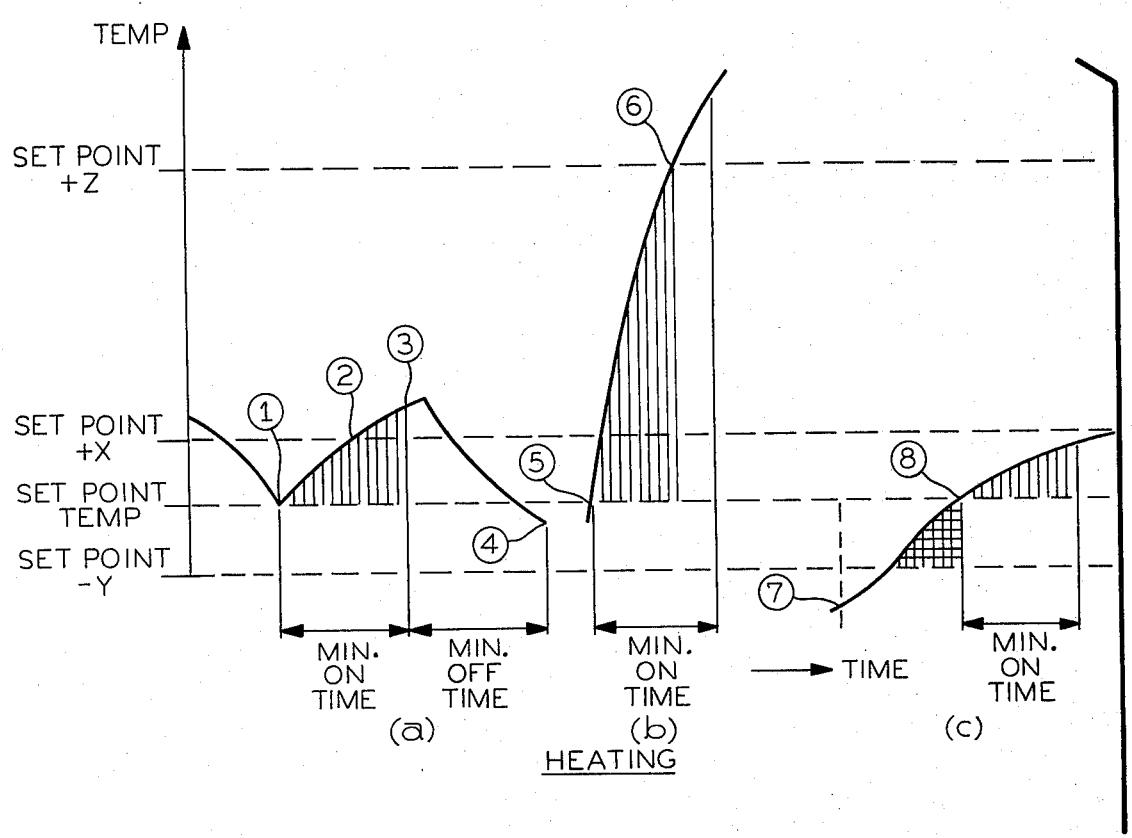
FIG. 4(a)-4(e) are graphs illustrating the relationship between indoor temperature, set point and set off values.
Figure 4:
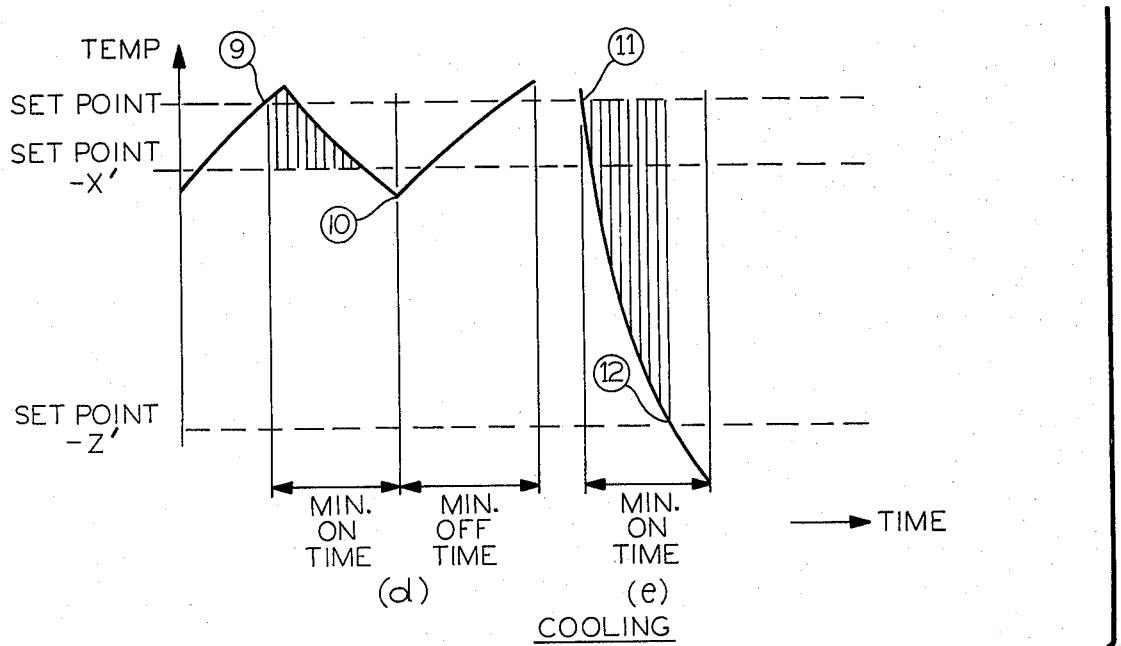

The above heating control arrangement is now described with reference to FIGS. 4(a), (b) and (c) which illustrate sensed indoor temperature values as a function of time and temperature. First stage, i.e. main heating, is energized at point 1 of FIG. 4(a) when the sensed temperature drops to the control temperature, i.e. set point, value (at the point identified as "1"). First stage heating remains on for at least the minimum on time and thereafter turns off whenever the sensed indoor temperature exceeds the set point temperature plus the preselected set off value "X", e.g. set off temperature plus 1°. In the preferred embodiment this set off value X is stored in time prom 52 with a typical value being 1° F. In FIG. 4(a) the indoor temperature reaches the set point +X value, at point 2, prior to expiration of the minimum on time. Thus first stage heating remains on until expiration of the minimum on time at point 3. First stage heating remains off for at least the minimum off time, and thereafter until the temperature drops to the set point temperature. In FIG. 4(a) the indoor temperature descends through the set point, i.e. control, temperature prior to expiration of the minimum off time. When the minimum off time has expired at point 4, the first stage heating resumes. In the above described arrangement first stage heating is on for a predetermined time and is off for a predetermined minimum time. However, if first stage heating rapidly produces an excessive rise of temperature, it is desirable to terminate heating prior to termination of the minimum time. This situation should occur only if the capacity of the heating system is greatly in excess of the capacity required to heat the ambient area. Accordingly, if the indoor temperature attains an alternative value of "set point +Z", first stage heating is immediately cut off, even if this alternative value is reached prior to elapse of the minimum on time. This alternative value exceeds the set point, i.e. control, temperature by a predetermined, second set off valye Z, which exceeds the predetermined first set off value X. This is illustrated in FIG. 4(b) where first stage heating commences at point 5 and terminates at point 6, at set point +Z, prior to expiration of the minimum on time. In the preferred embodiment the first set off value, X, is selected to be 1° F., whereas the second set off value, Z is 6° F.

It the temperature drops an excessive amount auxiliary heating is activated. Specifically auxiliary heating is activated after the first stage heating has been activated for the minimum on time and when the indoor temperature drops to a predetermined set off value, Y, below the set point, i.e. control, temperature. In the preferred embodiment the Y set off valus is 1° F. In FIG. 4(c) both first and second stage heating are on at point 7. Auxiliary heating remains on until the indoor temperature rises to the set point temperature value at point 8. Auxiliary heating is activated immediately when the sensed indoor temperature value attains the set point temperature value, even though it was on for less than the minimum on time. There is no minimum on time associated with auxiliary, i.e. second stage-heating. The first stage heating however remains on for an additional 3 minute time minimum. Thereafter turning off when the set point +X value is attained.

During first stage heating, the fan and stage 1-heating relays are actuated. If the heat pump can not maintain the set point temperature second stage heating is enabled as described above. During second stage heating intervals, the stage 2, i.e. auxiliary, heating relay is actuated in addition to the stage 1-heating. The above described heating arrangement occurs when the set switch on the control panel is in the "HEAT" position. If this switch is in the "EM HT" position, the stage 1 heating relay is disabled, and the stage 2, auxiliary, heating relay is controlled as though it were the stage 1 heating relay.

A similar control arrangement is used in the cooling mode, i.e. when the set switch is in the "COOL" position. During cooling the change over relay is actuated for appropriate switching of the change over relay in the heat pump. The cooling relay is sequentially actuated as described below. The fan relay is simultaneously actuated when the FAN switch is in the "AUTO" position. The cooling cycle is also controlled by preselected "minimum on" and "minimum off" times and by temperature comparisons. Typical minimum on and minimum off values are 10 minutes on and 10 minutes off for a maximum switching rate of 3 cycles per hour. This cooling control arrangement is now described with reference fo FIGS. 4(d) and (e) which illustrate sensed indoor temperature as a function of time and temperature. Cooling control is attained by three temperature levels, the control, i.e. set point temperature, set point temperature −X', and the set point temperature −Z'. In the preferred embodiment, a single set off value, X, e.g. one degree, which is stored in prom 52, is utilized for the X, X', set offs used in heating and cooling and a fixed value of six degrees is used as set off Z and Z' in heating and cooling modes. The cooling relay is energized, after a minimum off time, if the indoor temperature exceeds the set point, temperature value. Upon energization it remains on for at least the minimum on time, unless the indoor temperature drops to set point −Z', e.g. 6 degrees below the set point temperature. Otherwise when the minimum off time is reached and the temperature drops to the set point temperature −X" the cooling relay is shut off for at least the minimum off time. FIG. 4(d) illustrates indoor temperature increasing to the set point temperature at point 9. The cooling relay is then actuated causing the indoor temperature to decrease. Since the indoor temperature drops below the set point temperature prior to the expiration of the minimum off time, the cooling relay is not turned off until the latter time has elapsed at point 10. Subsequently the cooling relay is off for at least the minimum off time. FIG. 4(e) illustrates indoor temperature sharply descending through the set point temperature at point 11. The indoor temperature rapidly reaches the set point −Z' value, e.g. 6 degrees below set point, at point 12. Even though this occurs prior to elapse of the minimum on time, the cooling relay is immediately deactivated.

The arrangement for performing the above described time and temperature comparisons for actuation of system output controls is now described. For simplicity, this description relates solely to the heating mode. However, it may be seen from the above description and comparison of FIGS. 4(a) and (b) with FIGS. 4(d) and (e) that heating and cooling control is very similar. The primary differences are that there is no cooling equivalent for stage 2 heating, that set off values X and Z are above the set point value for heating and below the set point value for cooling, and that the comparison in cooling, is inverted in respect to that performed in heating. Of course nothing precludes the utilization of multiple stages for heating or cooling.

Heating control requires determination of sensed indoor temperature, set point temperature, set offs X and Y, and appropriate indication whether the minimum on time and the minimum off time have elapsed subsequent to the occurrence of specified conditions. It has previously been explained that a BCD (binary coded decimal) value of sensed indoor temperature is generated and is stored in the RAM of processor 36. The set point temperature, identified as "controlling temperature" is stored in X2, Y7-8. The set off value X, also identified as $\Delta T$, for heating and cooling is transferred from the Prom 52 to RAM X3, Y4. The minimum on and minimum off times are transferred from the Prom 52 to RAM X7, Y5 and X7, Y3, respectively. Upon initiation of stage 1 heating the minimum on time value is stored in "minimum on time" counter register X4, Y4-5, and by means of a clock circuit is decremented to zero. Similarly upon termination of stage 1 heating the minimum off time value is stored in "minimum off time" counter register X4, Y2-3 and by means of a clock circuit is decremented to zero. The latter utilizes the 1 second timing pulses generated by timing generator 46, via MUX 30 and processor input line K1. These are applied to a 60 second counter (RAM X4, Y0-1). The resulting one minute pulses are utilized to decrement the count in the above referenced counters.

Figure 5:
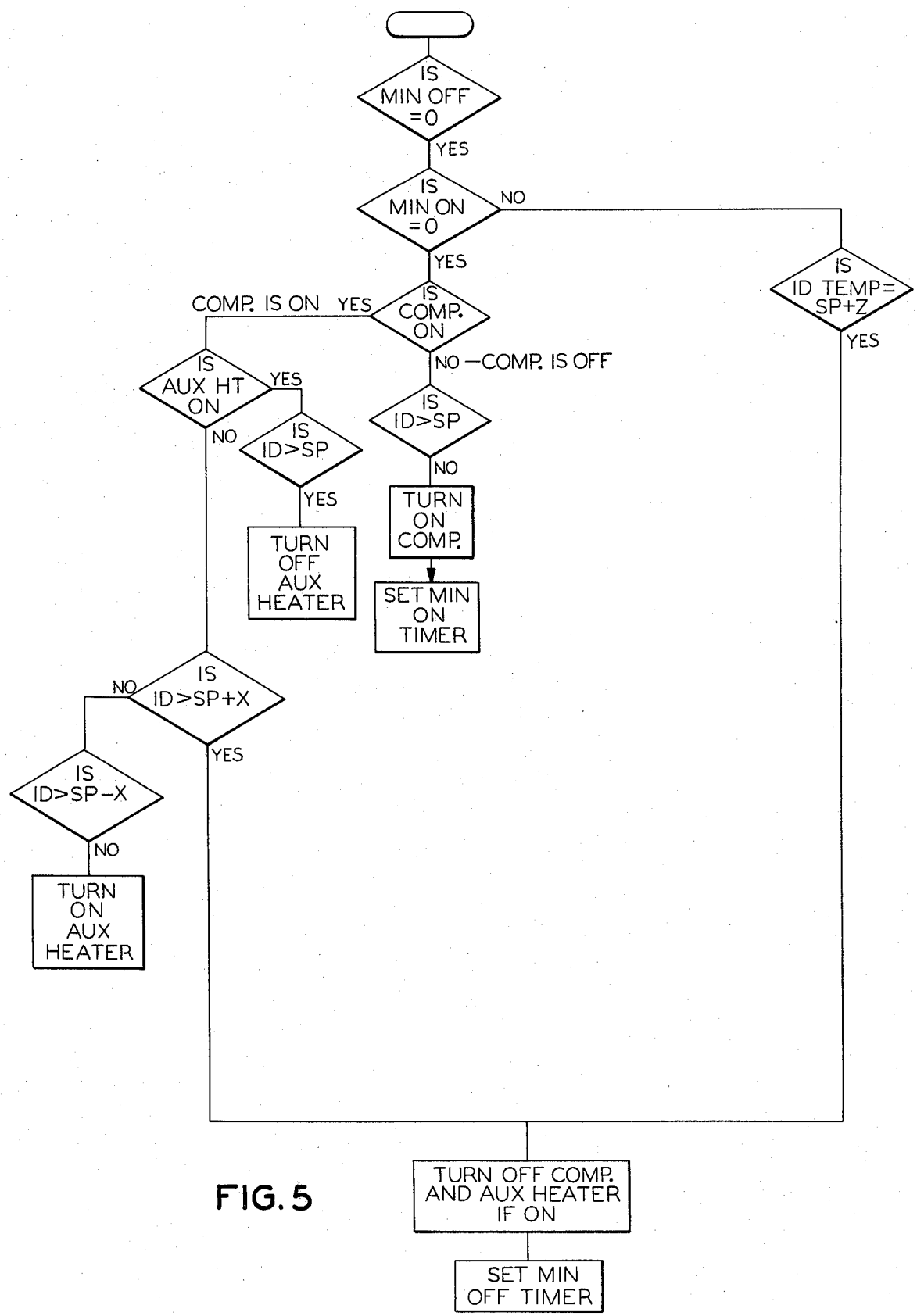
FIG. 5 is a simplified flow chart of the temperature control and output routines.

A simplified version of the temperature control routine, of FIGS. 30 and 18, is illustrated in FIG. 5 and is now described in respect to heating mode operation. Control is enabled when the minimum off register has a zero count. This assures that the compressor is not restarted prematurely. Subsequently a determination is made whether or not the count of the "minimum on" register is zero. If it is not zero no action occurs unless the sensed indoor temperature reaches the set point temperature +Z, i.e. the control temperature plus six degrees. Accordingly, six is added to the control temperature in X2, Y7-8 and the resulting set point +Z value is stored in the controlling temperature ±X register (X1, Y7-8). The latter value is compared with the sensed infoor temperature value. If the comparison is zero, indicative of indoor temperature reaching the set point +Z value, the states of processor output lines R2, R3 and R4 are reset to assure that the compressor and auxiliary heat relays are off.

The "minimum" register has a zero count either when the compressor of the heat pump is off or if the compressor has been running for more than the predetermined minimum on time. Accordingly if this register has a zero count, a determination is initially made of whether of not the compressor is on. If the compressor is off, i.e. processor output lines R2 and R3 are reset, a comparison is made of whether or not the sensed indoor temperature is greater than the set point, i.e. control, temperature (X2, Y7-8). If it is not, the compressor is actuated, i.e. processor output lines R0 and R3 are set, and the minimum on time counter is reset.

If the compressor is on, a determination is made whether auxiliary heat is on, i.e. is processor output line R4 set. If auxiliary heat is on, a comparison is made of whether the sensed indoor temperature is less than the set point temperature. If not auxiliary heat is turned off, by resetting processor output line R4. In the preferred embodiment the minimum on counter is subsequently reset to a predetermined time, e.g. 3 minutes. This avoids turning off Stage 1 heating and incurring a minimum off time because of a transient overshoot of temperature caused by auxiliary resistance heating.

If auxiliary heating is determined to be off, a determination is made of whether the compressor should be turned off. The set point +X value, i.e. value in the controlling temperature register plus 1, is transferred to the controlling temperature ±X register (X1, Y7-8). A comparison is made of this value and of sensed indoor temperature (X3, Y7-8). If indoor temperature equals the set point ±X, the compressor, and auxiliary heating are disabled by resetting processor outputs R2, R3 and R4, and the minimum off register is reset. If indoor temperature is less than set point +X, a further determination is made whether auxiliary heating is required. This comprises comparing indoor temperature with set point −Y. If indoor temperature does not exceed this value, auxiliary heating is activated by setting line R4. In the preferred embodiment, the above described comparisons are made utilizing the previously described comparison arrangement including control 10, registers 1–4, comparator 18, and the processor 36. The processor 36 provides data to register 1 causing the indoor temperature sensor circuit 2 output to be connected to comparator input line 16. This indoor temperature signal is successively compared with the set point, set point +Z, set point +X, and set point −Y signals, as described. In each instances the BCD value of the algebraic sum of these set point and off set signals are transferred from the processor to registers 3 and 4, and the equivalent analog output of D/A converter 20 is compared with the analog indoor temperature signal. The comparison output of comparator 18 is coupled via MUX 30 and the K4 input line to the processor, i.e. its accumulator. Accordingly the state of the comparison signal determines the state of the processor output lines and thus the operation of the ambient temperature system. In other words, the set point, i.e. control, value is stored in digital form, appropriate limit signals, comprising algebraic addition, (i.e. addition or subtraction) of set point and set off signals, are also stored in digital form. These signals are successively converted to analog form and are compared with the analog sensed indoor temperature signal. The state of the comparison output is utilized to actuate means for actuating the functions of the ambient temperature conditioning means.

The above described arrangement controls operation of the stage 1 and 2 heating, and of fan operation in the heating mode, when the FAN switch is in AUTO position. The arrangement for cooling control merely requires inversion of the signs of the set off values, i.e. for subtraction of set offs from the set point value, and inversion of the sense of comparison, as described previously in connection with discussion of Register 2, which is illustrated in FIG. 3.

RAM MEMORY MAP

The following describes the contents of the RAM illustrated in FIGS. 6A and 6B. Since the preferred embodiment uses only 6 LED characters in the display, it takes six 4 bit words of memory to store a particular item to be displayed. All of the items which will be displayed are on the right hand side of the memory map. As previously described the memory is organized to be addressed by an X register which can take the values 0–7 which are referred to as filed, and are shown as extending vertically in FIG. 6. The memory is also addressed by a Y register which can take the values 0–15 which are referred to as words (within a file) and are shown as extending horizontally in FIG. 6. From Y-10 to Y-15 on each of the X files is stored a particular collection of information which will eventually wind up either being displayed or being compared to the real time clock. This facilitates generation of the display. In files 0 is a display register. Whatever is to be displayed is transferred from the storage location to this display register. To the left of the display register Y-8 and Y-9 are two words of information which indicate the current file being displayed and the digit of that file which is being displayed. This is used to correctly multiplex the LED display. The display routine utilizes these two pieces of information to identify what it is to be displaying at any point in time. Other routines throughout the program can modify the contents of these two locations to tell the display routine what to display next. The code for the displayed characters comprises the numbers 0 through 9 in standard BCD code. The special display characters A, P, L, H, E are coded as hex A through E, respectively. The hex F is used to create a blank on the 7 segment display.

In file 1 underneath the display register is a register labeled blank register or pseudo clock. This register under normal operation contains all blanks. At various other times in the program this register is used to accomplish some internal tasks. For instance, during what is called the mode check routine where the clock is run aroung a 24 hour cycle in order to synchronize all of the various time settings and modes, this particular register is used as a pseudo clock which is updated at a very fast rate in order to swing through a full 24 hour period and to resynchronize all the various time associated parameters. This register is also used to hold specific messages which are displayed, such as HELP or HELP S associated with the power on clear.

File 2 contains the real time clock, this is the clock which is displayed normally at all times and keeps up the time of day and the day of the week.

File 3 contains the temperature settings which are read from the front panel pots. These settings are not normally displayed to the user but can be displayed by pushing hidden test pushbuttons.

File 4 contains the Adjusted Prom time. This file specifies the next time that there is to be a change in the currently effective block of data supplied by time prom 52. These starting times, originally stored in the prom in a compacted form, are stored in Adjusted Prom in a form that allows easy comparison with the real time clock. Thus they can be compared to the real time clock to identify when the change in program is desired.

File 5 contains the economy end time which is set by the user to end the operation from the economy temperature reference.

File 6 contains the temperature display register. This normally contains the current room temperature reading. It also always contains an indication of what function is controlling the actual temperature setting at any particular time, i.e. the normal pot, economy pot or power defer operation.

File 7 stores the economy begin time which can be set by the user to begin control using the economy temperature reference.

Files 0, Y locations 0 through 5 contain a keyboard image that is updated as the display is multiplexed. Each time the keyboard is read the reading from the keyboard is stored in one of these locations until an image of the entire keyboard is accumulated in the memory. This information is thus always available for use in the control arrangement.

Files 0-Y6 store output from the custom integrated circuit timers. This information is used to determine whether or not there has been a 0 to 1 transition on any of these counter lines. In file 4 location Y6 is a word defining the status, at the previous reading, of the multiplexer 30 output signals. The combination of this information in file 4 and the current multiplex output signal readings in file 0, Y6 permit determining whether or not a transition has occurred on each of the multiplexer timer lines and the comparison line.

Filed 0 location 7 stores certain key flags associated with reading the keyboard that are utilized in the loop associated with updating the display. Thus all of the information necessary to update the display is in file 0, so that it is not necessary to switch from file to file during the display routine.

File 1, Y locations 2 through 6, contain a number of flags labeled "modes".

Y0, Y1 and Y9 are locations labeled "scratch" to be used whenever necessary for temporary storage. Y9, in files 1 through 7, generally designated a scratch location, are used for interim storage for various sub-routines and routines needed to pass data between the various files.

In Y locations 7 and 8 of files 1 through 4 are four different digital temperature readings utilized for controlling the system outputs. Their location in vertical fashion on the memory facilitates easy comparison sub-routines. File 1Y locations 7 through 8 is designated as "controlling temperature plus or minus scratch", this location is used to generate the set point plus or minus set off value, (e.g. a value that differs from the controlling temperature by one degree). This was previously described in connection with "temperature dead band control".

X3, Y7-8 contains the sensed indoor temperature; X4, Y7, 8 contains the controlling temperature applicable when theee is no power defer, i.e. energy save. This digital value, also identified as TCNES, usually is the digital value of the applicable temperature potentiometer X2, Y7-8 is the set point, or controlling temperature, value. This value varies from the TCNES value during the power defer cycle.

In the preferred embodiment these temperature registers store BCD numbers equivalent to temperature values.

In file 2, Y locations 0 through 5 contain the block of digital signals for the current time increment. The block transferred from time prom 52 is identified as PROM LOC #1. File 6 contains similar data from the block of prom signals for the next successive time interval called PROM LOC #2. File 3, Y0 through 5, stores data relating to cooling mode operation called "Cool Constants". File 7 contains data relevant to the heating mode, termed "Heat Constants". This data is also supplied to the RAM from the prom 52 and stored in the RAM for easy access. The PROM LOC #2 starting time, is transferred to the Adjusted PROM Time (X4, Y10-14), that is periodically compared to the real time clock. Whenever the adjusted PROM time equals the real clock time, the data that was in PROM location No. 2 is transferred to PROM LOC #1 and the stored PROM data for the next successive starting time is transferred from prom 52 to PROM LOC #2 in the RAM. Constants stored in the time prom 52 (including the cool constants, and the heat constants, predetermined, i.e. preset, values for the real time clock, and the begin and the end times for the economy cycle) are transferred and stored in the RAM during the power up sequence.

Since all of the parameters in the prom can not be retained in the RAM memory at one time it is necessary to store in the RAM a pointer to the currently utilized prom addresses. This permits the processor to successively address proper prom data. This current prom address is held in file 7, Y locations 6 and 7. In adjacent Y location 8 is a word, termed PROM Y pointer, used to keep track of the Y location associated with reading in an individual word from the prom. This identifies when six successive four bit words, comprising the complete PROM location data, have been transferred to the RAM. Files 4 and 5, Y locations 0 through 5, store a whole series of counters which are time related. The first, in file 4, Y locations 0 and 1, is a 60 second counter which utilizes the 1 second signals supplied by multiplexer 30 to count up to one minute. When this counter rolls over, the real time clock (X2, Y10-15), is incremented by one minute. A minimum off time counter, at X4, Y2-3, is used to count down the minimum off time and is reset from the appropriate minimum off time stored in either the heat constants (X7, Y3) or the cool constants (X3, Y3). A minimum on time counter (X4, Y4-5) is counted down to 0 and reset from the appropriate minimum on time value from either the heat constants (X7, Y5) or cool constants (X3, Y5). Below these counters in file 5 are Timer No.1, Timer No.2, and Timer No.3. These three timers are utilized throughout the program to time out specific times which can be preset in to them. Next to these counters in X5, Y6-7 is a register called the "Droop Register". This register may be utilized only in the cooling mode to increase the controlling temperature setting if the on time of the compressor exceeds 50% for a long period of time. Next to that register (Y5, Y8) is the anticipation constant which is the temperature increase which is added to the control temperature based on the conditions of the droop register as subsequently explained. In file 2, Y location 6 is a 0.5 second counter. This counter utilizes the 0.1 second signals from multiplexer 30 to time the incrementing of the digits as the time is being set manually from the front panel pushbutton switches.

Operation of the system is now briefly described in connection with the flow charts illustrated in FIGS. 13-32 which define detailed operation of the system.

PROGRAM FLOW ROUTINE

Figure 13:
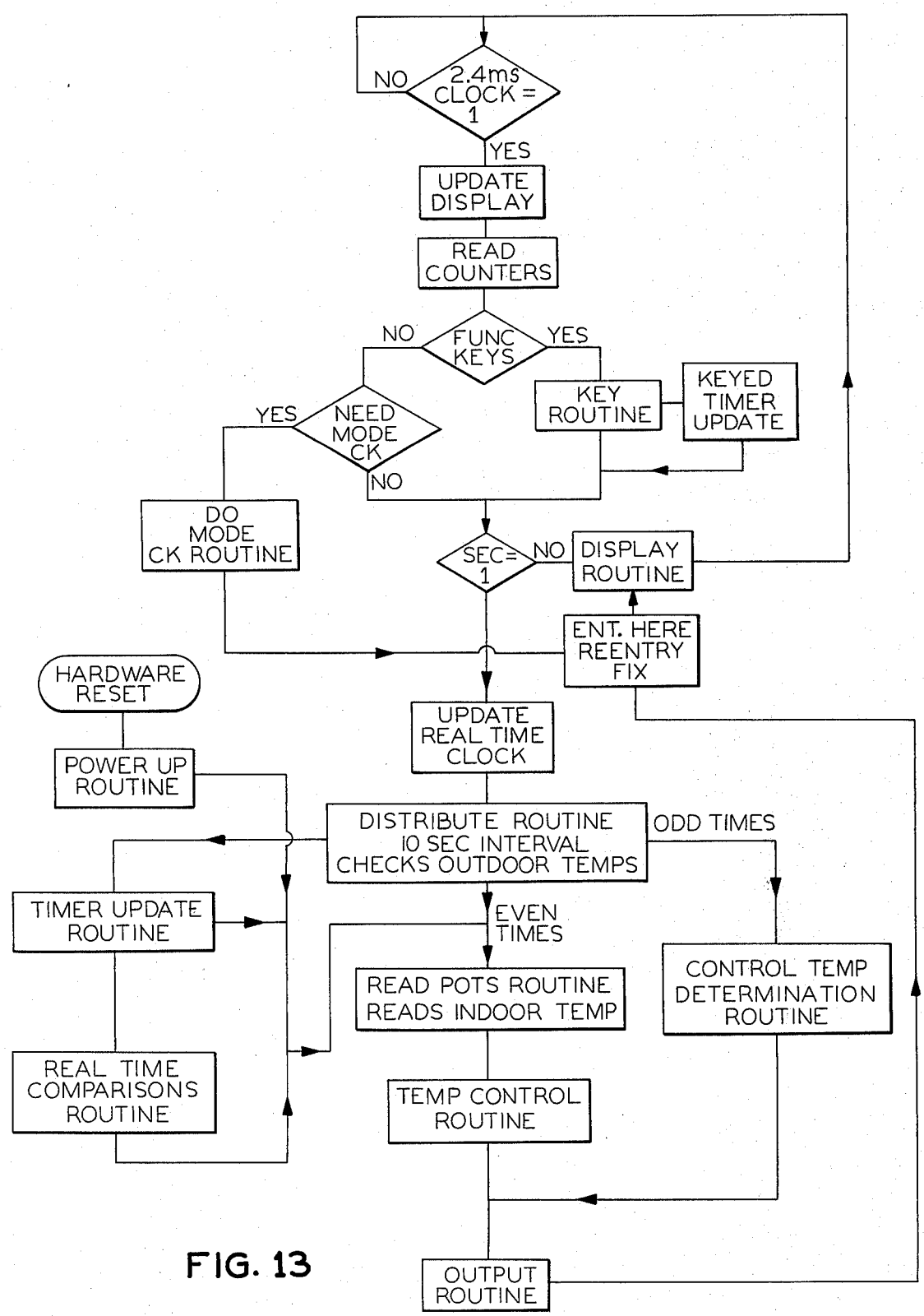
FIG. 13 is a flow chart of the program flow routine of the preferred embodiment.

FIG. 13, entitled "Program Flow" illustrates system operation in its entirety, identifying various routines that are subsequently described in greater detail. Operation commences with performance of the muliplex routine, illustrated in FIG. 15. The top of FIG. 13 illustrates a simplified version of this multiplex routine, including the blocks calling for performance of the key routine and the display routine, and determining the necessity for performing the mode check routine. This multiplex routine is initiated by the recognition of a 0 to 1 transition of the 2.4 millisecond clock signal supplied on line K8 from multiplexer 30 to the processor. As soon as the 2.4 millisecond clock transition is detected, the display information (that is the digit number of the digit to be displayed) is sent to the digit decoder 44 of the custom integrated circuit and the segment information of the digit to be displayed is sent to the 0 outputs of the TMS-1100 microprocessor. Before this digit is displayed and while the processor 35 is communicating with the components of the custom chip the state of the counters that count out the tenth second clock supplied by multiplexer 30 to the processor on line K2 are stored away in memory. Subsequently the digit is enabled and the information is displayed on the display 40. As soon as the digit line 58 from the digit decoder 44 the custom chip is enabled the keyboard keys associated with the particular digit line are read and stored away.

Figure 19:
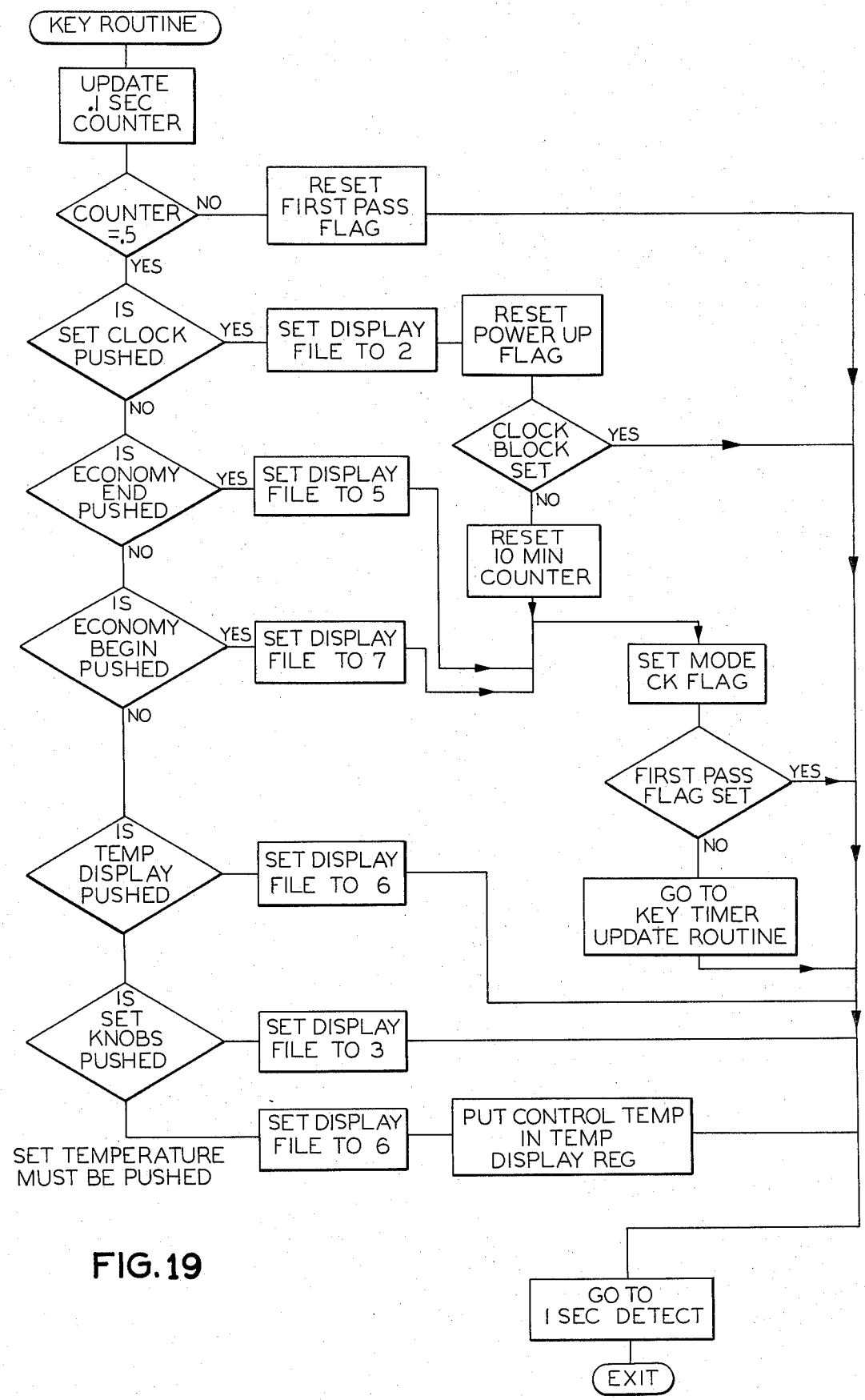
FIG. 19 is a flow chart of a key routine.
Figure 20:
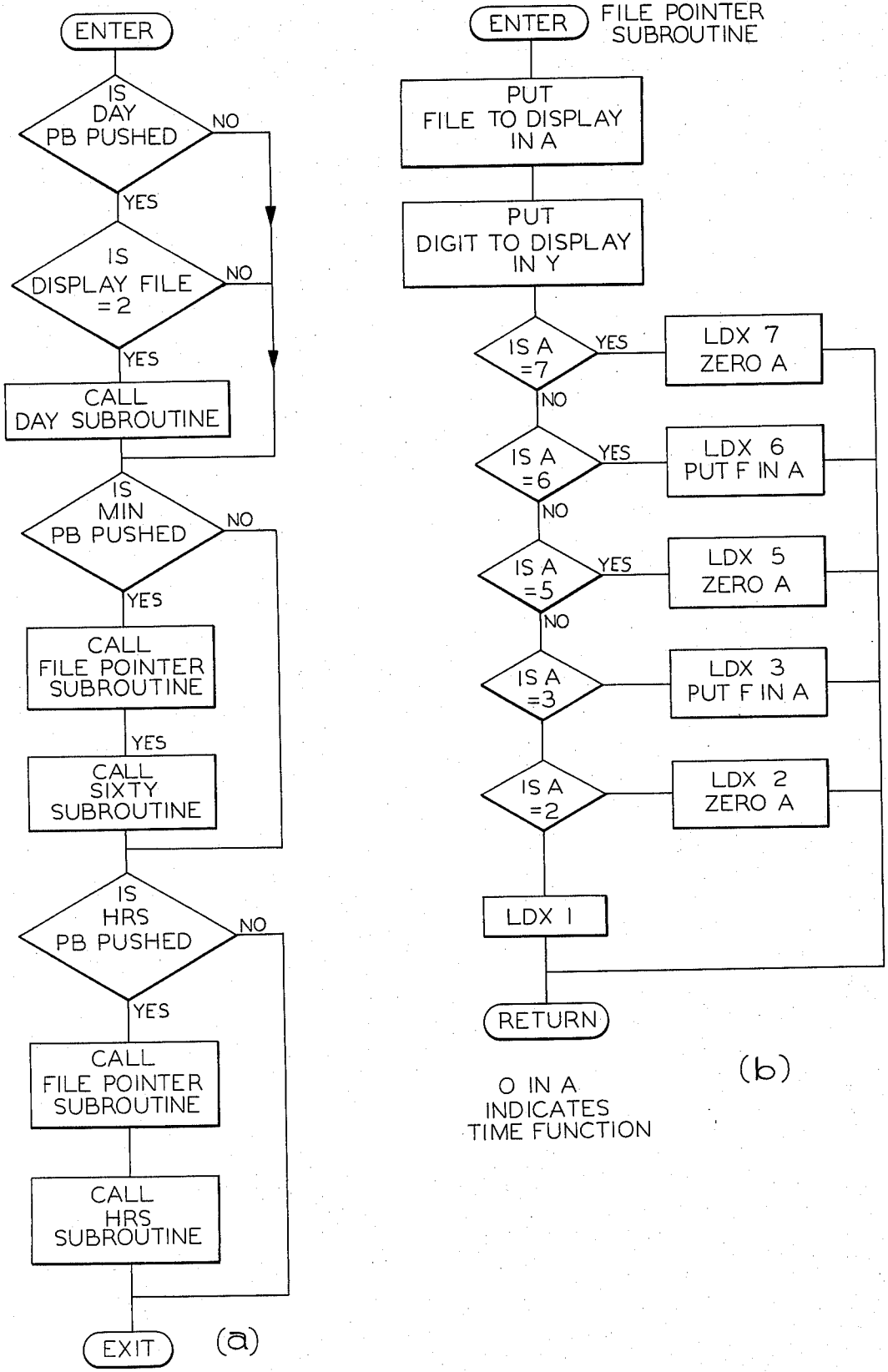
FIG. 20(a) is a flow chart of a keyed timer update routine.
FIG. 20(b) is a flow chart of a file pointer sub-routine used in the routine of FIG. 20(a)

At this point the program determines whether any of the function keys have been pushed. If they have been pushed the program is shunted to the key routine (FIG. 19). If no keys have been pushed the program determines whether any of the time related keys have been pushed. If a key relating to time has just been released, the mode check routine (FIG. 17) is performed. If no mode check routine is required, the program will scan the current state of the timing signal generator 46 outputs, supplied to the processor via multiplexer 30. A 0 to 1 transition from the one second counter line, K1, will cause updating the real time clock (FIG. 24) and a branch into the major programs associated with the temperature control. If no transition is detected on the one second clock line the program will go through a sub-routine called the DISP Routine (FIG. 16A) that prepares the next digit for display, it will go back to the beginning and wait for next 2.4 millisecond clock to display the next digit.

The key routine (FIG. 19), which is entered from the multiplex routine anytime that a function key has been pushed, feeds either into the keyed timer update routine (FIG. 20), which will allow setting of the times from the front panel, or via several short paths directly down to the block that decides whether or not a one second transition has occurred. The program is often in the key routine only for a short period as the key routine has several timers to debounce and recognize when only one key has been pushed.

If the multiplex routine has been exited by either going to the key routine or by recognizing a one second transition and going into the main body of the program, the reentry into the multiplex routine must occur through a small block of code labeled "enter here reentry fix". This block of code restores the digit, which would have been displayed, to the display and then enters the display routine to prepare the next digit for display. The reason for this is that when exiting the multiplex routine via these two paths the display is totally turned off and the digit which we were planning to display is not displayed very long. On coming back to the multiplex routine, it is necessary to put back into the 0 outputs the proper digit to be displayed because the contents of the 0 output may have been lost due to communication through that channel to the custom chip.

Once each second then, the multiplex routine is exited and the main body of the program is executed. This begins by updating the real time clock in order to keep the correct time.

Figure 24:
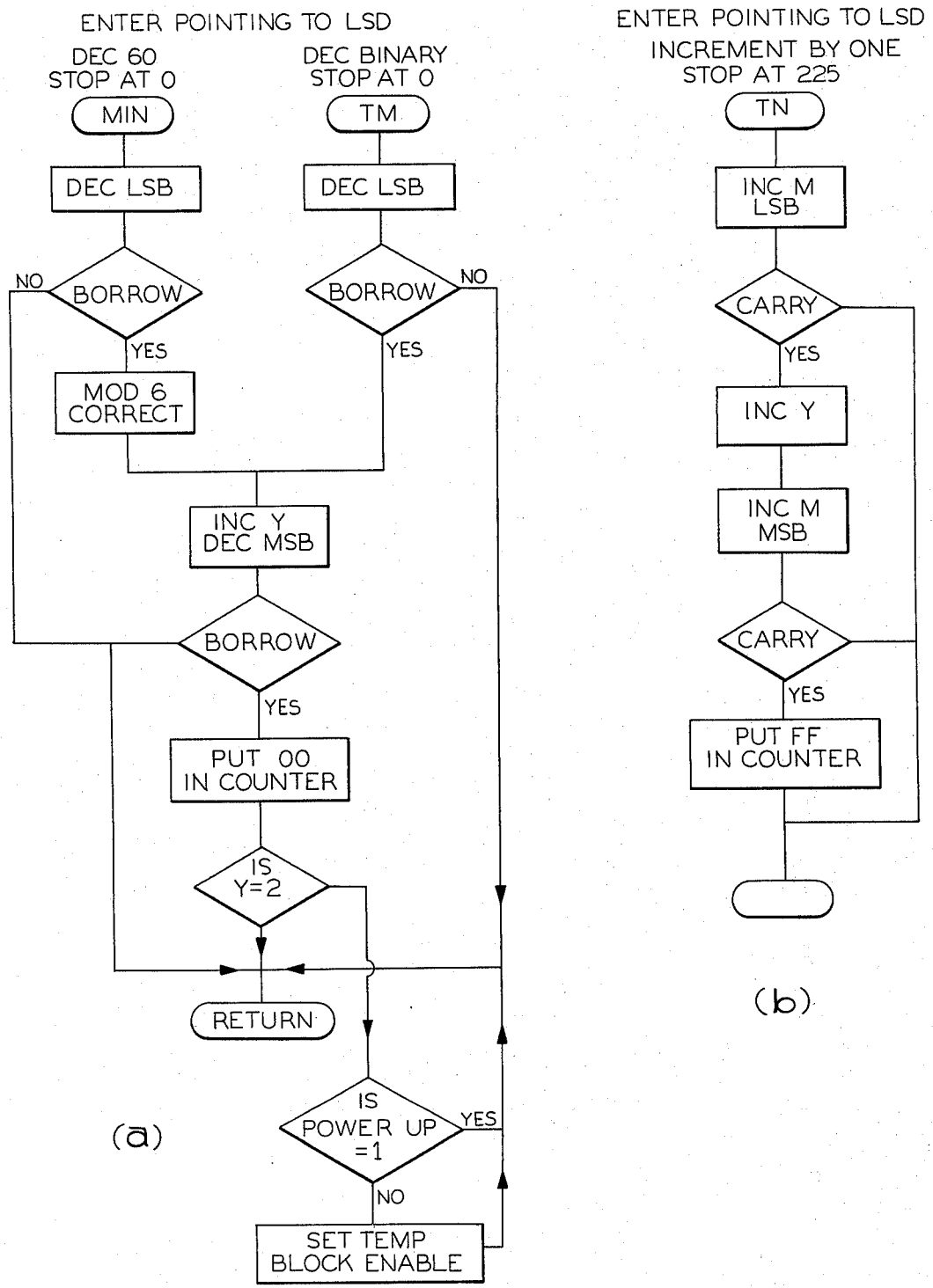
FIGS. 24(a)-24(c) are flow charts of routines for periodic updating of system timers.

From the real time clock program, the distribute routine (FIG. 25) is entered. This routine goes through a repetitive cycle every ten seconds measuring the outdoor temperature trip points and distributing the computation of various parts of the main program through the ten second interval. This is done by examining the least significant digit of the sixty second counter of the real time clock. When this least significant digit is 0, once each ten seconds, the distribute routine will shunt the program through the timer update routine (FIG. 24). The timer update routine will update those timers that are incremented on a ten second basis (the minimum on and minimum off time). Next the routine looks to see if the ten second interval falls exactly on the minute. If it does the timer update routine exit point takes the program into the real time comparison routine (FIG. 26) which must be run only once a minute. If the exit from the timer routine does not occur exactly on the minute, the timer routine will go to the read pot routine (FIG. 28) which occurs every even second throughout the ten second interval.

Every two seconds the read pot routine reads the temperature settings on the front panel and the indoor temperature. From the read pot routine the program goes through the temperature control routine (FIG. 30) which determines if some action must be taken based upon the current room temperature measurement and the previously determined control temperature. The distribute routine at all odd seconds in the ten second interval shunts the program through the control temperature determination routine (FIG. 29). This routine can be run whenever the analog input/output control 10 of the custom chip is set up for measuring the outdoor temperatures and the I/O pins are energized for the one second period; since the control temperature determination does not require any communication to the custom chip that would interfere with the outdoor temperature measurement.

Both the control temperature determination routine and the temperature control routine feed into the output routine (FIG. 18). This means that the output routine is entered once each second, the decisions that are arrived at during that second will be acted upon, i.e. the states of control relays R-0 through R-5 are updated every second. Also, since the output routine takes care of these functions that are more or less directly related to the input switches on the front panel such as the fan-on and the emergency heat, the reaction time for acting upon those switches is reduced down to one second region to provide a reasonable response time to the operator.

The hardware reset and corresponding power up routine (FIG. 14) clears memory, reads in constants, gets the machine ready to operate, and feeds in to the read pots and read indoor temperature routine. This particular entry point provides a reasonable starting point for the program, making sure that all of the data it needs for making decisions are available.

DETAILED FLOW DIAGRAMS

Detailed flow diagrams are illustrated in FIGS. 13–32. Flow diagrams of principal interest in respect to the subject matter claimed herein are described in the preceeding text. Additional diagrams are, however, included to provide a complete disclosure of the system.

Figures 14, 16B:
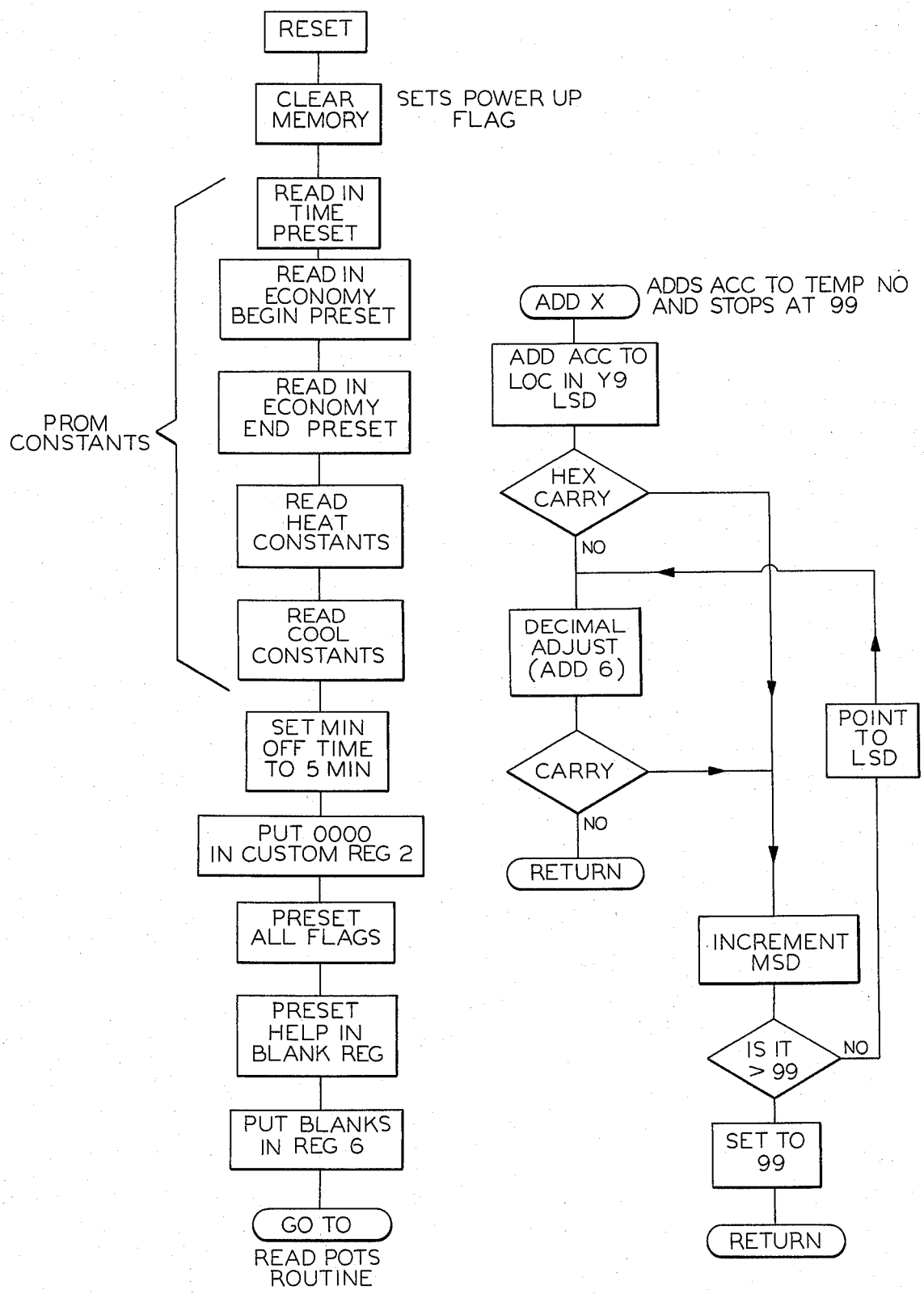
FIG. 14 is a flow chart of a preferred "power up" routine.
FIGS. 16A-16C comprise flow charts of preferred sub-routines.

FIG. 14, "the Power Up Routine", assures that the control system is reset properly when power is initially applied or is reapplied after a power outage. It clears the memory, reads in PROM constants and presets the appropriate flags into the proper condition to commence operation.

Figure 15A:
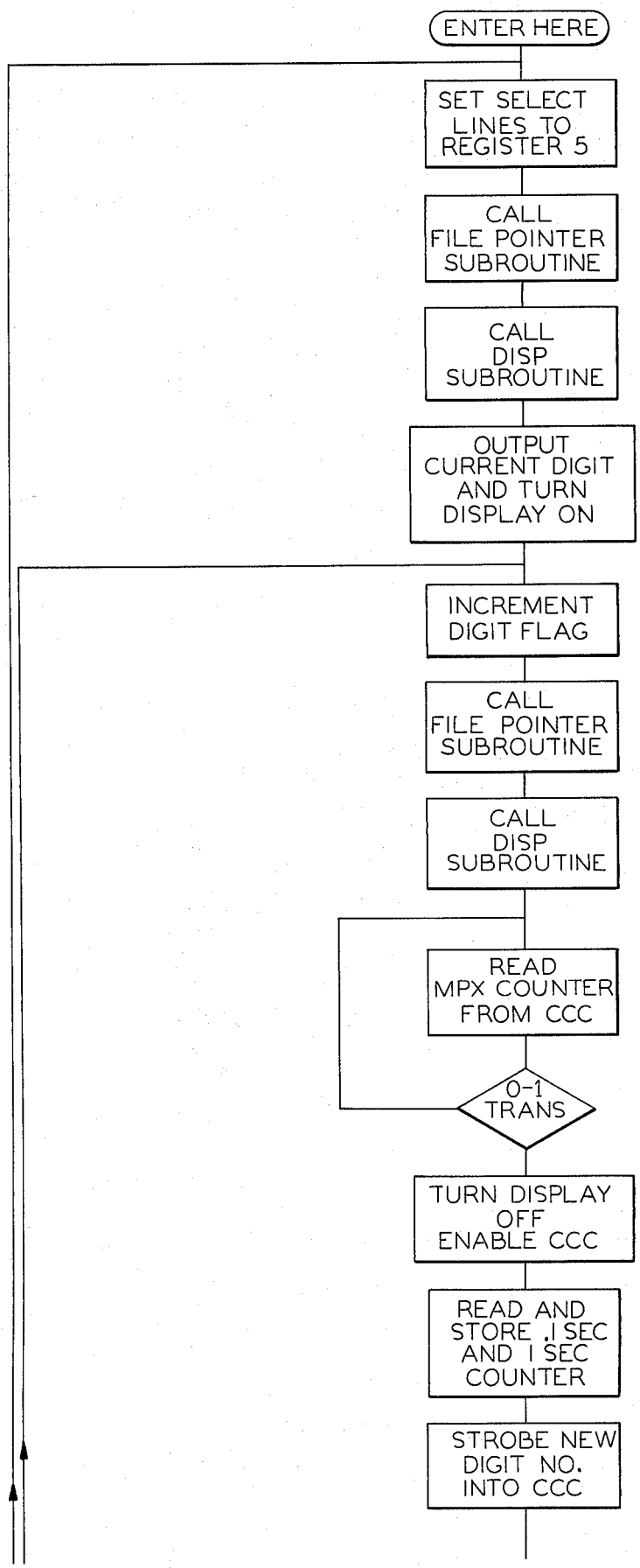
FIGS. 15A and 15B comprise a flow chart of a preferred "multiplex" routine.
Figure 15B:
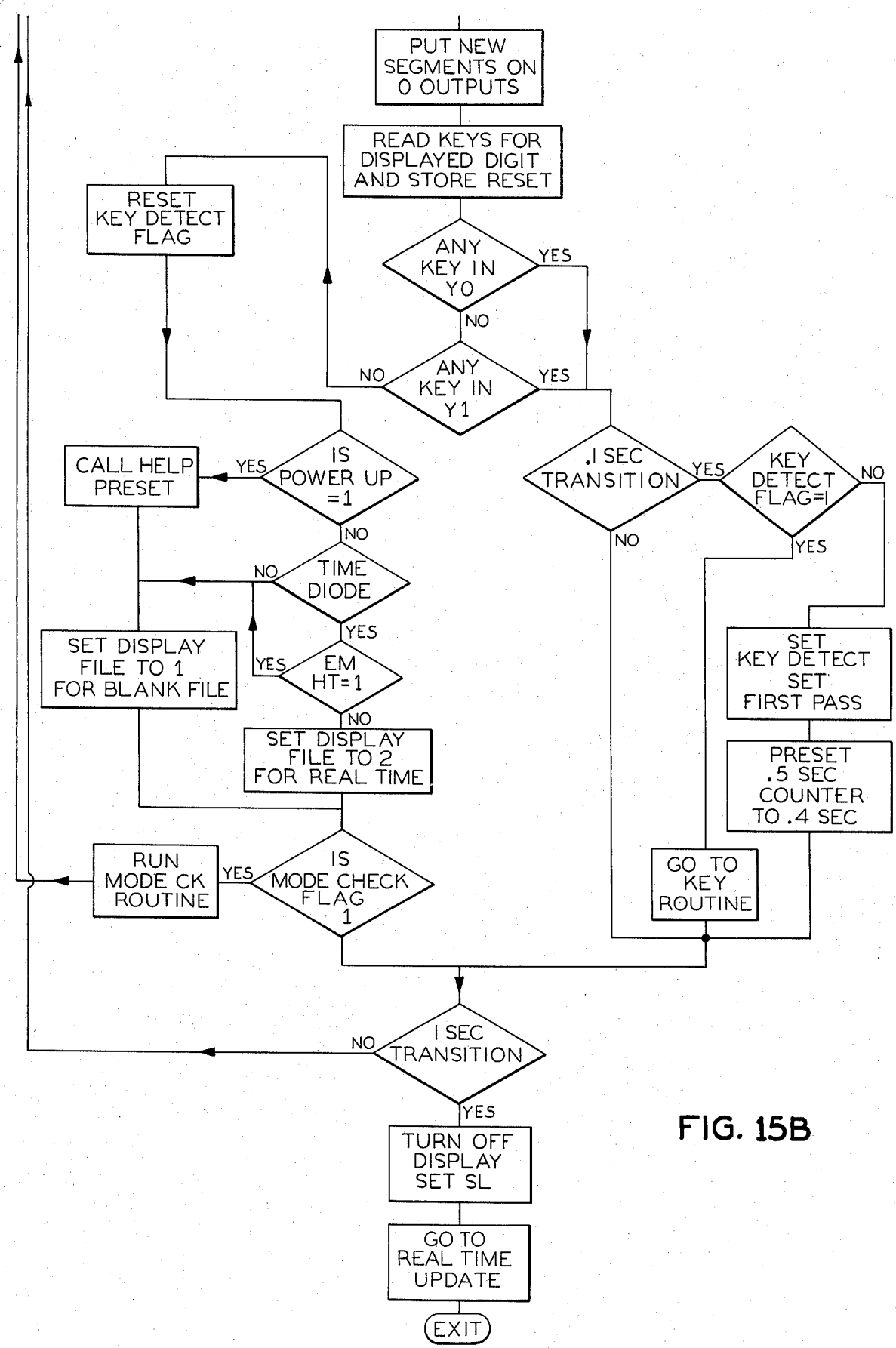

FIG. 15 contains the multiplex routine. In the preferred embodiment this routine is less than 120 instructions long but the great majority of processor time is devoted to this routine. This routine provides for updating the displayed digit, reading the counters from the custom integrated circuit, checking the keyboard to determine if any keys are being pressed, and if none of these actions have occurred to set up the appropriate information to be displayed the next digit time. This routine contains all of the exit points into the various other parts of the program.

Figure 16A:
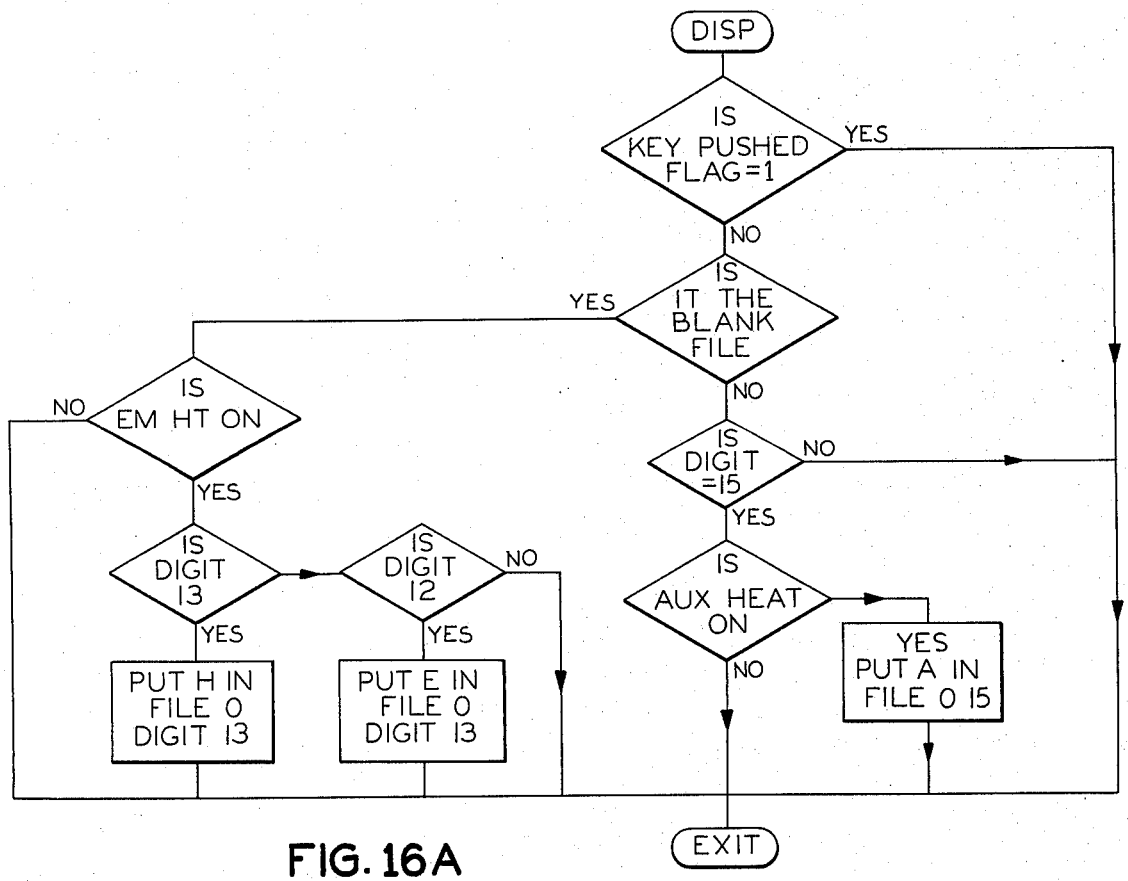
Figure 16C:
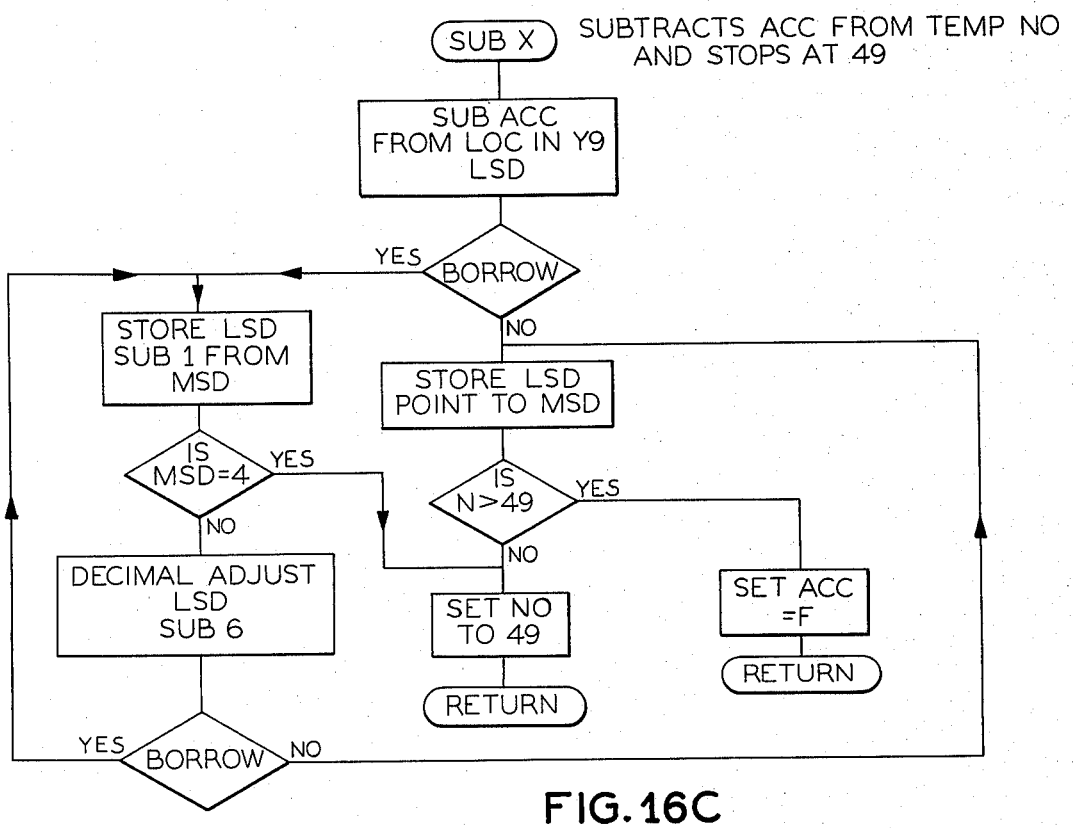

FIG. 16 describes three sub-routines. The display routine of FIG. 16A is utilized in the multiplex routine during time intervals when no key of the keyboard has been depressed. The ADD X routine of FIG. 16B and the SUB X routine of FIG. 16C are utilized in the temperature measurement portion of the program. The ADD X routine adds the value in the Accumulator to a temperature number and stops when the maximum limit of the temperature range, i.e. 99, is reached. The SUB X routine subtracts the number in the accumulator from a temperature number and stops when the minimum limit of the temperature range, i.e. 49, is reached. Both of these sub-routines obtain their starting point information from scratch location Y-9. In order to use these sub-routines the value of the X file containing the temperature number is preset and the Y value of the least significant digit of the temperature number is stored in location Y-9 of that X file.

Figure 17A:
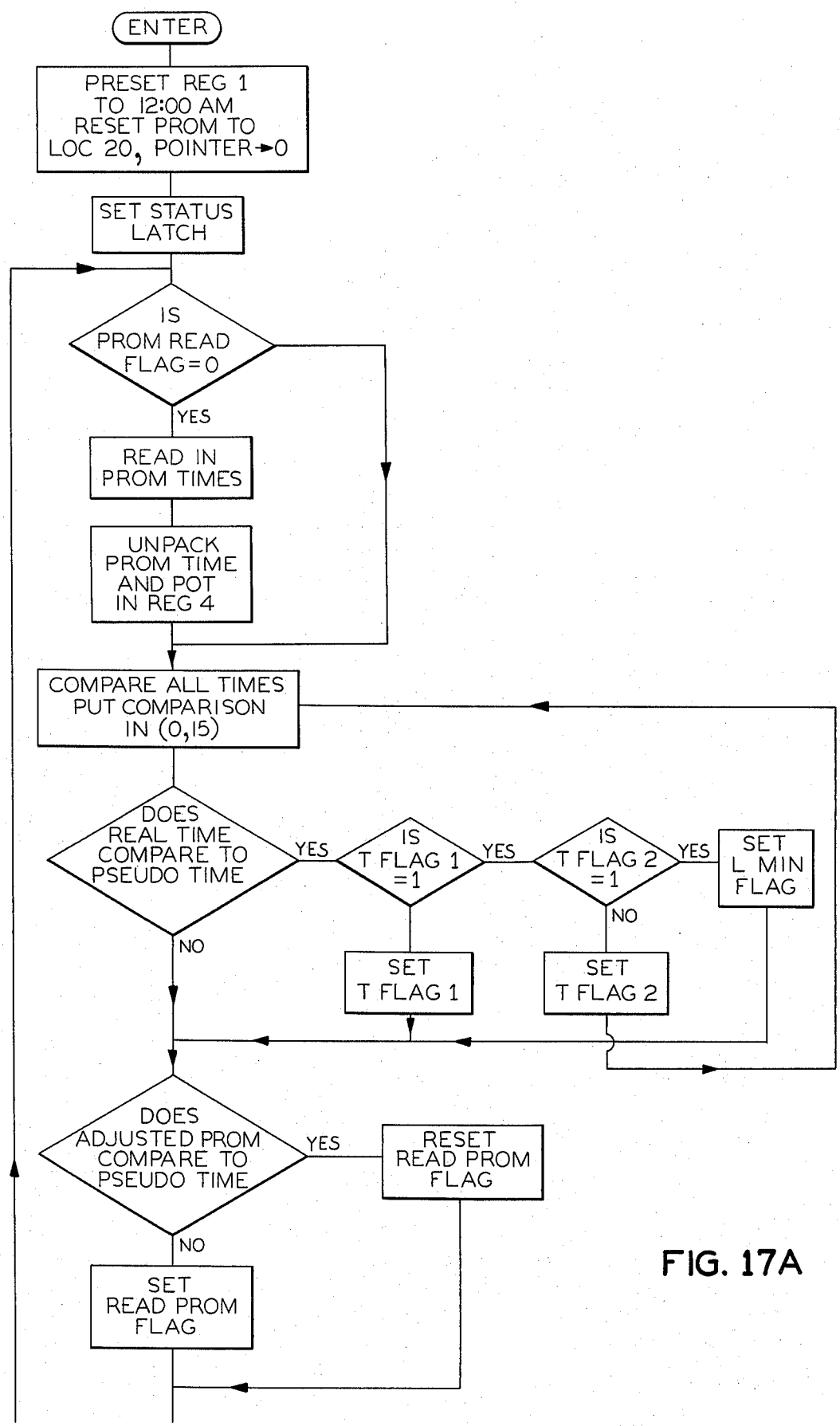
FIGS. 17A and 17B comprise a flow chart of the "mode check" routine.
Figure 17B:
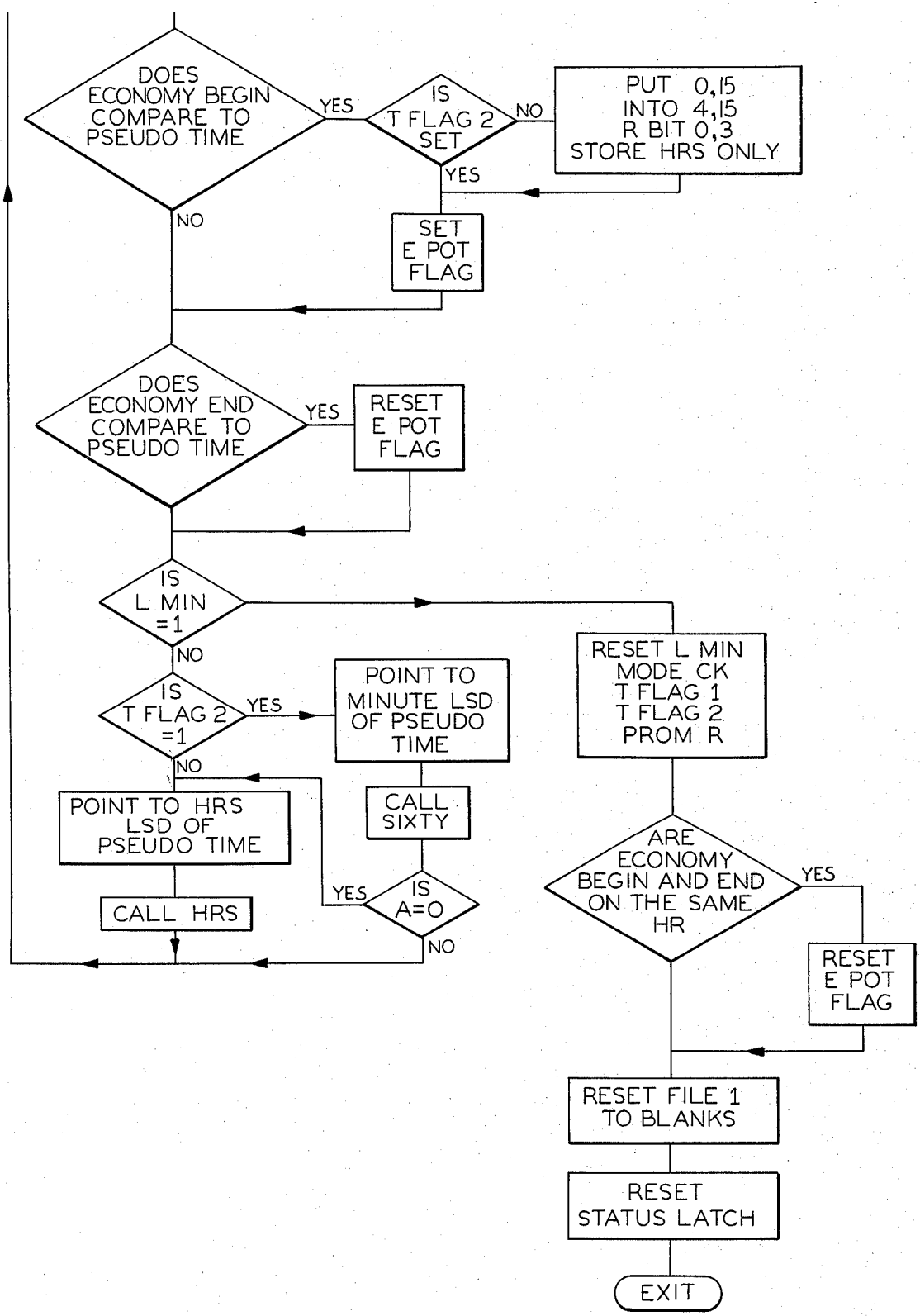

FIGS. 17A and B contain the mode check routine. This routine is entered any time any keyboard button associated with setting of any time function is released. It is also entered upon completion of the power up routine in order to initiate the control into the proper state based on preset times from the time prom 52. This routine quickly runs through a complete 24 hour day setting and resetting appropriate flags and modes and reading constants from time prom 52. At the end of this routine the control is set up in the proper states for the time that is preset on the real time clock and the times that are held in the other timers. This is done because the timers in the control are separate and independently setable and yet have an interacting effect on total mode of operation. The routine utilizes a pseudo clock, i.e. a clock running at a very fast rate, which is used solely for comparison. This pseudo clock is preset to 12 A.M. and is incremented after each comparison is made. The mode check is run against real time, i.e. the pseudo time commencing at 12 A.M, is run until there is initial comparison. This provides a maker identifying beginning of a 24 hour period. The pseudo clock is then updated hourly until there is another comparison to the real time clock. The above are hourly comparisons. When the pseudo clock thus has compared to real time on an hourly basis for the second time the comparisons are switched to minutes, and pseudo time is run until there is another comparison to the real time clock. At this time a complete 24 hour cycle has been completed, all flags have been properly set and appropriate prom constants have been stored in RAM corresponding to the real time setting of the control system.

Figure 18A:
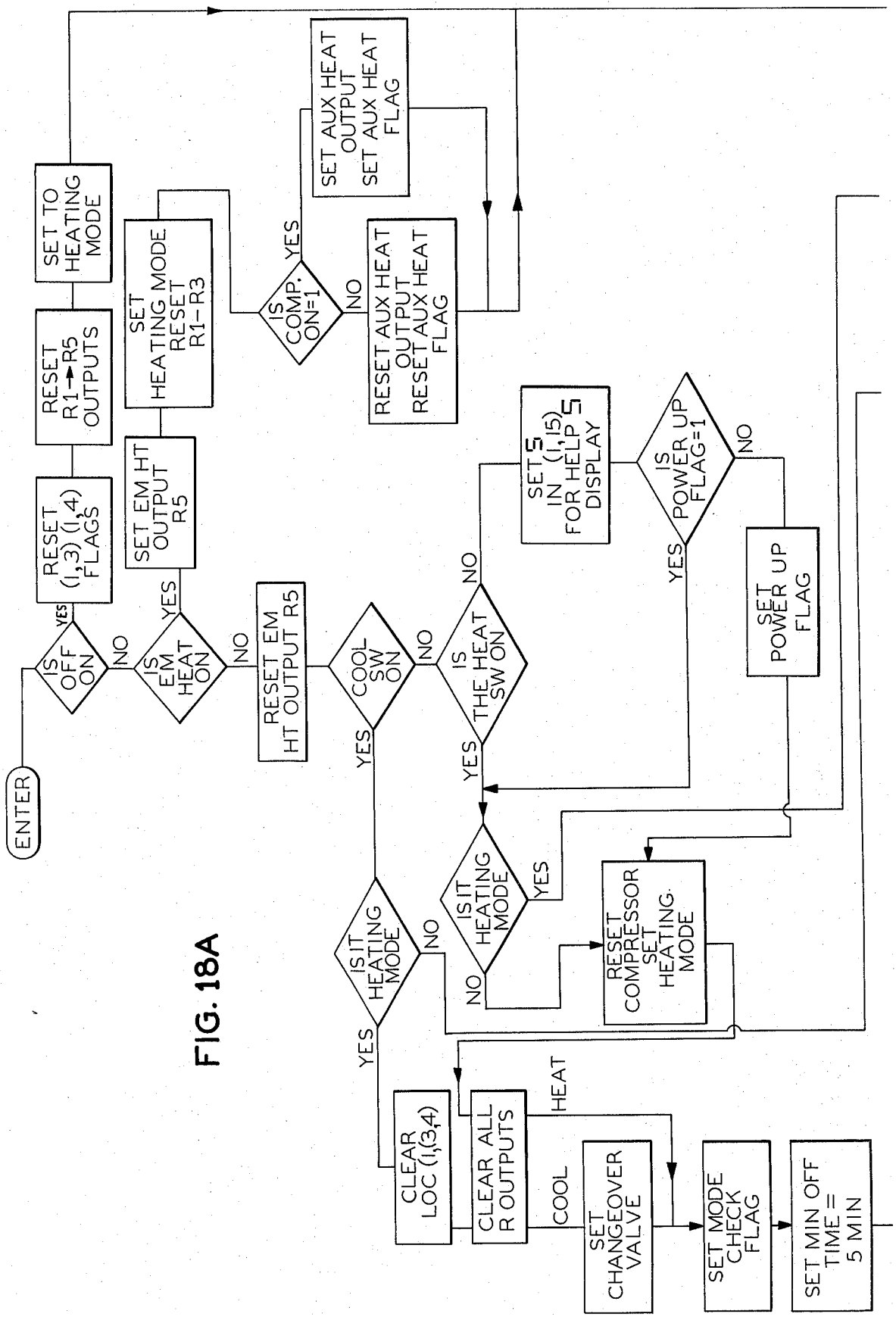
FIGS. 18A and 18B comprise a flow chart of an output routine.
Figure 18B:
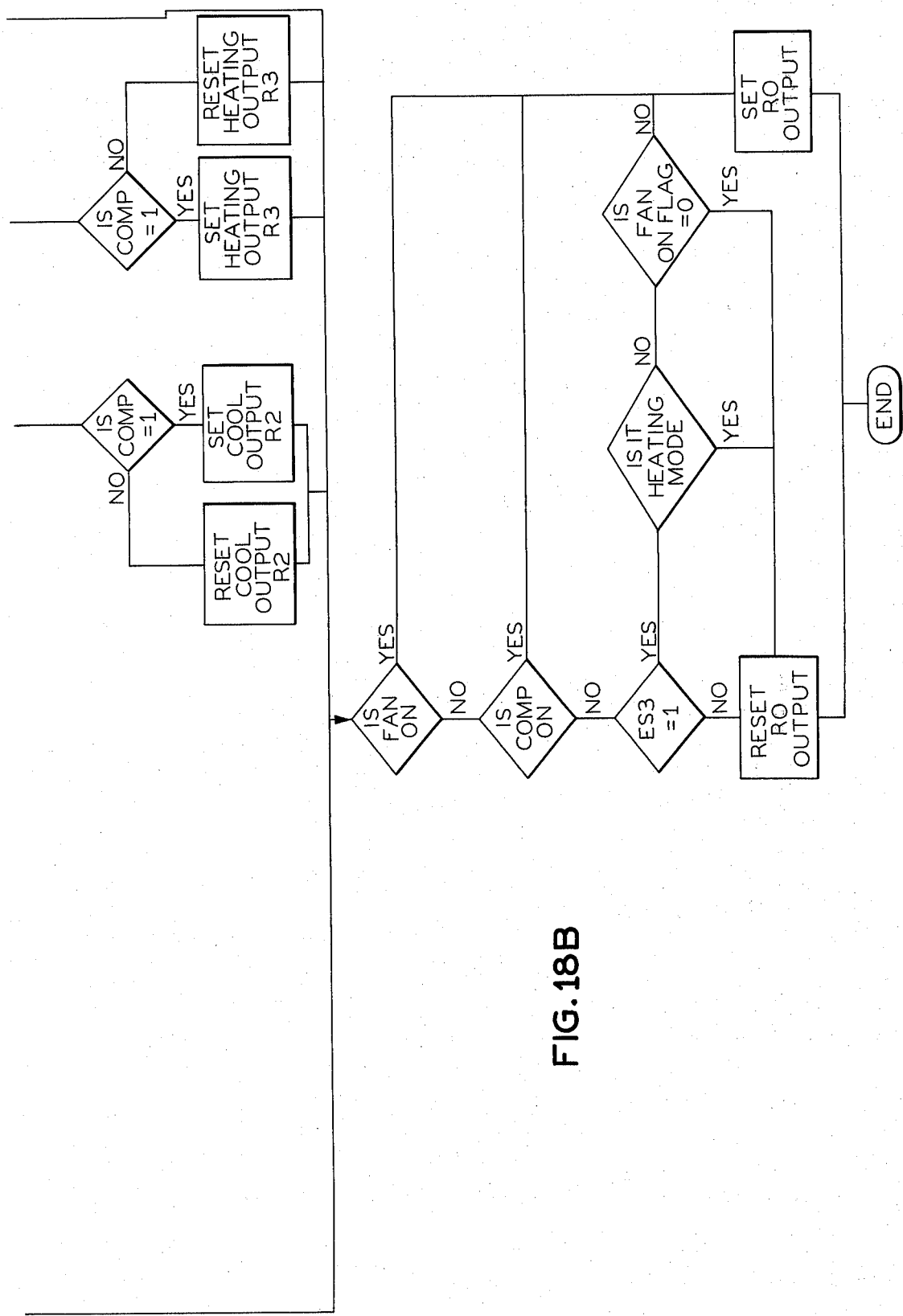

FIGS. 18A and 18B illustrate the output routine which controls the state of the output relays K1 through K6, and thus the state of the system outputs RO-5. This routine is operative once each second. The state of the off switch on the slide switch on the front panel is initially monitored. If it is closed, i.e. neither heating nor cooling is desired, R-1 through R-5 are reset so that the control is in the heating mode with no outputs energized.

If the slide switch is in the emergency heat position, the emergency heat output R-5 is set so that relay K1 will be energized.

If the emergency heat is not selected by the slide switch, the emergency heat output R-5 will be reset. A determination is then made of whether the slide switch is in the cool position. If it is, the state of the heating mode flag is examined. If the system is not in the heating mode, the compressor flag is examined. If the compressor flag is set to a 1, the program will set the cool output R-2. If the compressor flag is not set to a 1, the program will reset the cool output R-2. If the cool switch has been selected by the slide switch while the control is in the heating mode, i.e. the user switches from heating to cooling, the routine clears all of the R outputs and flags, sets the change over value output into the cool position, sets a mode check flag so that the mode check will be initiated and the cooling values from the PROM will be read into the machine. The routine will also set the minimum off time of 5 minutes into the minimum off time counter so that the machine will deenergize the compressor and all heating and cooling functions for a 5 minute period. This will occur on power up or any time a change from heat to cool or cool to heat occurs.

If the cool switch has not been selected, a determination is made of whether the slide switch is in the heat position. A negative response is indicative of a failure, e.g. improper switch positioning, since none of the switch positions have then been selected. Accordingly the system causes a warning, i.e. "HELP-S", to be displayed on display 40 and provides for normal operation in the heating mode.

If the slide switch is in the heat position, the state of the heating mode flag is monitored. If the heating mode flag was not set it indicates that a user has switched the control from cooling to heating and the routine causes the compressor to be turned off, sets the heat mode flag, clears all of the R outputs, sets the mode check flag and sets the minimum off time to 5 minutes.

The fan on portion of the output routine, which is utilized in the above routine portions, determines whether or not the fan on switch on the front panel has been energized. If the fan on switch is energized the R-$\phi$ output is set in turn on the fan. If that switch is not energized, the state of the compressor on flag is checked. If the latter flag is set, the R-$\phi$ output is set to turn on the fan.

During power defer cycle operation in the cooling mode, it may be desirable to continuously operate the fan. This may be commanded by a fan-on flag stored in time prom 52. Accordingly, if the compressor flag is not set, i.e. the fan is not otherwise commanded to run, the routine checks the state of the power defer flag ES-3, of the current mode, i.e. heating or cooling, and of the state of the fan-on flag. If ES-3 is high during cooling mode and the fan-on flag is set, the fan R-$\phi$ output is set.

FIG. 19 illustrates the key routine. This periodically detects the change of state of those keys which are considered function keys (such as the set clock, the begin economy, the end economy time, the temperature display) which cause the control to change the state of the display and to operate in a different fashion from the way it has been operating. This routine provides the timing increments between updates when the times are being incremented manually from the keyboard and it establishes a priority for the function keys so that if more than one are pushed only one will cause an action to be noticed on the display.

FIG. 20(a) illustrates the keyed timer update routine, and FIG. 20(b) discloses a file pointer sub-routine used in the former. The keyed timer update routine accomplishes the incrementing of the timers upon determination of the key routine that time related function buttons of the keyboard have been depressed. This routine is entered twice each second.

Figure 21A:
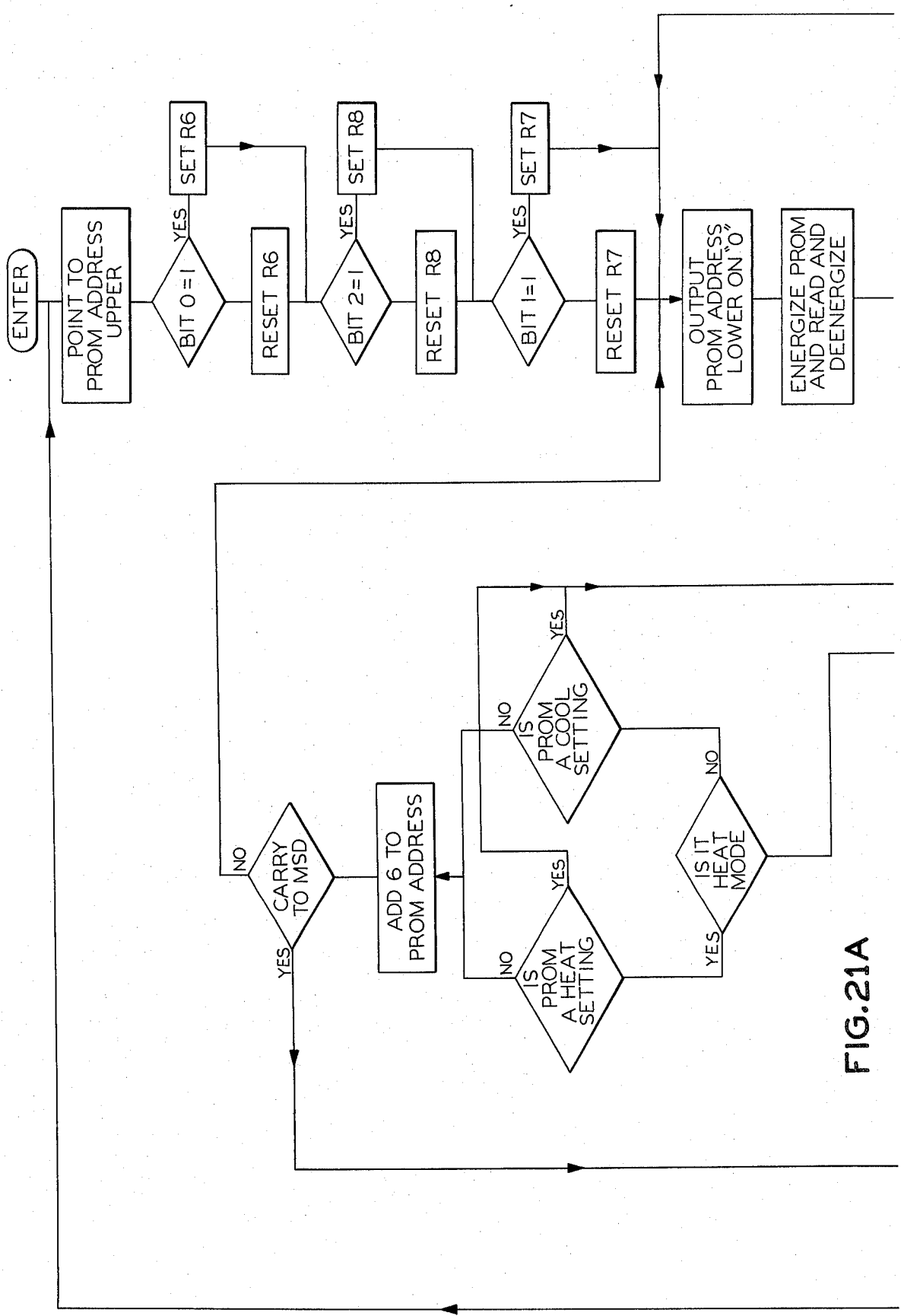
FIGS. 21A and 21B comprise a prom reading routine.
Figure 21B:
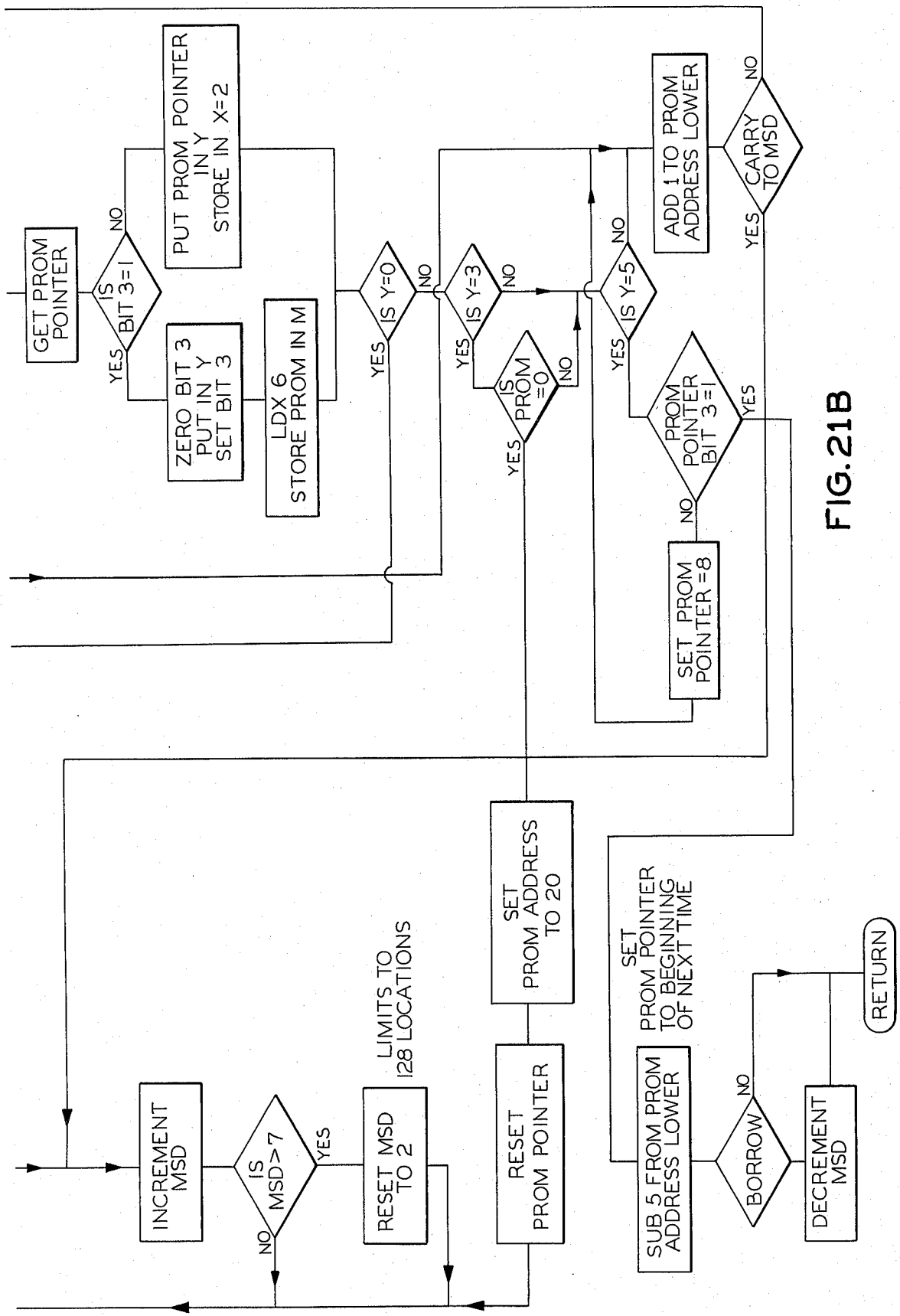

FIGS. 21A and 21B contain the prom reading sub-routine. This transfers two six digit words from the prom 52 to PROM location #1 and PROM location #2. It keeps track of whether or not the end of the time prom data has been reached and whether or not the functions being read in are associated with the heating or the cooling program and separates them out accordingly. The major input to this routine is the current prom address as stored in the RAM.

Figure 22:
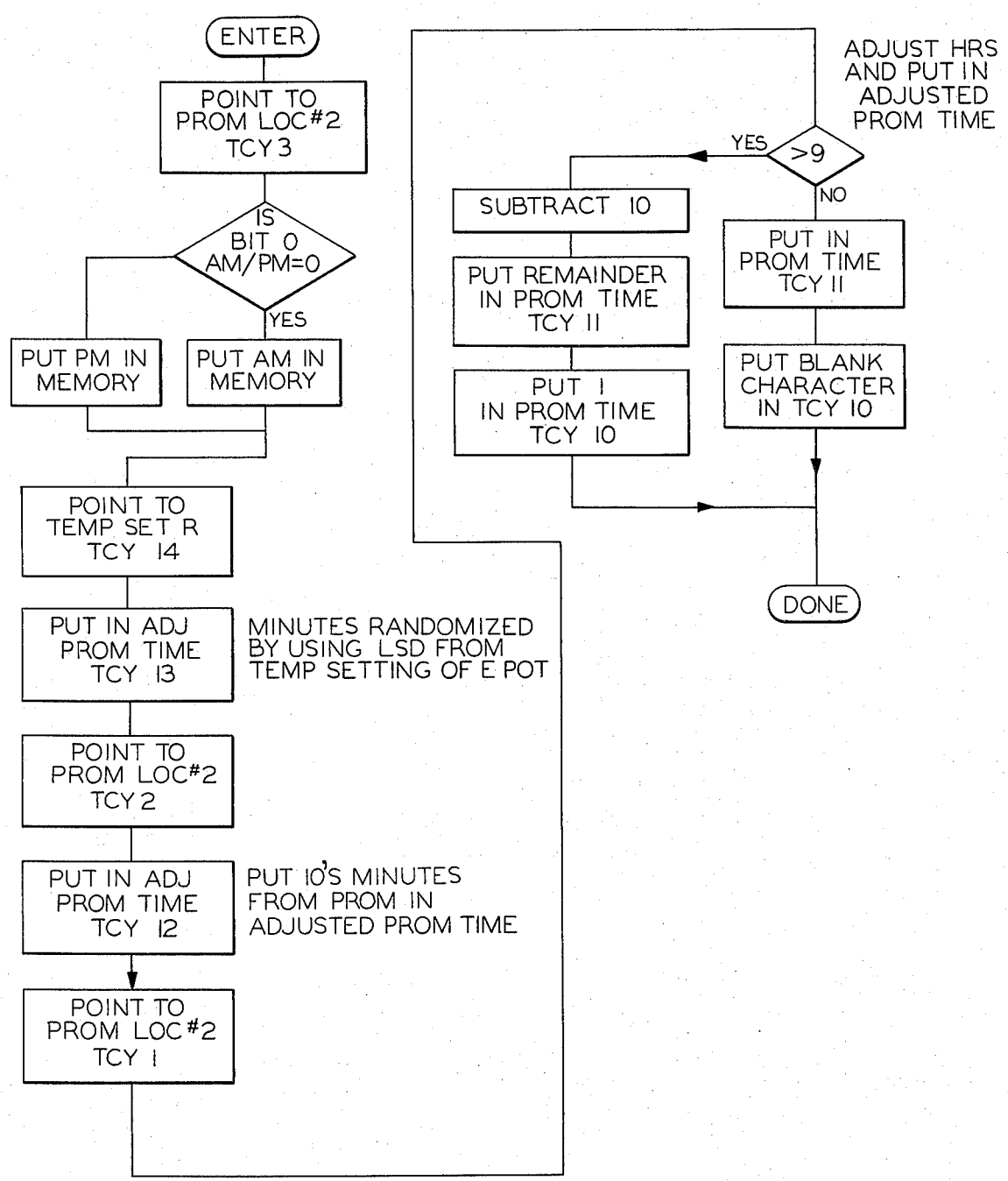
FIG. 22 is a flow chart of an "unpack prom time" routine for converting stored time data to a different format.

FIG. 22 illustrates the unpacked prom time routine. This routine takes the coded information stored in PROM location #2 and creates the Adjusted prom time for storage in RAM. The Adjusted prom time, one stored in RAM, is then available for comparison with the real time clock. This section of routine also contain the code to randomize the starting times stored in the prom with the least significant digit of the economy temperature setting.

Figure 23:
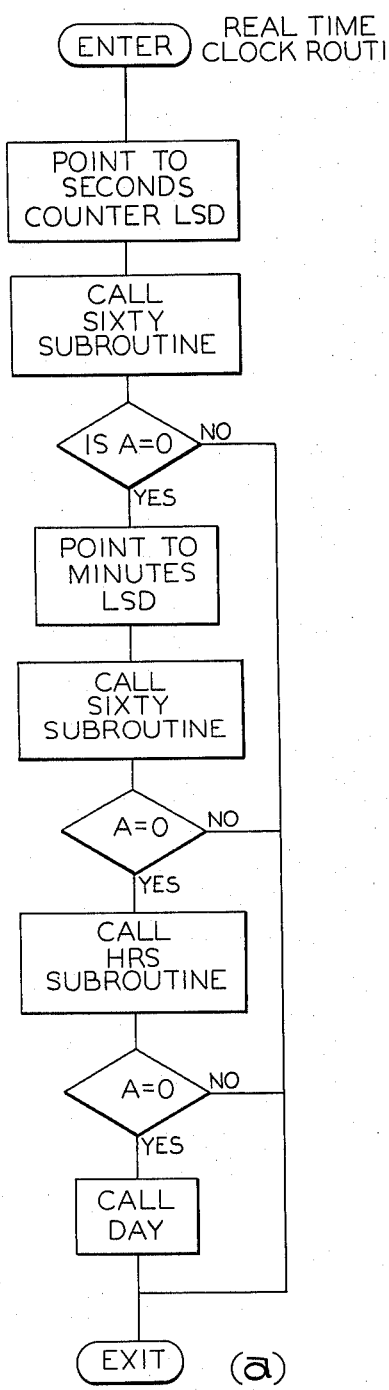
FIGS. 23(a)-23(d) are flow charts of routines for updating the real time clock.
Figure 23:
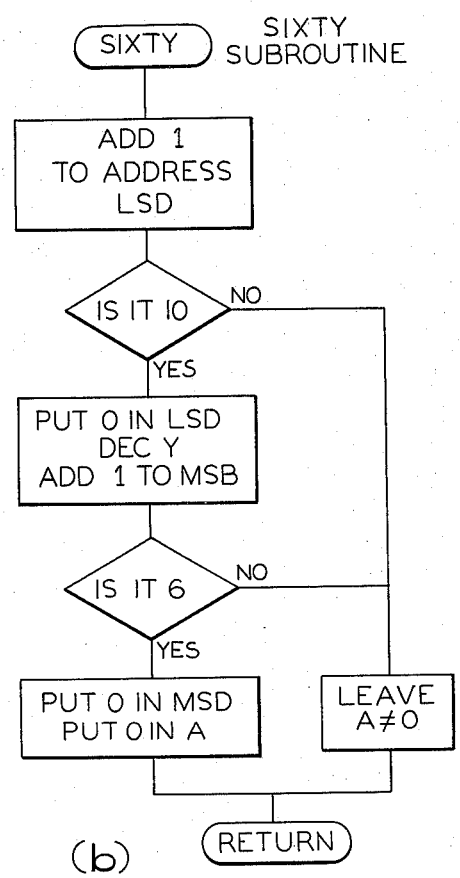
Figure 23:
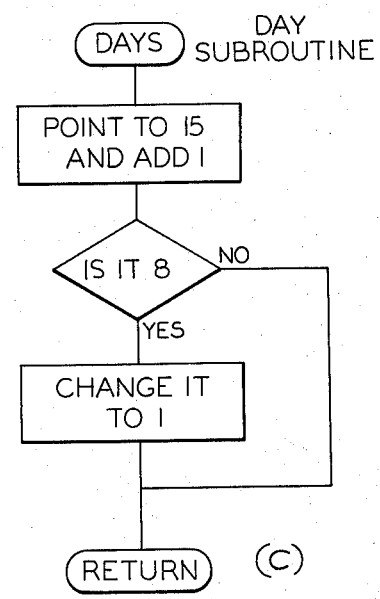
Figure 23:
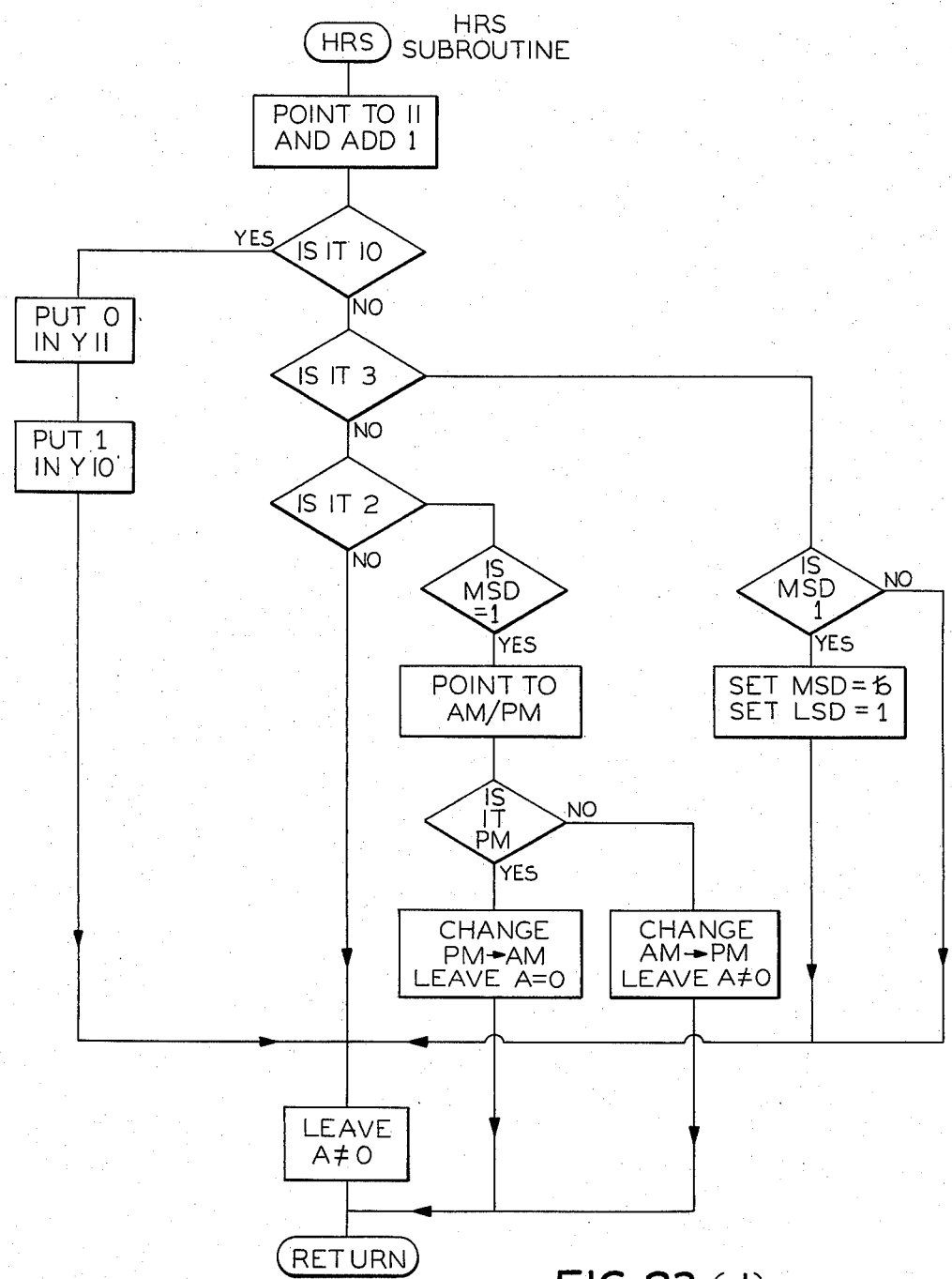

FIG. 23 contains the real time clock program, FIG. 23(a) the real time clock routine updates the real time clock from seconds through days of the week, FIG. 23(b) the 60 sub-routine provides for the 0 to 60 count, FIG. 23(c) the day sub-routine provides for a day of the week count from 1 through 7, FIG. 23(d) the hours sub-routine updates hours in a 12 hour format with AM/PM indication.

Figure 24C:
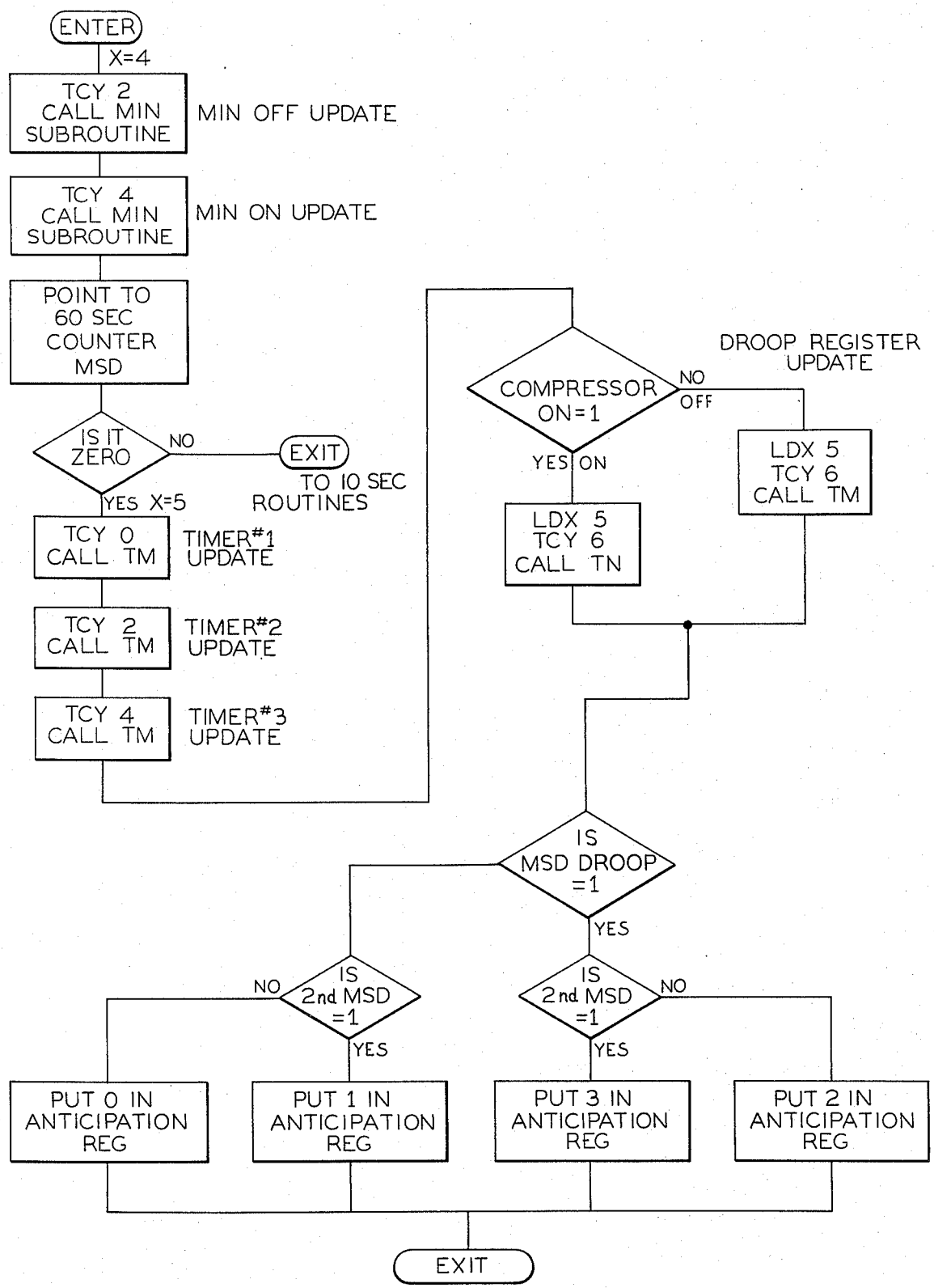

FIGS. 24(a)–24(c) relate to the periodic updating of system timers, including the MINUT and TM sub-routines of FIG. 24(a), the TN sub-routine of FIG. 24(b), and the timer update routine of FIG. 24(c). The latter updates the timers in RAM files 4 and 5. The minimum off and minimum on timers are sequentially updated, i.e. decremented, by use of the MINUT sub-routine. Every minute, as established by the count in 60 second counter (RAM X4, Y0-1) being zero, timers 1, 2 and 3 in file 5 are sequentially updated by use of the TM sub-routine. Timer #1 provides for a 10 minute interval for resetting the clock after a power up even during clock lock conditions. Timer #2 provides the ramp of TCNES, e.g. 3° F./hour, when reference temperature is increased in heat mode. Timer #3 is utilized in power defer mode to provide proper ramp slope, e.g. 1° F./time interval, as defined by the PROM LOC #1 time out data. In addition the program provides for updating of the droop register (X5, Y6-7) and anticipation register utilized in respect to a special cooling mode operation. The TM and TN sub-routines are used therein. The TN sub-routine increments a two digit number, stopping at 255. The TM sub-routine decrements a binary counter. The MINUT sub-routine decrements a counter whose least significant digit is MOD 6 (i.e. the 0 being replaced by a 5 on a borrow), since the least significant digit of the minimum on and off timers represents a 10 second interval.

FIG. 25 contains the distribute routine. This previously described routine over a 10 second period measures the various outdoor temperatures. Because of the potential time constants, associated with charging the capacitance of the lines going out to the outdoor thermistor through the high valued resistors necessary for the comparisons at low temperatures, the outdoor thermistor circuits are pre-energized for a period of time prior to detection of outdoor temperature values. In this routine, the outdoor switches associated with a particular temperature comparison is made. This routine also contains the decision making elements for entering the power deferval mode, i.e. the ES-1 flag, and for blocking the setting of the real time clock based on the outdoor temperature.

Figure 27A:
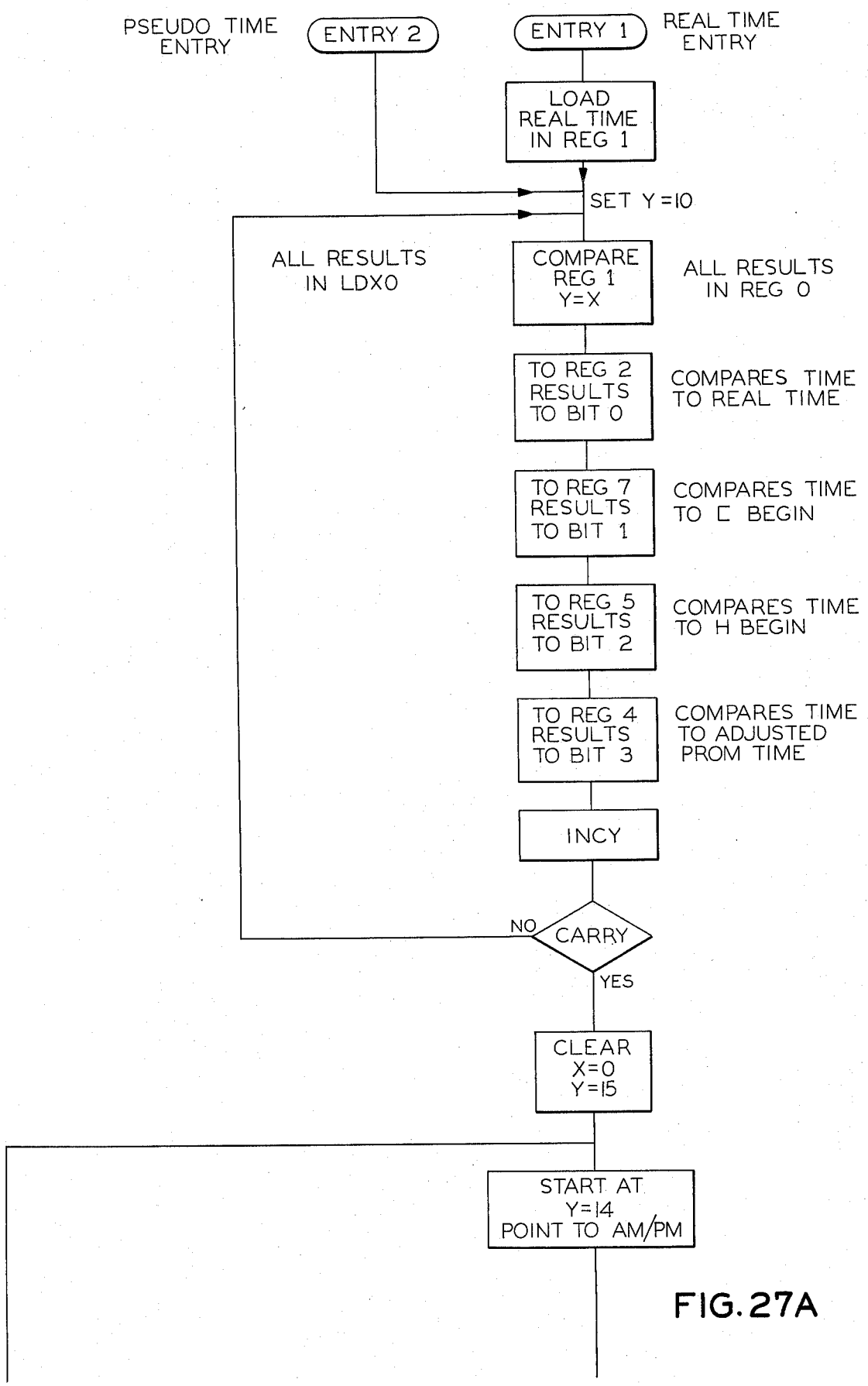
FIGS. 27A and 27B comprise a flow chart of a time compare sub-routine for making the comparisons utilized in the routine illustrated in FIG. 26.
Figure 27B:
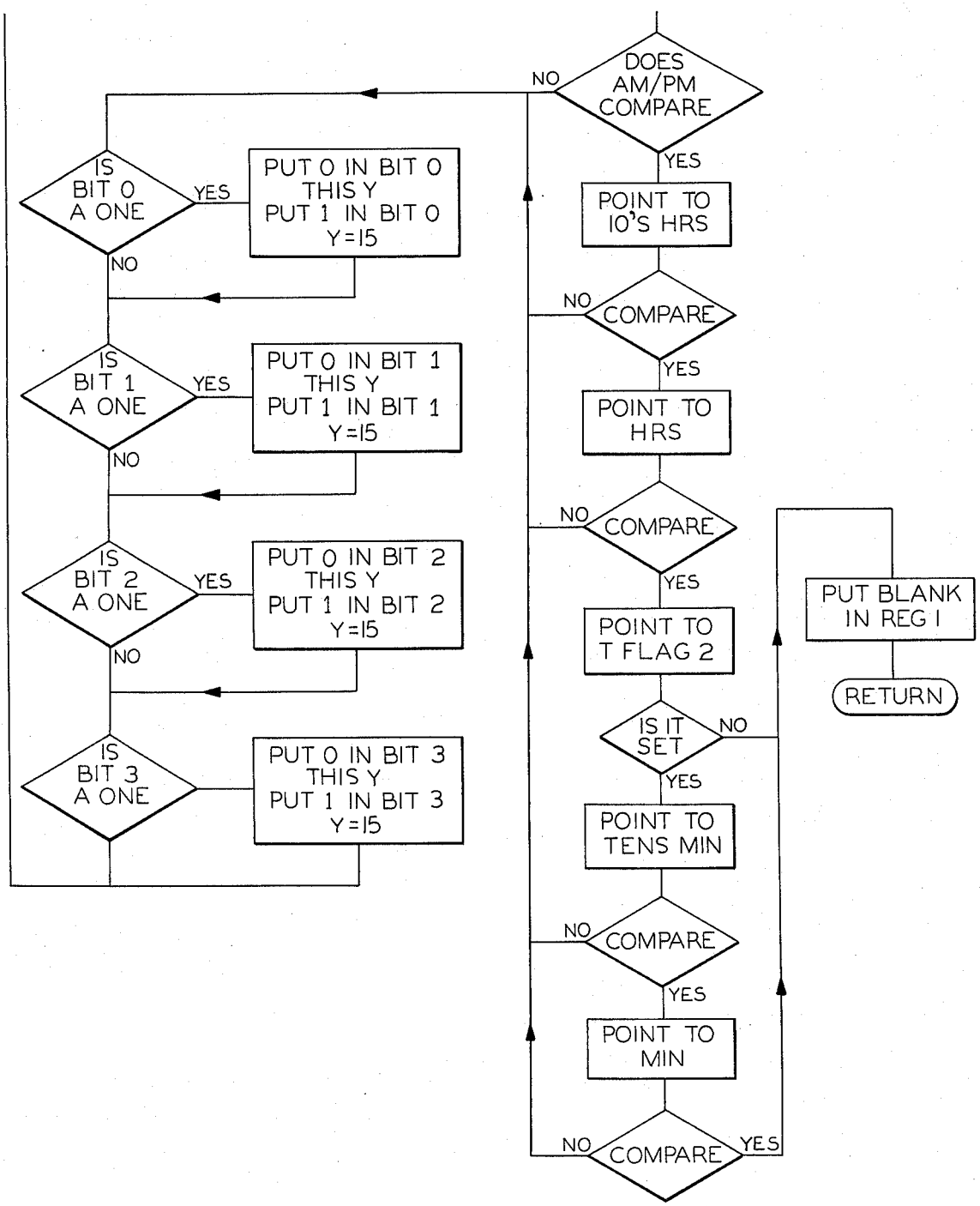

FIG. 26 details the real time comparison routine that is used in conjunction with the time compare sub-routine illustrated in FIGS. 27A and 27B. The sub-routine does all the real time comparisons including comparing real time clock to economy begin and end times, and adjusted prom time. The routine of FIG. 26 utilizes each of those comparisons and determines whether any action is required to change the temperature set point in or out of the economy cycle (by control of the E pot flag) or to read in a new prom word into PROM LOC #2 because the current one has compared to the real time.

FIG. 28 contains the previously described read pots and temperature routine which incorporates the A to D conversion and tracking arrangement to read the set pot for normal and economy temperature and the room temperature reading from the indoor thermistor. The routine transfers a number indicative of the currently desired function, e.g. "3", for indoor temperature, transfers this number to register 1 by use of the Temp-No-Subroutine. It points to the least significant digit of the currently stored BCD value of this temperature. The previously described tracking loop arrangement increments, or decrements this BCD value until the accumulator shifts between zero and one, indicative that the BCD value corresponds to the analog value currently being detected, or until it is outside of the limits of 49 and 99. The routine provides for successive detection of the indoor temperature and pots by pointing to different values in the Y-9 memory location, e.g. 8—room temperature, 11—normal pot, and 14—economy pot. The routine also provides for the previously described guard bands established by modifying the set point value by the algebraic addition of set off values, e.g. the one degree and six degree set off values.

FIGS. 29A and 29B of the flow charts contain the control temperature determination routine which has been described in detail. The routine determines the temperature, T-control, that the control will actually control to. It establishes whether the power defer mode has been entered and, if it has, it controls ramping of the control, set point, temperature. This routine also contains all logic for entering and exiting from the power defer cycle.

Figure 30A:
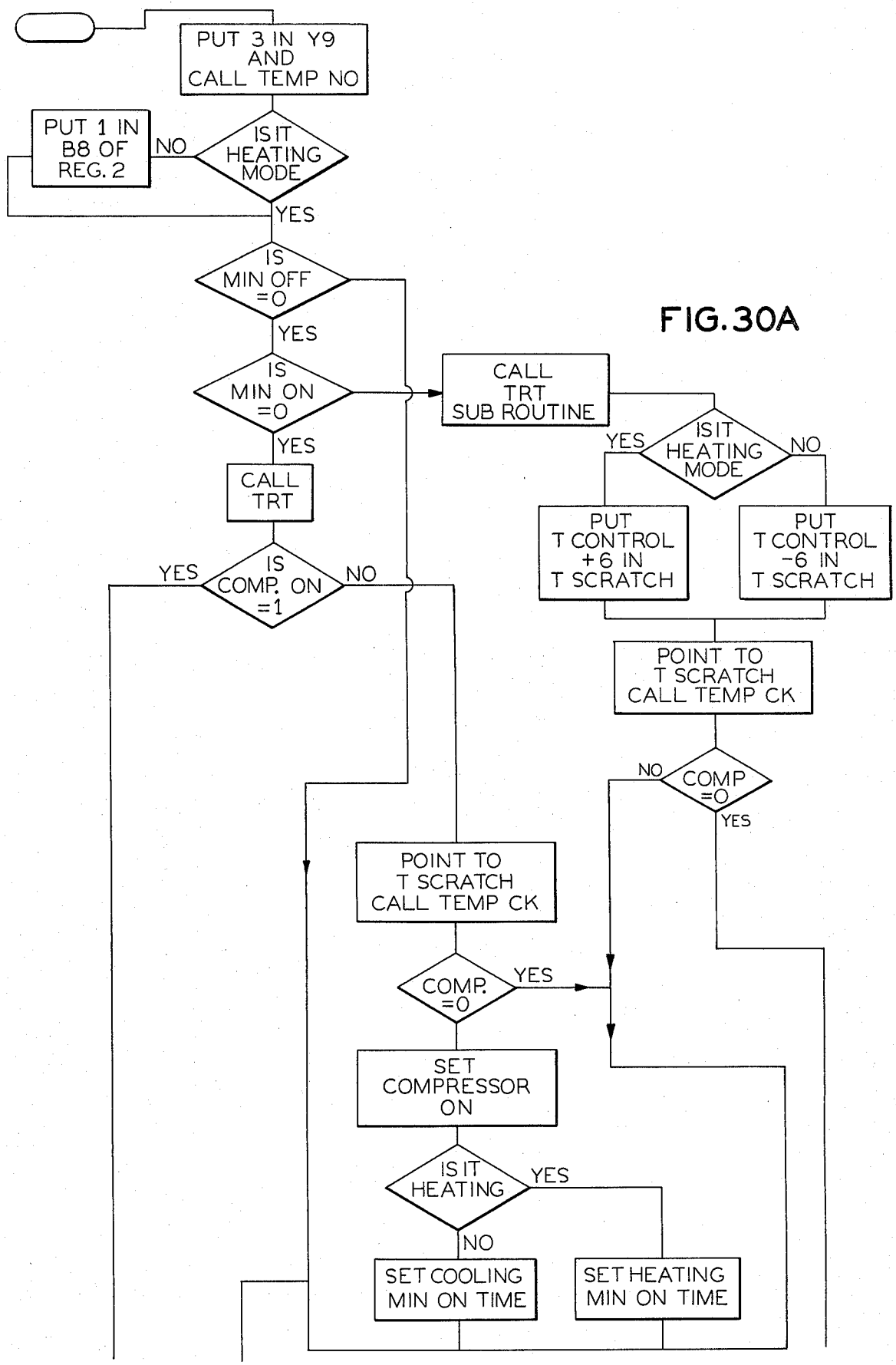
Figure 30B:
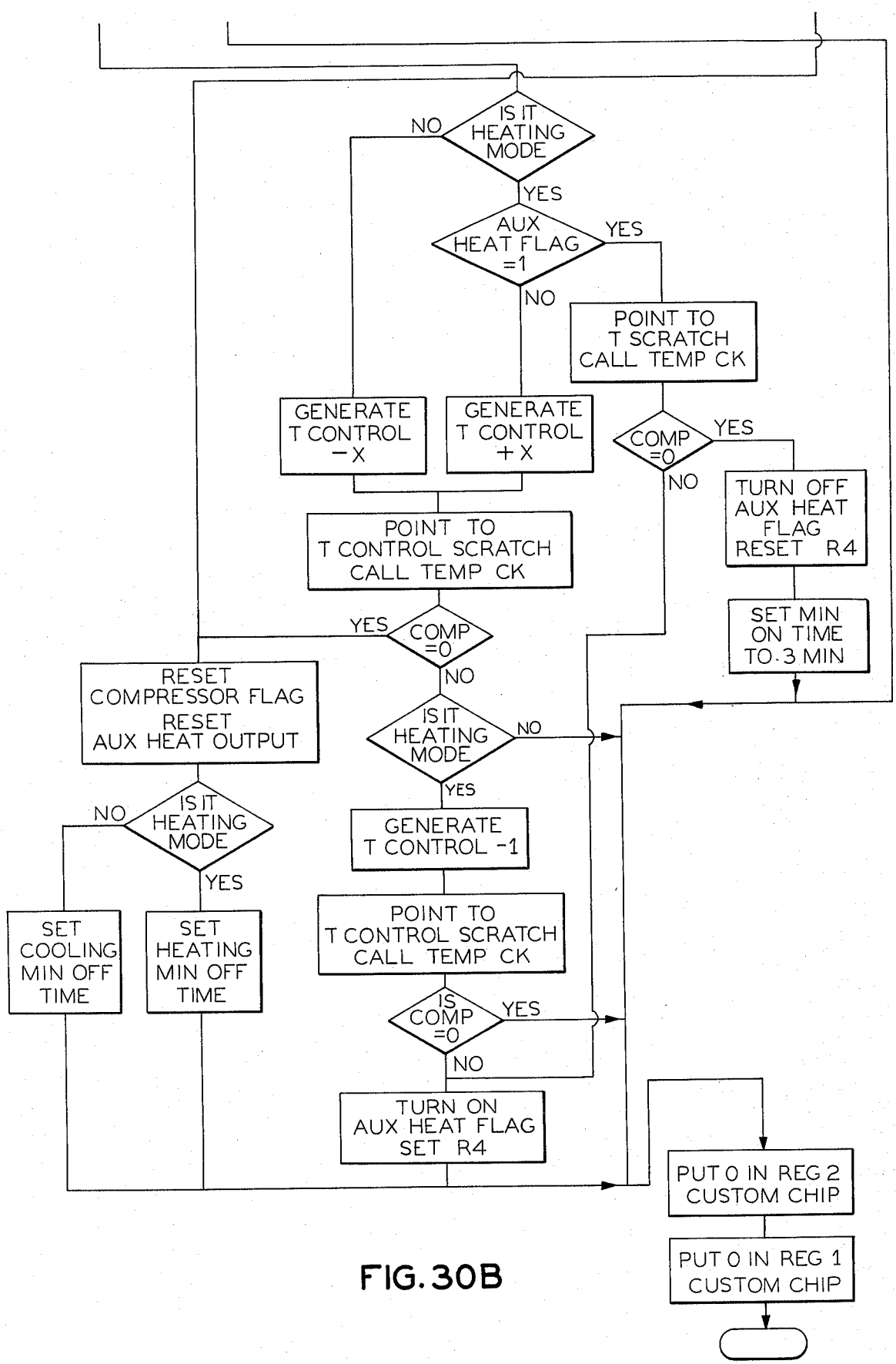

FIGS. 30A and 30B contain the temperature control routine which, based on the indoor temperature and the control setting, determines whether or not the compressor or the second stage of heating is required and sets the appropriate flags so that the outputs are energized or deenergized appropriately.

Figure 31:
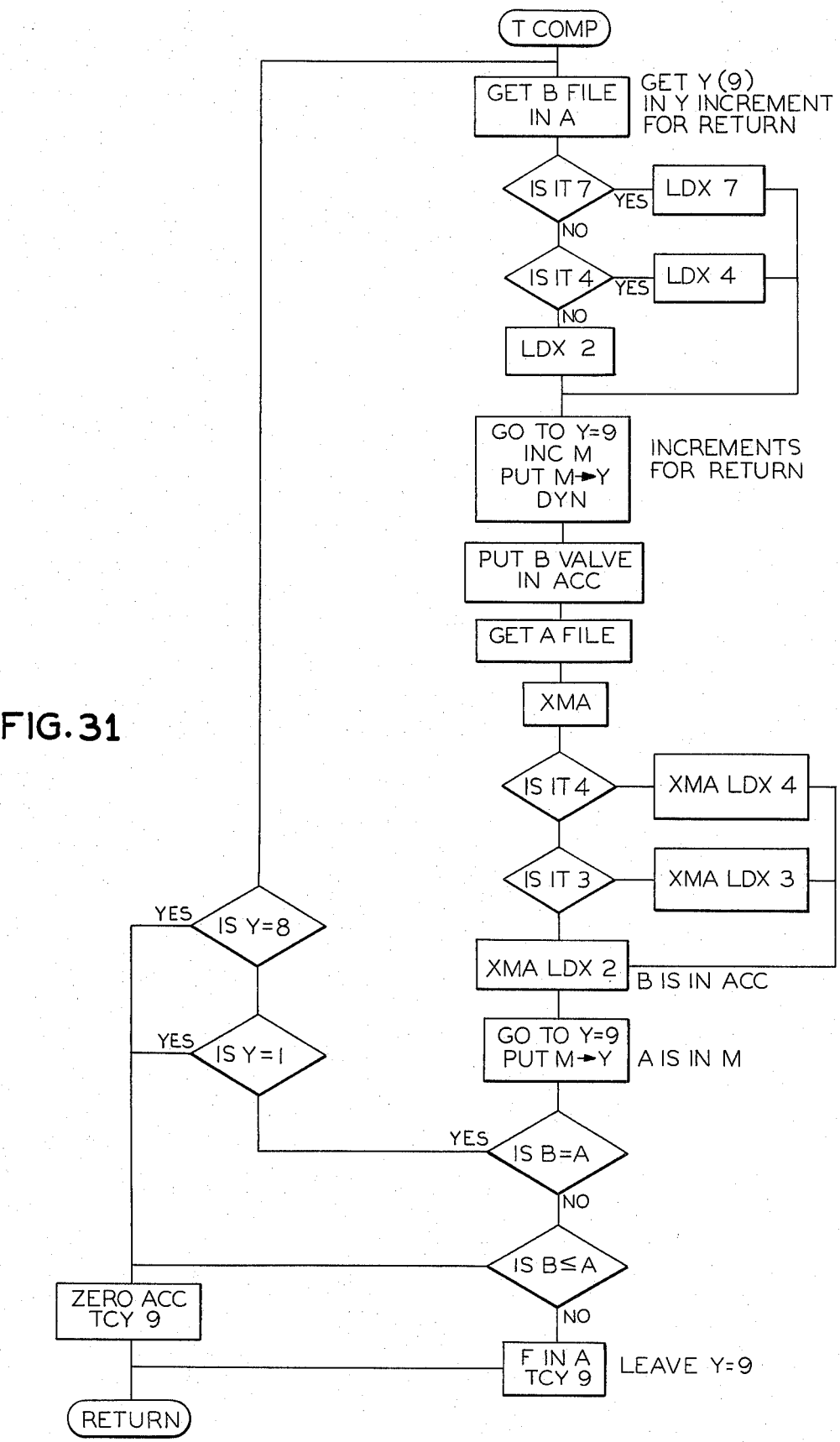
FIG. 31 is a flow chart of a temperature comparison sub-routine.

FIG. 31 contains the temperature compare sub-routine. This is a sub-routine which is used in different routines for the digital comparison of two temperature numbers to determine whether or not one temperature is greater than another.

FIG. 32 describes two sub-routines used in the temperature control routine of FIGS. 30A and 30B. FIG. 32(b) is the Temp Number sub-routine which obtains data from the RAM Y-9 location for transfer to register 1. It initially sets the processor select lines R-6, 7 and 8 such that register select decoder 50 causes data in location Y-9 to be transferred via the accumulator and data lines 0-3 to 6, and actuates the chip enable line R-10 to enter this data in register 1. The temperature check sub-routine, shown in FIG. 32(a) transfers the stored two digit BCD temperature value data to registers 3 and 4. It sets the select lines to point to register 4, transfers the least significant digit of the stored value into the Y register for transfer via the accumulator and data lines to register 4. The most significant digit stored in RAM is then transferred to the accumulator and subsequently transferred to register 3.

It should be apparent to those skilled in the art that while the preferred embodiment has been described herein in accordance with the Patent Statutes, changes may be made in the disclosed embodiments without actually departing from the true spirit and scope of the invention.

What we claim as new and desire to secure by Letters Patent of the United States is:

1. A thermostatic control for use in controlling indoor temperature within a structure and for selectively reducing electrical energy consumption of ambient temperature conditioning means during intervals of peak load demand on the electrical system, comprising:
   (a) user adjustable reference temperature selection means for selecting a desired reference temperature and first means for deriving therefrom a temperature set point value;
   (b) second means responsive to a signal condition indicative of an imminent electric power peak demand for generating a power defer signal;
   (c) third means responsive to said power defer signal for automatically ramping said temperature set point value during actual peak load demand in a defer direction at a predetermined rate to increase electrical energization of the ambient temperature conditioning means to ramp indoor ambient temperature in a defer direction from the desired reference temperature;
   (d) means responsive to termination of actual peak load demand for automatically ramping said temperature set point value at a predetermined rate to increase energization of the ambient temperature conditioning means until said temperature set point value returns to the value of the temperature set point derived from said reference temperature selection means;

(e) fourth means for deriving a signal representative of indoor ambient temperature value;

(f) fifth means responsive to signals representative of said indoor ambient temperature value and said temperature set point value of generating a control signal; and (g) sixth means responsive to said control signal and adapted for connection to the ambient temperature conditioning means to modify operation of the last named means.

2. In a thermostatic control for selective energization of ambient heating means responsive to comparison of a signal representative of actual indoor ambient temperature and a signal representative of a set point value for controlling indoor temperature within a structure at a first user selected temperature value during a first predetermined time interval and at a second lower temperature value during a second predetermined time interval, the combination comprising:

(a) first means for deriving a first digital signal having a value representative of first selected temperature value;

(b) second means for deriving a second digital signal having a value representative of second lower temperature value;

(c) digital storage means for storing a set point value;

(d) means operative during the second predetermined time interval for storing said second digital signal as a set point value in said digital storage means;

(e) digital ramping means adapted to consecutively modify the value of a signal by a predetermined magnitude upon the lapse of predetermined time intervals;

(f) means responsive to termination of said second predetermined time interval for enabling said ramping means to ramp the set point value stored in said digital storage means at a rate established by said predetermined magnitude and preselected time interval to increase the set point from a value representative of the second lower temperature value to a value representative of the first selected temperature value, whereby the rate of temperature increase is limited to a desired value.

3. A room thermostatic control for use in controlling indoor temperature within a structure and for selectively reducing electrical energy consumption of ambient temperature conditioning means during intervals of peak load demand on the electrical system, comprising:

(a) user adjustable reference temperature selection means for selecting a desired reference temperature and first means for deriving therefrom a temperature set point value;

(b) second means for generating a power defer signal responsive to a signal condition, indicative of an imminent electric power peak demand and supplied from a location external of the thermostatic control and the structure being conditioned by ambient temperature conditioning means;

(c) third means responsive to said power defer signal for automatically ramping said temperature set point value in a first boosting direction to increase energization of the ambient temperature conditioning means, and subsequently ramping said temperature set point value in a second defer direction to decrease electrical energization of the ambient temperature conditioning means, whereby indoor ambient temperature is offset in a boost direction from the desired reference temperature and during actual peak load demand is ramped in a defer direction from the desired reference temperature;

(d) fourth means for deriving a signal representative of indoor ambient temperature value;

(e) fifth means responsive to signals representative of said indoor ambient temperature value and said temperature set point value for generating a control signal; and (f) sixth means responsive to said control signal and adapted for connection to the ambient temperature conditioning means to modify operation of the last named means.

4. The arrangement of claim 3 further comprising means for automatically ramping said temperature set point value in said first direction subsequent to ramping in said defer direction until said temperature set point value returns to the value of the temperature set point derived from said reference temperature selection means.

5. The arrangement of claims 3 or 1 wherein said thermostatic control is utilized for controlling ambient heating means and wherein said third means provides for automatically ramping said temperature set point value in said boost direction to increase indoor ambient temperature in respect to the desired reference temperature and during an interval of actual peak demand to ramp said indoor ambient temperature from said increased ambient temperature to a value below the desired reference temperature so as to defer power consumption.

6. The arrangement of claim 5 for controlling ambient heating means incorporating a heat pump and auxiliary heating means, means for generating a second temperature set point value offset from the temperature set point value by a predetermined value in a first direction, representative of a higher set point temperature; said sixth means comprising a first control output adapted for connection to the heat pump and providing a first signal for actuating the heat pump responsive to the indoor ambient temperature being reduced to the temperature set point value and for deactivating the heat pump responsive to said indoor ambient temperature increasing to the second temperature set point value; further means for generating a third temperature set point value offset from the temperature set point value in a second direction by a predetermined value representative of a lower set point temperature, said sixth means further comprising a second control output adapted for connection to the auxiliary heating means and providing a second signal for actuating the auxiliary heating means responsive to the indoor ambient temperature being reduced to the third temperature set point value.

7. The arrangement of claim 6 comprising timing means, means for activating said timing means responsive to commencing production of said first signal for actuating the heat pump and for inhibiting deactivation of the heat pump for a predetermined time interval.

8. The arrangement of claims 3 or 1 wherein said thermostatic control is utilized for controlling air conditioning means and wherein said third means automatically ramps said temperature set point value in said boost direction to decrease the indoor ambient temperature in respect to the desired reference temperature, and during actual peak demand ramps said indoor ambient temperature from said decreased ambient temperature value to a value above the desired reference temperature so as to defer power consumption.

9. The room thermostatic control of claims 3 or 1 wherein said fifth means, comprises:
  (a) means for generating a second set point signal representative of the algebraic sum of said set point signal and a set off signal;
  (b) and comparison means for sequentially comparing said set point signal and said second set point signal with a signal representative of indoor ambient temperature;
  (c) means responsive to conincidence between one of the aforesaid set point signals with said indoor ambient temperature signal for producing a first control signal for actuating operation of said ambient temperature conditioning means and responsive to coincidence between the other one of the aforesaid set point signals with said indoor ambient temperature signal for producing a second control signal for deactivating operation of said ambient temperature conditioning means.

10. The arrangement of claim 9 further comprising first and second timing means, means for activating said first timing means responsive to commencing production of said first control signal and for inhibiting termination of said first control signal for a predetermined first time interval, and means for activating said second timing means responsive to commencing production of said second control signal and for inhibiting termination of said second control signal for a predetermined second time interval, whereby the ambient temperature conditioning means has minimum time periods of activation and deactivation.

11. The arrangement of claim 10 wherein the ambient temperature conditioning means is adapted to be actuated from the commencement of production of said first control signal for at least said predetermined first time interval until said ambient indoor temperature attains the value of said second set point signal, and wherein said set off signal has a predetermined value, further comprising:
  (a) means for generating a second set off signal of predetermined value greater than the value of said set off signal;
  (b) means for generating a third set point signal representative of the algebraic sum of said set point signal and of said second set off signal;
  (c) said comparison means being adapted to sequentially compare said set point, second set point and third set point signals with a signal representative of indoor temperature;
  (d) means responsive to said signal representative of indoor ambient temperature attaining the value of said third set point signal for modifying said control signals to deactivate the ambient temperature conditioning means so that the conditioning means may be deactivated prior to lapse of said predetermined time interval in the event of an excessive deviation of indoor ambient temperature.

12. The arrangements of claims 3, 4, 9, 10 or 1 further comprising means for preventing modification of the temperature set point by user adjustment of said control during intervals of peak load demand to prevent defeat of power deferral.

13. The arrangement of claim 12 comprising:
  (a) first digital storage means for storing said desired reference temperature value;
  (b) second digital storage means for storing said temperature set point;
  (c) means for periodically transferring said desired reference temperature value from said first to said second digital storage means; and
  (d) means for disabling such transfer during intervals of peak load demand.

14. An indoor thermostatic control arrangement for controlling ambient indoor temperature conditioning means to condition ambient indoor temperature within a structure and providing power defer operation for reducing electrical energy consumption of said conditioning means during intervals of peak demand on the electrical supply system energizing said conditioning means, comprising:
  (a) indoor temperature sensing means providing a first electrical signal having a value representative of actual ambient indoor temperature;
  (b) temperature reference means for user selection of a selected ambient temperature reference value and providing a second signal of value representative of said selected ambient temperature;
  (c) means to derive a temperature set point signal from said second signal;
  (d) digital ramping means adapted to consecutively modify the value of a signal by a predetermined magnitude upon the lapse of preselected time intervals;
  (e) means responsive to a signal condition, indicative of an imminent peak demand on the electrical supply system for enabling said ramping means to ramp said set point signal at a rate established by said predetermined magnitude and preselected time interval;
  (f) means responsive to said first electrical signal attaining the value of said set point signal for providing a control signal; and
  (g) means responsive to said control signal and adapted for connection to said ambient temperature conditioning means to modify operation of the latter means, whereby during periods of peak demand ambient indoor temperature is modified from the selected ambient temperature value at a rate defined by said ramping means.

15. An indoor thermostatic control assembly adapted for location in a building for controlling electrically energized ambient temperature conditioning means, such as heat pump systems, to maintain ambient indoor temperature within a building and power defer operation for selectively reducing electrical energy consumption of said conditioning means during time intervals of peak demand on the electrical supply system energizing said conditioning means, comprising:
  (a) indoor temperature sensing means providing a first electrical signal having a value representative of actual ambient indoor temperature;
  (b) temperature reference means for user selection of a desired ambient temperature and providing a second electrical signal of value representative of said desired ambient temperature;
  (c) set point selection means for deriving a temperature set point signal from said second signal;
  (d) signal storage means storing a block of digital signals for each of a plurality of contiguous time intervals, the block for each time interval defining any ramping of said set point signal desired to be performed during power defer operation occurring during such interval;

(e) power defer signal means for producing a power defer signal responsive to a signal condition occurring external of the building which condition is indicative of the need for power defer operation;

(f) digital real time clock means for consecutively selecting the block of digital signal applicable to the current real time increment;

(g) digital ramping means for incrementally ramping the digital value of said temperature set point signal in accordance to said selected block of digital signals upon occurrence of said power defer signal;

(h) comparison means for comparing the thus modified set point signal and said first electrical signal;

(i) means responsive to said comparison for producing a control signal adapted to actuate ambient temperature condition means, whereby during power defer operation the ambient temperature is gradually variable in respect to the desired ambient temperature at rates controlled by said outdoor thermostatic control assembly.

16. The indoor thermostatic control assembly of claim 15 wherein said digital ramping means is adapted to incrementally ramp the digital value of said temperature set point signal in a direction selected by a direction command in said selected block of digital signals, whereby during power defer operation said ambient temperature value may be gradually ramped in a plurality of directions so as to minimize discomforture.

17. The thermostatic control assembly of claim 16 wherein said block of digital signals comprises a digital signal representative of the time duration between intervals when said temperature set point signal is to be modified by a predetermined unit value, and said ramping means comprises:

(a) means for repetitively storing said signal representative of time duration;

(b) means for incrementally decrementing said time value; and (c) means for modifying said control temperature value responsive to said stored time value being decremented.

18. The indoor thermostatic control assembly of claim 15 wherein said digital ramping means is adapted to incrementally ramp the digital value of said temperature set point signal at a rate specified by the block of digital signals.

19. The indoor thermostatic control assembly of claim 15 comprising mode selection switching means for selectively actuating heating or cooling mode operation, said digital signal storage means adapted to store a first series of blocks of digital signals for each of a plurality of contiguous time intervals for the heating mode, and to store a second series of blocks of digital signals for each of a plurality of contiguous time intervals for the cooling mode, means responsive to said digital real time clock means and to said mode selection means for consecutively selecting the block of digital signals applicable to the current time increment from the series of blocks for the mode selected by said mode selection switch.

20. The indoor thermostatic control assembly of claims 13, 14 or 15 wherein said power defer signal means is adapted to be coupled to outdoor temperature sensing means and said power defer signal means produces a power defer signal when the temperature outdoors of the structure is in a predetermined range.

21. In a room thermostatic control for mounting in a building and incorporating temperature sensing means providing an ambient indoor temperature signal, and operator adjustable means providing a reference temperature signal indicative of desired indoor temperature and output means responsive to comparison of signals derived therefrom to produce output signals for controlling electrical energization of ambient temperature conditioning means, first and second memory storage portions and a real time clock, a power deferral method of reducing electrical consumption of the conditioning means during intervals of peak load demand on the system supplying electrical energization, comprising the steps of:

(a) deriving a set point temperature value representative of the value of said reference temperature signal and storing said set point temperature value in a first memory storage portion;

(b) accessing a second memory storage portion containing stored digital signals for each of a plurality of consecutive real time increments, the stored digital signals for selected ones of said consecutive time increments containing an enabling signal for ramping said set point temperature signal during the presence of a power deferal signal;

(c) under control of a real time clock continuously selecting the stored digital signals of the currently effective time increment;

(d) responsive to the simultaneous presence of the power defer signal and of said enabling signal during the currently effective time increment, incrementally ramping the value of the stored set point signal in a first direction to gradually decrease energization of ambient temperature control means at the first predetermined rate;

(e) responsive to termination of either of said power defer signal or of said enabling signal during the currently effective time increment, terminating said incremental ramping in the first direction and commencing incremental ramping of the stored set point signal in an opposite, second, direction to gradually increase energization of the ambient temperature control means, whereby the ambient indoor temperature returns to the value representative of said reference temperature signal; and (f) producing output signals responsive to comparison of the set point temperature signal and of the ambient indoor temperature signal for modifying the actuation of the ambient temperature conditioning means.

22. The method set forth in claim 21 wherein the value derived from said reference temperature in said signal is periodically stored as a set point temperature in said first memory portion, the further step of inhibiting such periodic storing during the simultaneous presence of said power defer and said enabling signals.

23. The method of claim 22 wherein the value of said ambient indoor temperature is transferred to said first memory portion at the commencement of ramping the value of said set point signal in said first direction to preclude defeat of power deferral by misadjustment of the operator adjustable means.

24. The method set forth in claim 21 comprising the further step of incrementally ramping the value of the stored set point signal in said direction prior to ramping in said first direction to boost ambient energy storage prior to decreasing energization of the ambient temperature conditioning means.

25. A room thermostatic control for use in controlling indoor temperature within a structure and for selectively reducing electrical energy consumption of ambient temperature conditioning means during intervals of peak load demand on the electrical system, comprising:

(a) means for selecting a desired indoor reference temperature, and deriving therefrom a set point temperature value;

(b) means for initiating a temperature control signal for actuating ambient temperature conditioning means when ambient indoor temperature attains said set point value;

(c) means for generating a power defer signal responsive to a signal condition indicative of an imminent power peak demand and supplied from a location external of said control and the structure being conditioned by the indoor ambient temperature conditioning means; and (d) means responsive to said power defer signal for automatically shifting said set point value sequentially by different predetermined magnitudes whereby the electrical energization of the ambient temperature conditioning means and the indoor ambient temperature is variable in accordance to a desired profile during intervals of anticipated peak demand on the electrical system.

26. A room thermostatic control for use in controlling indoor temperature within a structure and for selectively reducing electrical energy consumption of ambient temperature conditioning means during intervals of anticipated peak load demand on the electrical system, comprising:

(a) user adjustable reference temperature selection means providing an analog reference temperature signal of value representative of desired indoor ambient temperature;

(b) indoor ambient temperature sensing means for providing an analog ambient indoor temperature signal;

(c) comparison means comprising a plurality of inputs and an output;

(d) analog control means comprising an output coupled to one input of the comparison means, and inputs connected for sequential coupling of said analog reference signal and of said analog ambient indoor temperature signal to said output;

(e) digital storage means for storing one of the aforesaid analog signals in digital form as a digital temperature signal;

(f) digital to analog conversion means comprising an input and an output coupled to another input of said comparison means;

(g) digital processing means for sequentially coupling the stored digital temperature signal to an input of said digital to analog conversion means and for controlling the simultaneous coupling of said one of the aforesaid analog signals to the one input of said comparison means;

(h) said digital processing means being responsive to the output of said comparison means for sequentially updating the value of said stored digital temperature signal to correspond to the current value of said one of the aforesaid analog signals;

(i) means for deriving a digital set point temperature value from said stored digital signal and for storing said digital set point value;

(j) means responsive to a signal condition indicative of an imminent electrical peak power demand for producing a power defer signal;

(k) means responsive to said power defer signal for modifying the stored digital set point value; and (l) means responsive to comparison of the values of the other one of the aforesaid analog signals and of said stored digital set point value for producing a control signal adapted to modify actuation of the ambient temperature conditioning means.

27. The control of claim 26 wherein said analog control means supplies electrical energization to said indoor ambient temperature sensing means during intervals when said analog ambient indoor temperature signal is coupled to the output of the analaog control means so that said indoor ambient temperature sensing means is energized only periodically to minimize thermal drift.

28. The control of claim 27 wherein said digital processing means sequentially couples said digital set point value to an input of said digital to analog conversion means and simultaneously coupling said other one of the aforesaid analog signals to one input of said comparison means; said digital processing means responsive to the resulting output of said comparison means for producing said control signal.

29. The control of claim 26 wherein said digital to analog conversion means comprises semiconductor resistance means connected across a source of potential, a plurality of taps being connected at displaced increments along said resistance means; and semiconductor switching means coupling said taps to the output of said conversion means; and means responsive to said digital processing means for gating a selected one of said switching means.

30. The digital to analog conversion means of claim 29 further comprising a plurality of tap points selected such that their respective output voltages correspond to the voltage values of said analog signals at one degree temperature increments.

31. The arrangement of claim 26 wherein said means responsive to a signal condition indicative of an imminent electrical peak power demand comprises ambient outdoor temperature sensing means for providing an analog ambient outdoor temperature signal.

32. The arrangement of claim 31 wherein said outdoor temperature sensing means sequentially provides a plurality of analog ambient outdoor temperature signals indicative of the relationship of the outdoor temperature in respect to preselected outdoor temperature values; and means responsive thereto to generate said power defer signal.

33. The control of claim 32 wherein said means for modifying the stored digital set point value comprises means for modifying said set point value as a function of real time, and said control further comprises an adjustable real time clock, and means responsive to one or more of said analog ambient outdoor temperature signals for inhibiting user readjustment of said real time clock, responsive to ourdoor temperature indicative of anticipated peak load demand.

* * * * *